United States Patent
Kim et al.

(10) Patent No.: US 11,343,690 B2
(45) Date of Patent: May 24, 2022

(54) METHOD AND APPARATUS FOR PERFORMING FREQUENCY MEASUREMENT AND SETTING FREQUENCY MEASUREMENT FOR NON-CONNECTION MODE TERMINAL

(71) Applicant: Samsung Electronics Co., Ltd., Suwon-si (KR)

(72) Inventors: Donggun Kim, Suwon-si (KR); Anil Agiwal, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/983,544

(22) Filed: Aug. 3, 2020

(65) Prior Publication Data
US 2021/0037403 A1    Feb. 4, 2021

(30) Foreign Application Priority Data

Aug. 2, 2019  (KR) .................. 10-2019-0094585
Aug. 30, 2019 (KR) .................. 10-2019-0107685

(51) Int. Cl.
*H04W 24/08* (2009.01)
*H04W 56/00* (2009.01)
*H04L 41/0803* (2022.01)
*H04W 76/27* (2018.01)
*G16Y 10/75* (2020.01)

(52) U.S. Cl.
CPC .......... *H04W 24/08* (2013.01); *H04L 41/0803* (2013.01); *H04W 56/001* (2013.01); *H04W 76/27* (2018.02); *G16Y 10/75* (2020.01)

(58) Field of Classification Search
CPC ... H04W 24/08; H04W 56/001; H04W 76/27; H04L 41/0803
See application file for complete search history.

(56) References Cited

U.S. PATENT DOCUMENTS

| 2012/0002740 | A1* | 1/2012 | Han | H04L 5/0048 375/260 |
| 2014/0086085 | A1* | 3/2014 | Zheng | H04L 5/0092 370/252 |
| 2015/0029885 | A1 | 1/2015 | Seo et al. | |
| 2019/0289661 | A1* | 9/2019 | Chen | H04W 72/1284 |

FOREIGN PATENT DOCUMENTS

KR    10-2018-0137385 A    12/2018

OTHER PUBLICATIONS

US 10,575,201 B2, 02/2020, Kim et al. (withdrawn)
(Continued)

*Primary Examiner* — Mohammad S Anwar

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

20 Claims, 20 Drawing Sheets

(56) References Cited

OTHER PUBLICATIONS

Huawei et al., "Usage of SI and dedicated signalling for early measurement configuration," R2-1907477, 3GPP TSG-RAN WG2#106, Reno, USA, May 13-17, 2019, 3 pages.
Catt, "Open Issues on Early Measurement Configurations," R2-1905878, 3GPP TSG-RAN WG2 Meeting #106, Reno, USA, May 13-17, 2019, 4 pages.
Ericsson, "Handling of early measurement configurations and results during autonomous transition to IDLE," R2-1907246, 3GPP TSG-RAN WG2#106, Reno, Nevada, May 13-17, 2019, 3 pages.
Intel Corporation, "Discussion on SIB and dedicated configuration for early measurement reporting," R2-1906422, 3GPP TSG-RAN WG2 meeting #106, Reno, Nevada, May 13-17, 2019, 5 pages.
International Search Report of the International Searching Authority in connection with International Patent Application No. PCT/KR2020/010201 dated Nov. 3, 2020, 3 pages.

* cited by examiner

METHOD AND APPARATUS FOR PERFORMING FREQUENCY MEASUREMENT AND SETTING FREQUENCY MEASUREMENT FOR NON-CONNECTION MODE TERMINAL

CROSS-REFERENCE TO RELATED APPLICATIONS

This application is based on and claims priority under 35 U.S.C. 119 to Korean Patent Application No. 10-2019-0094585, filed on Aug. 2, 2019 and Korean Patent Application No. 10-2019-0107685 filed on Aug. 30, 2019, in the Korean Intellectual Property Office, the disclosures of which are herein incorporated by reference in their entireties.

BACKGROUND

1. Field

The disclosure relates to a method and apparatus for performing a frequency measurement and setting the frequency measurement for a non-connection mode terminal in a next generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

In order to support a service having a high data rate and a low transmission delay in a next generation mobile communication system, a base station needs to quickly configure a carrier aggregation (CA) technology or a dual connectivity (DC) technology to a terminal. However, configuring the above technologies to the terminal requires a frequency measurement result of the terminal. Therefore, there is a need for a method to quickly receive a report of the frequency measurement result from the terminal.

SUMMARY

According to various embodiments of the disclosure,

The disclosure proposes a method for a terminal of an RRC idle mode or an RRC inactive mode to quickly report a result of measuring ambient frequencies to a base station in a next generation mobile communication system, thereby allowing the base station to quickly configure the CA technology or DC technology to the terminal. Specifically, the base station may set configuration information for the frequency measurement in an RRC message to the terminal that has capability of performing the frequency measurement in the RRC idle mode or the RRC inactive mode when the terminal releases a connection with a network. While moving in the RRC idle mode or the RRC inactive mode and performing a cell selection or reselection procedure, the terminal may perform the frequency measurement based on frequency measurement configuration information set in the RRC message or system information of a serving cell on which the terminal camps through the cell reselection procedure. In addition, the base station may quickly configure the CA technology or the DC technology to the terminal by allowing the terminal to report the frequency measurement result immediately upon establishing the connection with the network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

Figure 1:
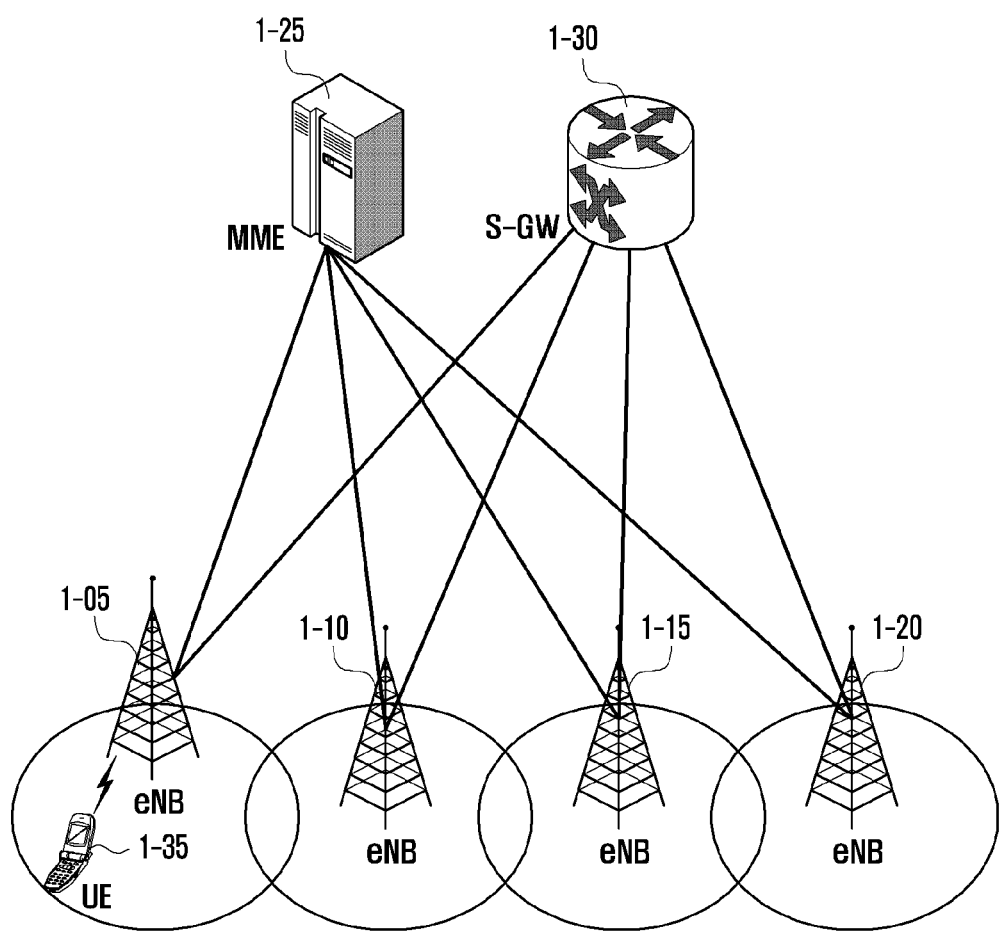
FIG. 1 is a diagram illustrating a structure of a long term evolution (LTE) system according to an embodiment of the disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

In the descriptions below, a term used for identifying an access node, terms indicating network entities, terms indicating messages, a term indicating an interface between network entities, terms indicating various pieces of identification information, and the like are used for ease of description. Therefore, the disclosure may not be limited by the terminologies provided below, and other terms that indicate subjects having equivalent technical meanings may be used.

For ease of description, the disclosure uses terms and names defined in the 3rd generation partnership project long term evolution (3GPP LTE). However, the disclosure is not limited to the terms and the names, and may be equally applied to systems that comply with other standards. For ease of description, an evolved nodeB (eNB) and a "gNB" may be interchangeably used in the disclosure. That is, a base station that is described as eNB may indicate gNB.

The disclosure proposes a method for a terminal of an RRC idle mode or an RRC inactive mode to quickly report a result of measuring ambient frequencies to a base station in a next generation mobile communication system, thereby allowing the base station to quickly configure a carrier aggregation (CA) technology or a dual connectivity (DC) technology to the terminal. Specifically, the base station may set configuration information for the frequency measurement in an RRC message to the terminal that has capability of performing the frequency measurement in the RRC idle mode or the RRC inactive mode when the terminal releases a connection with a network. While moving in the RRC idle mode or the RRC inactive mode and performing a cell selection or reselection procedure, the terminal may perform the frequency measurement based on frequency measurement configuration information set in the RRC message or system information of a serving cell on which the terminal camps through the cell reselection procedure. In addition, the base station may quickly configure the CA technology or the DC technology to the terminal by allowing the terminal to report the frequency measurement result immediately upon establishing the connection with the network.

In the disclosure, an RRC connected mode terminal may receive an RRC message (e.g., an RRCRelease message) from a base station and release an RRC connection. If the RRC message contains frequency measurement configuration information together with instructions to transition to an RRC idle mode or an RRC inactive mode, the terminal may perform a frequency measurement in the RRC idle mode or the RRC inactive mode during a given duration or time. However, if there is no information about a list of frequencies to be measured in the frequency measurement configuration information set through the RRC message, and if a serving cell on which the terminal camps through a cell selection or reselection procedure broadcasts the frequency measurement configuration information for the frequency measurement of an RRC idle mode or RRC inactive mode terminal, the terminal may perform the frequency measurement by storing or considering a frequency measurement list based on the information.

As described above, the terminal may perform the frequency measurement in the RRC idle mode or the RRC inactive mode. If there is a need to establish an RRC connection with a network, and if there is an indicator indicating a support of the RRC idle mode or RRC inactive mode frequency measurement (Early measurement) in the system information of the serving cell, or there is in the terminal a valid measurement result that satisfies a measurement result report condition set in the frequency measurement configuration information, the RRC idle mode or RRC inactive mode terminal may transmit, to the base station through an RRC message (e.g., an RRCSetupComplete message or an RRCResumeComplete message), an indicator indicating that there is a result of performing the frequency measurement in the RRC idle mode or the RRC inactive mode. Upon receiving the indicator, the base station may transmit a request message (e.g., a new RRC message or a UEInformationRequest message) requesting the frequency measurement result to the terminal. Upon receiving the request message, the terminal may report the frequency measurement result as a response message (e.g., a new RRC message or a UEInformationResponse message) to the base station. Thus, based on the measurement result, the base station may quickly configure the CA technology or the DC technology to the terminal.

In another method, if the terminal performs the frequency measurement in the RRC inactive mode and has a need to establish an RRC connection with a network, and if there is an indicator indicating a support of the RRC idle mode or RRC inactive mode frequency measurement (Early measurement) in the system information of the serving cell, or there is in the terminal a valid measurement result that satisfies a measurement result report condition set in the frequency measurement configuration information, the RRC inactive mode terminal may report, upon receiving from the base station an RRC message (e.g., an RRCResume message) containing an indicator requesting the frequency measurement result, a valid frequency measurement result as an RRC message to the base station. Thus, based on the measurement result, the base station may quickly configure the CA technology or the DC technology to the terminal.

The disclosure proposes which configuration information the base station should transmit to the terminal for battery saving and efficient signaling of the terminal when setting the RRC idle mode or RRC inactive mode frequency measurement configuration information to the terminal, and which configuration information the base station should transmit in the RRC message (e.g., the RRCRelease message) or system information.

In addition, the disclosure proposes how the terminal will perform the frequency measurement for each frequency or cell in order to save the battery of the terminal when receiving the RRC idle mode or RRC inactive mode frequency measurement configuration information through the RRC message or system information, and how the terminal will apply the frequency measurement configuration information received through the RRC message or system information when performing the frequency measurement.

FIG. 1 is a diagram illustrating a structure of a long term evolution (LTE) system to according to an embodiment of the disclosure.

Referring to FIG. 1, as illustrated, a radio access network of an LTE system is configured with next generation base stations (an evolved node B (ENB), a Node B, or a base station) 1-05, 1-10, 1-15, and 1-20, a mobility management entity (MME) 1-25, and a serving-gateway (S-GW) 1-30. A user equipment (UE) (or a terminal) 1-35 may access an external network via the ENB 1-05 to 1-20 and the S-GW 1-30.

In FIG. 1, the ENB 1-05 to 1-20 may correspond to a legacy node B in a universal mobile telecommunications system (UMTS). The ENB is connected to the UE 1-35 via a wireless channel, and performs a more complicated role than the legacy node B. In the LTE system, real-time services, such as a voice over IP (VoIP) via an Internet protocol, and all user traffic may be provided via a shared channel. Accordingly, there is a desire for a device that performs scheduling by collecting state information of UEs, such as a buffer state, an available transmission power state, a channel state, and the like, and the ENB 1-05 to 1-20 may be in charge of scheduling. One ENB generally controls a plurality of cells. In order to implement a transmission rate of 100 Mbps, the LTE system uses an orthogonal frequency division multiplexing (OFDM) as a wireless access technology in a bandwidth of 20 mega-Hertz (MHz). In addition, an adaptive modulation & coding (AMC) scheme that determines a modulation scheme and a channel coding rate may be applied based on the channel state of the UE. The S-GW 1-30 is a device for providing a data bearer, and generates or removes a data bearer under the control of the MME 1-25. The MME is a device that is in charge of various control functions in addition to a mobility management function associated with the UE, and may be connected to a plurality of base stations.

Figure 2:
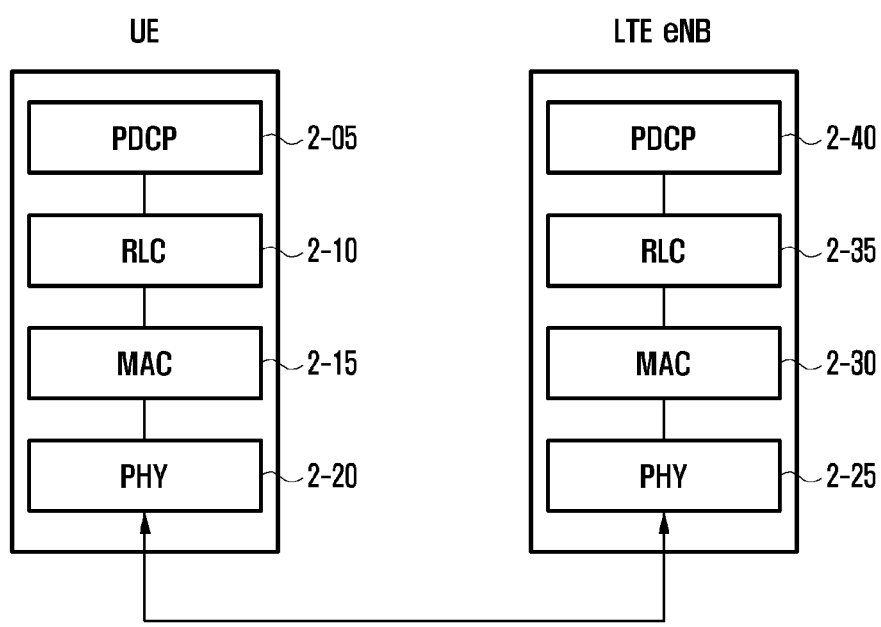
FIG. 2 is a diagram illustrating a structure of a radio protocol in an LTE system according to an embodiment of the disclosure.

FIG. 2 is a diagram illustrating a structure of a radio protocol in an LTE system according to an embodiment of the disclosure.

Referring to FIG. 2, the radio protocol of the LTE system includes, for each of a UE and an ENB, a packet data convergence protocol (PDCP) 2-05 and 2-40, a radio link control (RLC) 2-10 and 2-35, a medium access control (MAC) 2-15 and 2-30, and a physical layer (PHY) 2-20 and 2-25. The PDCP 2-05 and 2-40 may take charge of IP header compression/decompression, or the like. The main functions of the PDCP may be summarized as follows:
  Header compression and decompression: robust header compression (ROHC) only
  Transfer of user data
  In-sequence delivery (In-sequence delivery of upper layer packet data units (PDUs) at PDCP re-establishment procedure for radio link control acknowledged mode (RLC AM))
  Reordering (For split bearers in DC (only support for RLC AM): PDCP PDU routing for transmission and PDCP PDU reordering for reception)
  Duplicate detection (Duplicate detection of lower layer service data units (SDUs) at PDCP re-establishment procedure for RLC AM)
  Retransmission (Retransmission of PDCP SDUs at handover and, for split bearers in DC, of PDCP PDUs at PDCP data-recovery procedure, for RLC AM)
  Ciphering and deciphering
  Timer-based SDU discard (Timer-based SDU discard in uplink)

The RLC 2-10 and 2-35 may reconfigure a PDCP PDU into an appropriate size, and perform ARQ or the like. The main functions of an RLC may be summarized as follows:
  Transfer of data (Transfer of upper layer PDUs)
  Automatic repeat query (ARQ) (Error correction through ARQ (only for AM data transfer))
  Concatenation, segmentation, and reassembly (Concatenation, segmentation and reassembly of RLC SDUs (only for un-acknowledge mode (UM) and AM data transfer))
  Re-segmentation (Re-segmentation of RLC data PDUs (only for AM data transfer))
  Reordering (Reordering of RLC data PDUs (only for UM and AM data transfer)
  Duplicate detection (Duplicate detection (only for UM and AM data transfer))
  Error detection (Protocol error detection (only for AM data transfer))
  RLC SDU discard (RLC SDU discard (only for UM and AM data transfer))
  RLC re-establishment The MAC 2-15 and 2-30 may be connected to various RLC layer devices configured for one UE, and may perform multiplexing of RLC PDUs to a MAC PDU and demultiplexing of RLC PDUs from a MAC PDU. The main functions of the MAC may be summarized as follows:
  Mapping (Mapping between logical channels and transport channels)
  Multiplexing and demultiplexing (Multiplexing/demultiplexing of MAC SDUs belonging to one or different logical channels into/from transport blocks (TB) delivered to/from the physical layer on transport channels)
  Scheduling information reporting
  Hybrid automatic repeat request (HARQ) (error correction through HARQ)
  Priority handling between logical channels (Priority handling between logical channels of one UE)
  Priority handling between UEs (Priority handling between UEs by means of dynamic scheduling)
  Multimedia broadcast/multicast service (MBMS) service identification
  Transport format selection
  Padding The physical (PHY) layer 2-20 and 2-25 may perform an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

Figure 3:
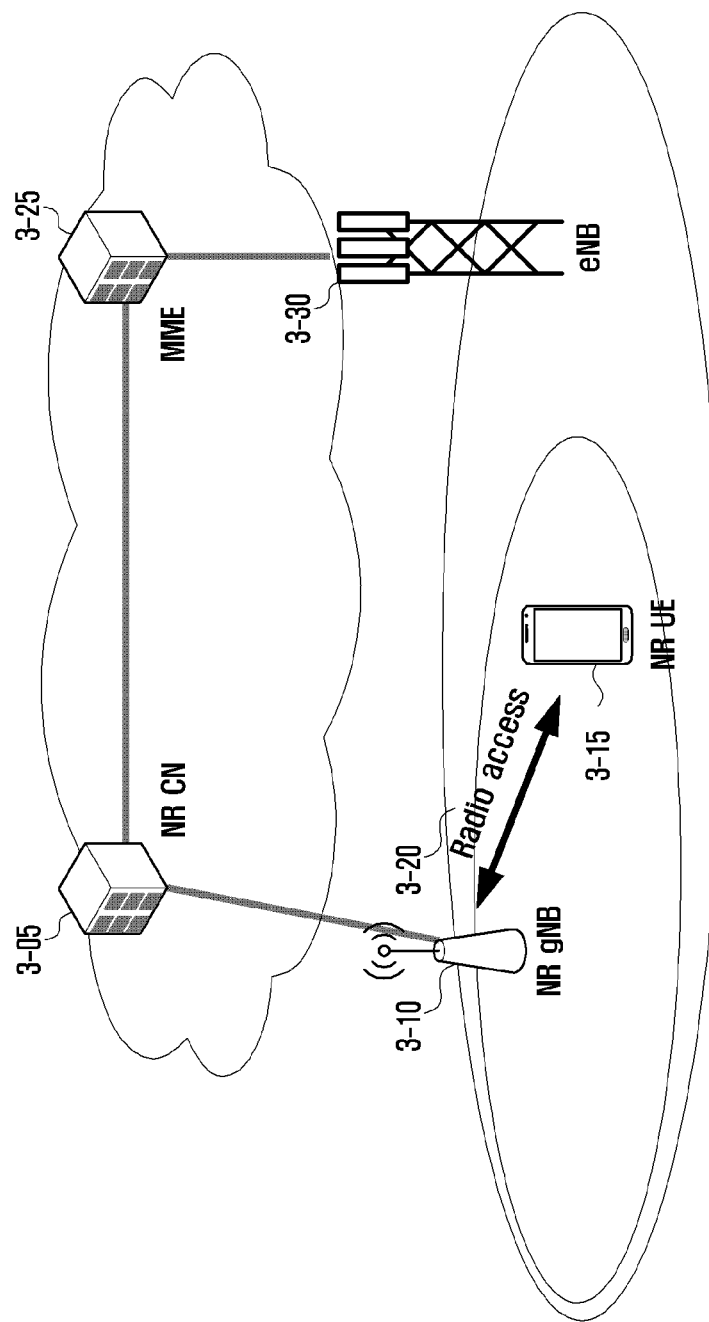
FIG. 3 is a diagram illustrating a structure of a next generation mobile communication system according to an embodiment of the disclosure.

FIG. 3 is a diagram illustrating a structure of a next generation mobile communication system according to an embodiment of the disclosure.

Referring to FIG. 3, as illustrated, a radio access network of the next generation mobile communication system (hereinafter NR or 5G) may be configured with a next generation base station (new radio node B (NR gNB or NR base station) 3-10 and a new radio core network (NR CN) 3-05. A user equipment (new radio user equipment (NR UE) or terminal) 3-15 may access an external network 3-35 via the NR gNB 3-10 and the NR CN 3-05.

In FIG. 3, the NR gNB 3-10 may correspond to an evolved Node B (eNB) in the legacy LTE system. The NR gNB is connected to the NR UE 3-15 via a wireless channel, and may provide a better service compared to the legacy nodeB. In the next generation mobile communication system, all user traffics are serviced via a shared channel and thus, a device that collects state information of UEs, such as a buffer status, an available transmission power status, a channel status or the like, and performs scheduling is needed, and the NR NB 3-10 takes charge of the same. One NR gNB generally controls a plurality of cells. In order to implement high-speed data transmission when compared to the currently used LTE, a bandwidth greater than or equal to the legacy maximum bandwidth may be needed, and an orthogonal frequency division multiplexing (OFDM) is used as a radio access technology, and beamforming technology is additionally used. Also, an adaptive modulation & coding (AMC) scheme that determines a modulation scheme and a channel coding rate may be applied based on the channel state of a UE. The NR CN 3-05 may support mobility, configures a bearer, or configures quality of service (QoS). The NR CN 3-05 is a device that is in charge of various control functions in addition to a mobility management function associated with the UE 3-15, and may be connected to a plurality of base stations. Also, the next generation mobile communication system may interoperate with the legacy LTE system, and the NR CN 3-05 may be connected to the MME 3-25 via a network interface. The MME 3-25 may be connected to the eNB 3-30 which is a legacy base station.

Figure 4:
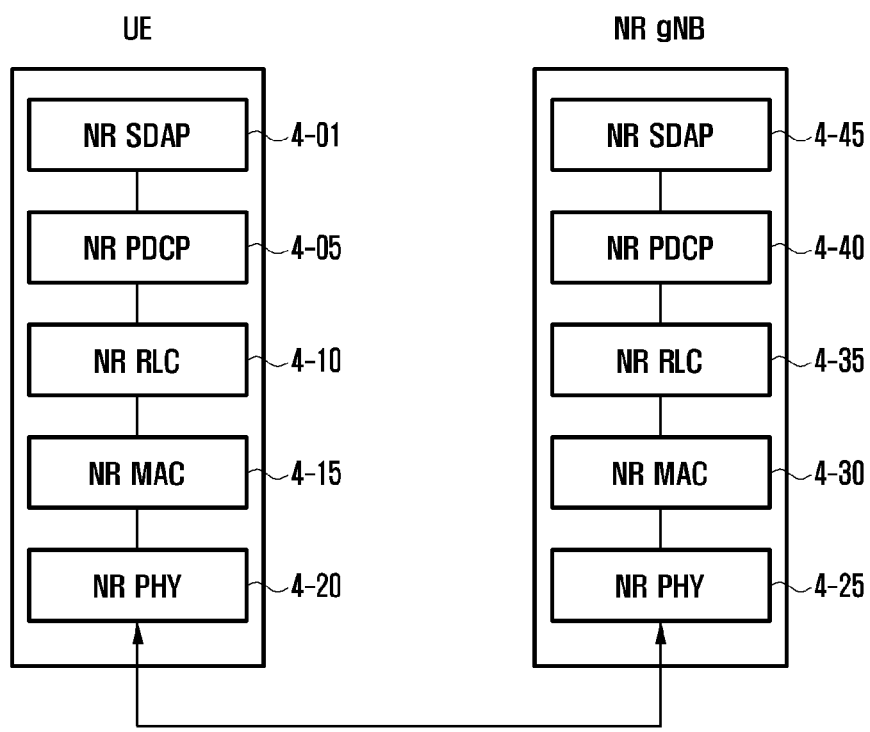
FIG. 4 is a diagram illustrating a structure of a radio protocol in a next generation mobile communication system according to an embodiment of the disclosure.

FIG. 4 is a diagram illustrating a structure of a radio protocol in a next generation mobile communication system according to an embodiment of the disclosure.

Referring to FIG. 4, a radio protocol of a next generation mobile communication system is configured with an NR service data adaptation protocol (SDAP) 4-01 and 4-45, an NR PDCP 4-05 and 4-40, an NR RLC 4-10 and 4-35, and an NR MAC 4-15 and 4-30 for each of a UE and an NR base station.

The main functions of the NR SDAP 4-01 and 4-45 may include a part of the functions as follows:
 Transfer of user data (Transfer of user plane data)
 Mapping between a QoS flow and a data radio bearer (DRB) for both downlink (DL) and uplink (UL)
 Marking QoS flow identify (ID) for both DL and UL (Marking QoS flow ID in both DL and UL packets)
 Mapping reflective QoS flow to DRB for the UL SDAP PDUs (Reflective QoS flow to DRB mapping for the UL SDAP PDUs)

A UE may receive, via an radio resource control (RRC) message, a configuration associated with whether to use a header of the SDAP layer device or whether to use a function of the SDAP layer device, for each PDCP layer device, or for each bearer, or for each logical channel When a SDAP header is configured, the UE is directed, by a one-bit non-access stratum (NAS) reflective QoS indicator (NAS reflective QoS) and a one-bit AS reflective QoS indicator (AS reflective QoS) of the SDAP header, to update or reconfigure mapping information between a data bearer and a QoS flow of an uplink and a downlink. The SDAP header may include QoS flow ID information indicating QoS. The QoS information may be used as data processing priority for supporting smooth services, scheduling information or the like.

The main functions of the NR PDCP 4-05 and 4-40 may include a part of the functions as follows:
 Header compression and decompression: ROHC only
 Transfer of user data
 In-sequence delivery (In-sequence delivery of upper layer PDUs)
 Out-of-sequence delivery (Out-of-sequence delivery of upper layer PDUs)
 Reordering (PDCP PDU reordering for reception)
 Duplicate detection (Duplicate detection of lower layer SDUs)
 Retransmission (Retransmission of PDCP SDUs)
 Ciphering and deciphering
 Timer-based SDU discard (Timer-based SDU discard in uplink)

The reordering function of the NR PDCP 4-05 and 4-40 may indicate a function of reordering PDCP PDUs received from a lower layer sequentially according to a PDCP sequence number (SN). The reordering function may include a function of sequentially transferring reordered data to a higher layer, may include a function of immediately transferring data without considering order, may include a function of performing reordering and recording lost PDCP PDUs, may include a function of reporting the states of lost PDCP PDUs to a transmission side, and may include a function of requesting retransmission of lost PDCP PDUs.

The main functions of the NR RLC 4-10 and 4-35 may include a part of the functions as follows:
 Transfer of data (Transfer of upper layer PDUs)
 In-sequence delivery (In-sequence delivery of upper layer PDUs)
 Out-of-sequence delivery (Out-of-sequence delivery of upper layer PDUs)
 ARQ (Error correction through ARQ)
 Concatenation, segmentation, and reassembly (Concatenation, segmentation and reassembly of RLC SDUs)
 Re-segmentation (Re-segmentation of RLC data PDUs)
 Reordering (Reordering of RLC data PDUs)
 Duplicate detection
 Error detection (Protocol error detection)
 RLC SDU discard
 RLC re-establishment The in-sequence delivery function of the NR RLC device may indicate a function of sequentially transferring RLC SDUs, received from a lower layer, to a higher layer. The in-sequence delivery function may include a function of reassembling RLC SDUs, which are segmented from an originally single RLC SDU, and transferring an RLC SDU, may include a function of reordering received RLC PDUs based on an RLC sequence number (SN) or PDCP sequence number (SN), may include a function of performing reordering and recording lost RLC PDUs, may include a function of reporting the states of lost RLC PDUs to a transmission side, may include a function of requesting retransmission of lost RLC PDUs, may include a function of sequentially transferring, to a higher layer, only RLC SDUs before a lost RLC SDU if a lost RLC SDU exists, may include a function of sequentially transferring, to a higher layer, all RLC SDU received before a timer starts if the timer expires although a lost RLC SDU exists, or may include a function of sequentially transferring, to a higher layer, all RLC SDUs received up to date, if a predetermined timer expires, although a lost RLC SDU exists. The RLC PDUs may be processed in order of arrival (irrespective of a sequence number) and may be transferred to a PDCP device randomly (out-of sequence delivery). In the case of segments, a single RLC PDU is reconfigured by receiving segments which are stored in a buffer or are to be received in the future, and the RLC PDU may be transferred to the PDCP device. The NR RLC layer 4-10 and 4-35 may not include a concatenation function, and the function may be performed by the NR MAC layer 4-15 and 4-30 or may be replaced with the multiplexing function of the NR MAC layer 4-10 and 4-35.

The out-of-sequence deliver function of the NR RLC device may indicate a function of immediately transferring RLC SDUs, received from a lower layer, to a higher layer in any order. The out-of sequence delivery function may include a function of reassembling RLC SDUs which are segmented from an originally single RLC SDU, and transferring an RLC SDU, and may include a function of storing an RLC SN or PDCP SN of received RLC PDUs, performing reordering, and recording lost RLC PDUs.

The NR MAC layer 4-15 and 4-30 may be connected to a plurality of NR RLC layer devices configured for a single UE, and the main functions of the NR MAC 4-15 and 4-30 may include a part of the functions as follows:

Mapping (Mapping between logical channels and transport channels)
Multiplexing/demultiplexing (Multiplexing/demultiplexing of MAC SDUs)
Scheduling information reporting
HARQ (Error correction through HARQ)
Priority handling between logical channels (Priority handling between logical channels of one UE)
Priority handling between UEs (Priority handling between UEs by means of dynamic scheduling)
MBMS service identification
Transport format selection
Padding The NR PHY layer 4-20 and 4-25 may perform an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

In the next generation mobile communication system, a UE performs frequency measurement while performing a cell selection or reselection procedure in an RRC idle mode or RRC inactive mode. The above frequency measurement performed while performing the cell selection or reselection procedure may refer to an intra-frequency measurement or a serving cell or Pcell measurement for frequencies set by a gNB or broadcasted in a camping cell. However, an inter-frequency measurement is not performed except the intra-frequency measurement or serving cell measurement, and a result of the frequency measurement is not separately reported to a network. However, when frequency measurement configuration information of the RRC idle mode or RRC inactive mode is set in an RRC message (e.g., an RRCRelease message) by the gNB or received through system information, or when supporting the frequency measurement configuration information of the RRC idle mode or RRC inactive mode is indicated in the system information of the serving cell or camping cell, the UE may also perform the inter-frequency measurement procedure. If the UE has stored a valid measurement result that satisfies a predetermined condition, the UE may quickly report the frequency measurement result when establishing a connection with the network.

In addition, the UE may receive frequency measurement configuration information and perform a frequency measurement procedure even in an RRC connected mode, as follows. The frequency measurement configuration information of the RRC connected mode may be set only in an RRC message (e.g., RRCReconfiguration message), whereas the frequency measurement configuration information of the RRC idle mode or RRC inactive mode may be set to the UE through an RRC message (e.g., an RRCRelease message) or broadcasted in system information. Particularly, in case of setting the frequency measurement configuration information of the RRC idle mode or RRC inactive mode through the RRC message (unlike information set in the system information), a duration value or timer value specifying a duration for the UE to measure frequencies may be set, and area information (e.g., cell identifier list information for each frequency) specifying an area for the UE to measure frequencies may be set.

Also, the UE may receive the frequency measurement configuration information and perform the frequency measurement procedure even in the RRC connected mode, as follows. When the UE finds and camps on a suitable cell through a cell reselection procedure and then transitions to the RRC connected mode through an RRC connection setup procedure, the gNB may set, to the RRC connected mode UE, which frequencies (e.g., a frequency list) or which frequency bands are to be measured, which order is to be used for measurement through the priority setting for each frequency, which beam is to be measured, which filtering method is to be used for measuring frequency strength (e.g., an L1, L2, or L3 filtering method, or which calculation method and which coefficient are to be used for measurement), which event or condition is to be applied for starting the frequency measurement, which criterion is to be used for the frequency measurement in comparison with a current serving cell (or a currently camping frequency), which event or condition is to be applied for reporting a result of the frequency measurement, which criterion or condition needs to be satisfied for reporting the frequency in comparison with a current serving cell (or a currently camping frequency), or which period is to be applied for reporting the frequency measurement result. The UE measures frequencies in accordance with the above frequency configuration set by the gNB, and reports the frequency measurement result to the gNB in accordance with the corresponding event or condition. Then, using the frequency measurement result received from the UE, the gNB may determine whether to apply the CA technology or the DC technology to the UE.

Disclosed herein is a method that the UE performs the frequency measurement in the RRC idle mode or RRC inactive mode before transitioning to the RRC connected mode in the next generation mobile communication system, the UE sends to the gNB an indicator indicating that there is a measurement result when establishing a connection with the network, or the gNB requests the UE to report the measurement result, and then the UE enters the RRC connected mode and quickly reports the frequency measurement result. Accordingly, the gNB may quickly configure the CA technology or the DC technology to the UE, based on the result of being measured by the UE in the RRC idle mode or RRC inactive mode.

Specifically, when enabling the RRC connected mode UE establishing the connection with the network to transition to the RRC idle mode or RRC inactive mode, the gNB may set, to the UE through the RRC message, frequency information (or frequencies), time (or duration) information, and/or area information (or cell list) to be used for frequency measurement in the RRC idle mode or RRC inactive mode, and may also instruct the UE to perform the frequency measurement in the RRC idle mode or RRC inactive mode. In addition, the UE may acquire system information of a newly camping cell while performing a cell reselection operation whenever moving, and based on the system information, may perform a procedure of continuing or terminating the frequency measurement in the RRC idle mode or RRC inactive mode, extending a measurement duration (e.g., restarting a timer), reporting the frequency measurement result, discarding the frequency measurement result, or updating the frequency configuration information.

In the disclosure, a bearer may include a signaling radio bearer (SRB) and a data radio bearer (DRB). In addition, a UM DRB indicates a DRB using an RLC layer device operating in an unacknowledged mode (UM), and an AM DRB indicates a DRB using an RLC layer device operating in an acknowledged mode (AM).

Figure 5:
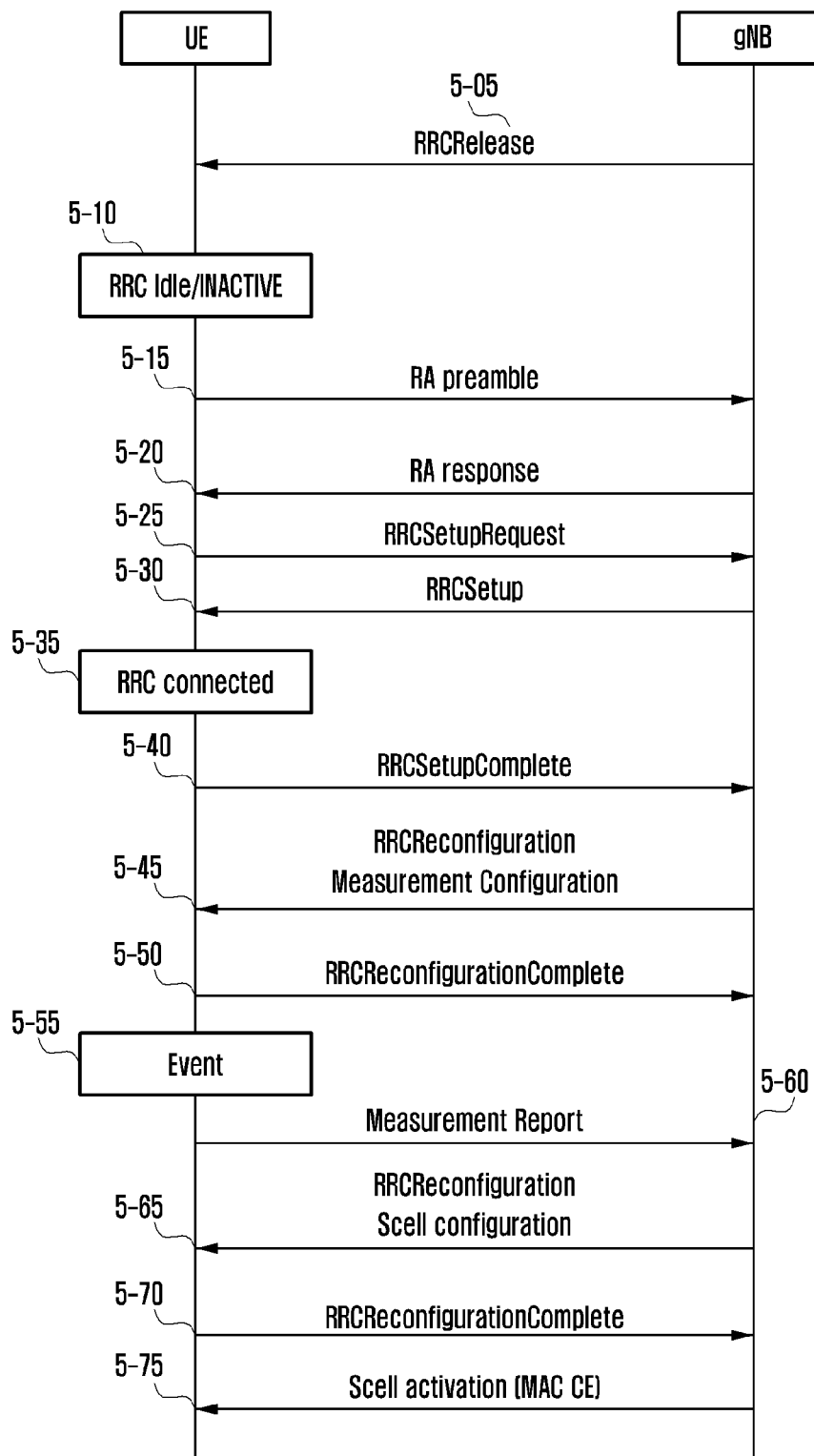
FIG. 5 is a diagram illustrating a procedure of a terminal to transition from an RRC idle mode or an RRC inactive mode to an RRC connected mode and configure a carrier aggregation technology in a next generation mobile communication system according to an embodiment of the disclosure.

FIG. 5 is a diagram illustrating a procedure of a terminal to transition from an RRC idle mode or an RRC inactive mode to an RRC connected mode and configure a carrier aggregation technology in a next generation mobile communication system according to an embodiment of the disclosure.

In FIG. 5, a base station (hereinafter, gNB) may transition a terminal (hereinafter, UE) of the RRC connected mode, which has established a connection with a network, to the RRC idle mode or the RRC inactive mode for a predetermined reason. The predetermined reason may be a lack of scheduling resources of the gNB or the suspension of data transmission/reception with the UE for a predetermined time.

The gNB may transmit an RRCRelease message to the UE and thereby instruct the UE to transition to the RRC idle mode or the RRC inactive mode (5-05). According to an embodiment, an indicator (suspend-config) contained in the RRCRelease message may instruct the UE to transition to the RRC inactive mode, and if the indicator (suspend-config) is not contained in the RRCRelease message, the UE may transition to the RRC idle mode.

The UE that transitions to the RRC idle mode or the RRC inactive mode may perform a random access procedure when a network connection is required for a predetermined reason, receive a random access response, request an RRC connection setup, receive an RRC message, and establish an RRC connection (5-10, 5-15, 5-20, 5-25, 5-30, 5-35, and 5-40).

The UE establishes backward transmission synchronization with the gNB through the random access procedure and transmits an RRCSetupRequest message to the gNB (5-25). The RRCSetupRequest message may contain an identifier of the UE, a cause for establishing the connection (establishmentCause), and the like.

The gNB transmits an RRCSetup message so that the UE establishes the RRC connection (5-30). The RRCSetup message may contain at least one of configuration information for each logical channel, configuration information for each bearer, configuration information for a PDCP layer device, configuration information for an RLC layer device, and configuration information for a MAC layer device.

The RRCSetup message may allocate a bearer identifier (e.g., an SRB identifier or a DRB identifier) to each bearer and indicate configuration of a PDCP layer device, an RLC layer device, a MAC layer device, and/or a PHY layer device for each bearer. In addition, the RRCConnectionSetup message may set a length (e.g., 12 bits or 18 bits) of a PDCP serial number used in the PDCP layer device for each bearer, and may set a length (e.g., 6 bits, 12 bits, or 18 bits) of an RLC serial number used in the RLC layer device. Also, the RRCConnectionSetup message may indicate whether to use header compression and decompression protocols in the uplink or downlink for each PDCP layer device for each bearer, and may indicate whether to perform an integrity protection or verification procedure. Further, it may indicate whether to perform out-of-order delivery in the PDCP layer device.

The UE establishing the RRC connection transmits an RRCSetupComplete message to the gNB (5-40). The RRCSetupComplete message may contain a control message, called SERVICE REQUEST, in which the UE requests a bearer setup for a given service from AMF or MME. The gNB may transmit the SERVICE REQUEST message contained in the RRCSetupComplete message to the AMF or MME, and the AMF or MME may determine whether to provide the service requested by the UE.

If determining to provide the UE-requesting service, the AMF or MME transmits a message called INITIAL CONTEXT SETUP REQUEST to the gNB. The INITIAL CONTEXT SETUP REQUEST message may contain information such as quality of service (QoS) information to be applied to setting the DRB, and security-related information (e.g., security key, security algorithm) to be applied to the DRB.

The gNB transmits and receives a SecurityModeCommand message and a SecurityModeComplete message to and from the UE so as to establish security, and when the security setting is completed, the gNB transmits an RRCConnectionReconfiguration message to the UE (5-45).

The RRCConnectionReconfiguration message may allocate a bearer identifier (e.g., an SRB identifier or a DRB identifier) to each bearer and indicate configuration of a PDCP layer device, an RLC layer device, a MAC layer device, and/or a PHY layer device for each bearer. In addition, the RRCConnectionReconfiguration message may set a length (e.g., 12 bits or 18 bits) of a PDCP serial number used in the PDCP layer device for each bearer, and may set a length (e.g., 6 bits, 12 bits, or 18 bits) of an RLC serial number used in the RLC layer device. Also, the RRCConnectionSetup message may indicate whether to use header compression and decompression protocols in the uplink or downlink for each PDCP layer device for each bearer, and may indicate whether to perform an integrity protection or verification procedure. Further, it may indicate whether to perform out-of-order delivery in the PDCP layer device.

In addition, the RRCConnectionReconfiguration message may contain configuration information of the DRB for which user data is to be processed, and the UE sets the DRB by applying the above information and then transmits an RRCConnectionReconfigurationComplete message to the gNB (5-50). The gNB completing the DRB setup with the UE may transmit an INITIAL CONTEXT SETUP COMPLETE message to the AMF or MME and thereby complete the connection (5-50).

When the above process is completed, the UE transmits and receives data to and from the gNB through a core network (5-55 and 5-60). According to some embodiments, the data transmission process is mainly composed of three operations: RRC connection setup, security setup, and DRB setup. In addition, for a certain reason, the gNB may transmit an RRC Connection Reconfiguration message to the UE so as to newly perform, add, or change setup (5-65).

The RRCConnectionReconfiguration message may contain frequency measurement configuration information (e.g., a list of frequencies to be measured, a duration of measuring a frequency, a condition of measuring a frequency, a condition of reporting a frequency after frequency measurement, a cell identifier for reporting a frequency, and/or the like).

The UE performs frequency measurement in accordance with the frequency measurement configuration information, and may report a result of the frequency measurement to the gNB (5-60) when a predetermined condition is satisfied (e.g., if the signal strength of a specific frequency is better than a certain reference (e.g., a threshold value), or if the signal strength of a current serving cell (frequency) is smaller than a certain reference (e.g., a threshold value)).

Upon receiving the frequency measurement result, the gNB may insert Scell configuration information in the RRCReconfiguration message based on the frequency measurement result (5-65) and transmit it to the UE to configure the carrier aggregation (CA) technology to the UE. Alternatively, the gNB may insert secondary cell group configuration information in the RRCReconfiguration message (5-65) and transmit it to the UE to configure a dual connectivity (DC) technology to the UE.

In case of configuring the CA technology to the UE, the gNB may transition Scells to an active, inactive, or idle state by using a MAC control element (MAC CE).

The procedure for the gNB to configure the CA technology or the DC technology to the UE may be summarized as follows. First, the UE establishes a connection with the gNB, and the gNB sets frequency measurement configuration information to the RRC connected mode UE. Then, the UE performs frequency measurement based on the frequency measurement configuration information and reports a frequency measurement result to the gNB. In addition, the gNB may set configuration information for additional Scell, as an RRC message, to configure the CA technology to the UE based on the frequency measurement result of the UE, and may enable such Scells to be active, idle, or inactive through MAC CE. Also, the gNB may set secondary cell group configuration information to configure the DC technology to the UE based on the frequency measurement result of the UE.

As described above, when the gNB configures the CA technology or the DC technology to the UE, the UE is required to enter the RRC connected mode, receive the frequency measurement configuration information, perform the frequency measurement, and report the measurement result. Therefore, measurement reporting is performed very late, so that the CA technology or the DC technology is configured late. Accordingly, in order to improve this issue, the disclosure proposes a method for the UE to efficiently perform the frequency measurement in the RRC idle mode or RRC inactive mode and report the frequency measurement result as soon as a connection with a network is established.

Figure 6:
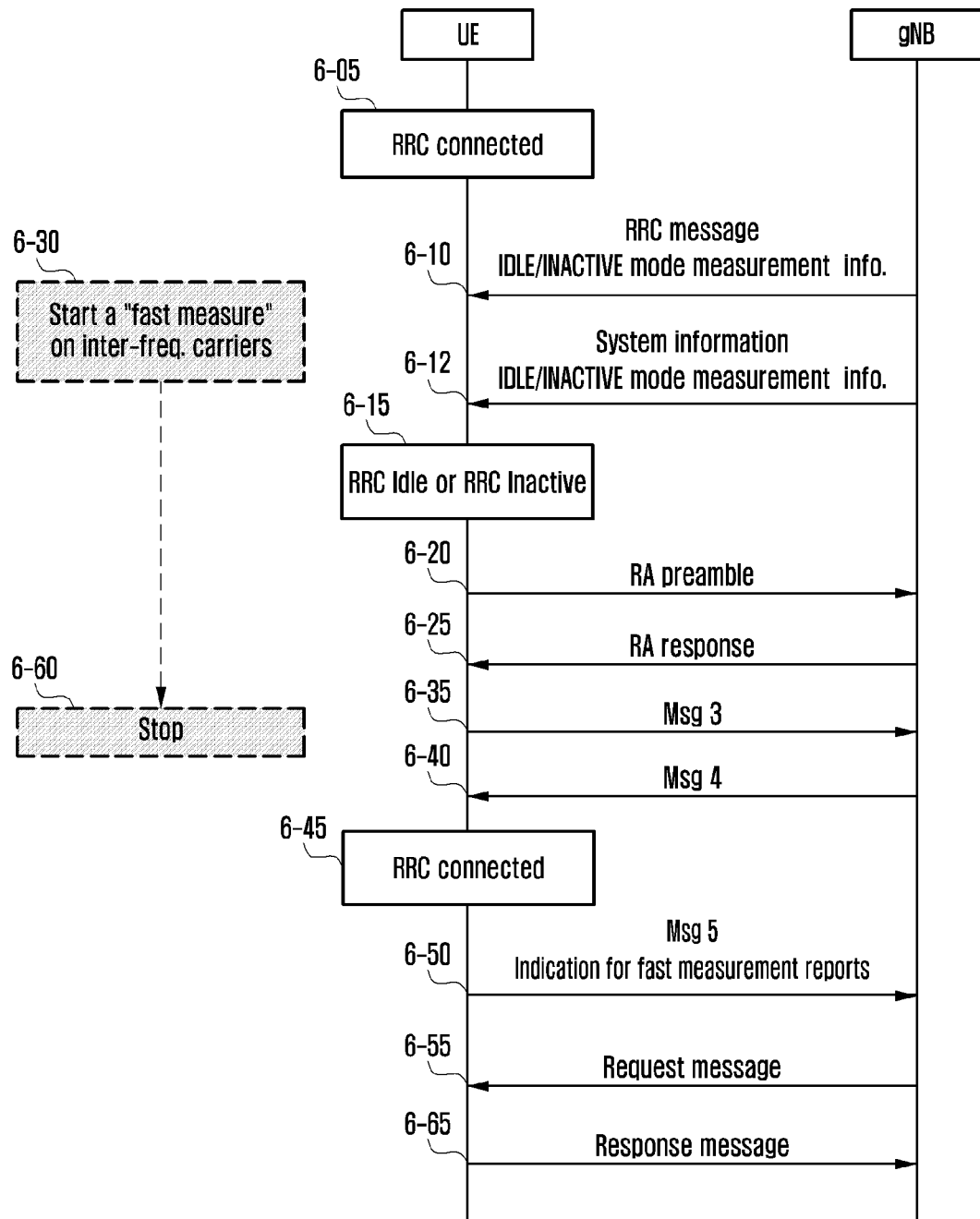
FIG. 6 is a diagram illustrating a first embodiment enabling a terminal to perform an early measurement in an RRC idle mode or an RRC inactive mode and make an early measurement report in a next generation mobile communication system according to an embodiment of the disclosure.

FIG. 6 is a diagram illustrating a first embodiment enabling a terminal to perform an early measurement in an RRC idle mode or an RRC inactive mode and make an early measurement report in a next generation mobile communication system according to an embodiment of the disclosure.

In the first embodiment of the disclosure, a base station (gNB) may set a plurality of frequency measurement groups when setting frequency measurement configuration information through the RRCRelease message or system information such that a terminal (UE) performs frequency measurement.

According to the first embodiment, the UE capable of performing frequency measurement in the RRC idle mode or RRC inactive mode and quickly reporting a frequency measurement result may be the UE corresponding to one or more of the following cases.

1. Any UE whose capability supports a method for early frequency measurement and early frequency measurement result report in the RRC idle mode or RRC inactive mode.

2. Among RRC idle mode or inactive mode UEs, any UE that receives configuration information for instructing frequency measurement in the RRC idle mode or RRC inactive mode when the gNB transitions the UE from the RRC connected mode to the RRC idle mode or RRC inactive mode through an RRC message. For example, any UE to which frequency configuration information, measurement duration (e.g., a timer value), or area configuration information (e.g., a list of cell identifiers) for the frequency measurement in the RRC idle mode or RRC inactive mode is set.

In FIG. 6, the UE in the RRC connection mode (6-05) may transition to the RRC idle mode or RRC inactive mode (6-15) by the gNB for a predetermined reason (e.g., in case where there is no data transmission/reception for a certain time). When transitioning the mode of the UE, the gNB may transmit an RRC message (6-10). For example, the gNB may transmit an RRCRelease message containing an indicator (suspend-config) instructing the UE to transition to the RRC inactive mode, or may transmit an RRCRelease message containing no indicator (suspend-config) to instruct the UE to transition to the RRC idle mode. The above RRC message (e.g., the RRCRelease message) may contain first frequency configuration information to be applied when the UE performs early measurement in the RRC idle mode or RRC inactive mode. The first frequency configuration information may have information about frequencies to be measured and a first timer value. The first timer value may indicate a duration or a timer value (e.g., T331) for performing frequency measurement in the RRC idle mode or RRC inactive mode. When the RRCRelease message instructs the frequency measurement in the RRC idle mode or RRC inactive mode, the UE may perform the frequency measurement while a timer is running, and may stop the frequency measurement when the timer expires.

A condition for starting the frequency measurement when the UE performs the early measurement in the RRC idle mode or RRC inactive mode may include at least one of the following conditions (6-30).

1. If the received RRCRelease message contains an indicator to perform frequency measurement in the RRC idle mode or RRC inactive mode, and if frequency information to be measured and a duration (e.g., a timer value) for measuring frequencies are set, the UE may start a timer and perform frequency measurement according to the frequency information.

2. If the received RRCRelease message contains an indicator to perform frequency measurement in the RRC idle mode or RRC inactive mode, and if only a duration (e.g., a timer value) for measuring frequencies is set without frequency information, the UE may start a timer, perform a cell selection or reselection procedure, and acquire system information from a serving cell on which the UE camps (6-12). The system information may contain second frequency configuration information to be applied when the UE performs the early measurement in the RRC idle mode or RRC inactive mode. If the frequency information to be measured in the RRC idle mode or RRC inactive mode is broadcasted in the system information, the UE may perform the frequency measurement according to the frequency information. If new second frequency configuration information for the UE to measure in the RRC idle mode or RRC inactive mode is broadcasted in system information of another cell to and on which the UE moves and newly camps, the UE may perform the frequency measurement in accordance with the new second frequency configuration information.

As described above, the UE may start and perform the frequency measurement in the RRC idle mode or RRC inactive mode. If the UE moves to and camps on a new cell and acquires system information, and if the acquired system information has no indicator that frequency measurement is supported in the RRC idle mode or RRC inactive mode, the UE may stop the frequency measurement while still operating a first timer. After moving to another cell, if system information of that cell has an indicator that frequency measurement is supported in the RRC idle mode or RRC inactive mode, and if the first timer is still running, the UE may restart the frequency measurement by using first frequency configuration information, set in the RRCRelease message as suggested above, or second system information in the system information. In the system information, an indicator indicating LTE frequency measurement support and/or an indicator indicating NR frequency measurement support may be defined.

When one or more of the above conditions is/are satisfied, the UE may start the early measurement in the RRC idle mode or RRC inactive mode. While performing the frequency measurement, the RRC idle mode or RRC inactive mode UE stores a valid measurement result that satisfies a predetermined condition. Based on the configuration information set in the RRCRelease message or broadcasted in the system information, the UE may determine whether or not the frequency measurement result that meets the predetermined condition is valid.

In addition, when it is necessary to establish a connection with the network for data transmission and reception, the UE may transmit a message 3 (e.g., an RRCSetupRequest or RRCResumeRequest message) to the gNB while performing a random access procedure (6-35), recognize the success of the random access procedure by receiving a message 4 (e.g., an RRCSetup or RRCResume message) from the gNB (6-40), and transition to the RRC connected mode (6-45).

If system information (e.g., SIB2) received before the UE establishes a connection in the current cell contains an indicator indicating that frequency measurement in the RRC idle mode or RRC inactive mode is supported, or an indicator indicating that a frequency measurement result in the RRC idle mode or RRC inactive mode can be received, and if the UE has a valid frequency measurement result, the UE may transmit, to the gNB, a message 5 (e.g., an RRCSetupComplete message or an RRCResumeComplete message) indicating that the UE has the frequency measurement result in the RRC idle mode or RRC inactive mode.

For example, when the UE has a valid frequency measurement result that satisfies a predetermined condition, the UE may transmit the message 5 (e.g., RRC Setup Complete or RRC Resume Complete) that contains an indicator indicating that the early measurement has been performed in the RRC idle mode or RRC inactive mode and there is a frequency measurement result to be reported. For this indicator contained in the message 5, a new indicator for indicating that there is a early frequency measurement result may be defined, or an indicator that has already defined in the RRC message (RRC Setup Complete or RRC Resume Complete) to indicate that there is useful information in the UE may be reused (6-50). When the message 5 indicates having a frequency measurement result of the RRC idle mode or RRC inactive mode, an indicator for a measurement result for LTE frequencies and an indicator for a measurement result for NR frequencies may be respectively defined and indicated.

Upon recognizing, from the message 5, that the UE has performed the early measurement in the RRC idle mode or RRC inactive mode and there is a measurement result to be reported, the gNB may transmit, to the UE, a message requesting a measurement result report so as to quickly receive the frequency measurement result (6-55). For example, the gNB may newly define a UEinformationRequest with a DL-DCCH message and, by using this message, request the frequency measurement result report from the UE. Upon receiving the message, the UE may report an early frequency measurement result to the gNB (6-65). For example, upon receiving the message, the UE may newly define a UEInformationResponse message with a UL-DCCH message and, by using this message, report the frequency measurement result. The frequency measurement result may include a measurement result of a serving cell/frequency (e.g., NR-SS RSRP/RSRQ), a measurement result of a neighboring cell/frequency around a serving cell/frequency, a measurement result of a neighboring cell/frequency the UE can measure, a measurement result of a cell/frequency instructed to measure, and/or the like. Alternatively, the gNB may define an indicator in an RRCReconfiguration message and, by using it, request the frequency measurement result from the UE. Upon receiving the message, the UE may report the early frequency measurement result to the gNB (6-65). For example, upon receiving the message, the UE may report the frequency measurement result by using an RRCReconfigurationComplete message. Alternatively, the UE may define new fields for reporting the frequency measurement result in the UL-DCCH message and use them.

Figure 7:
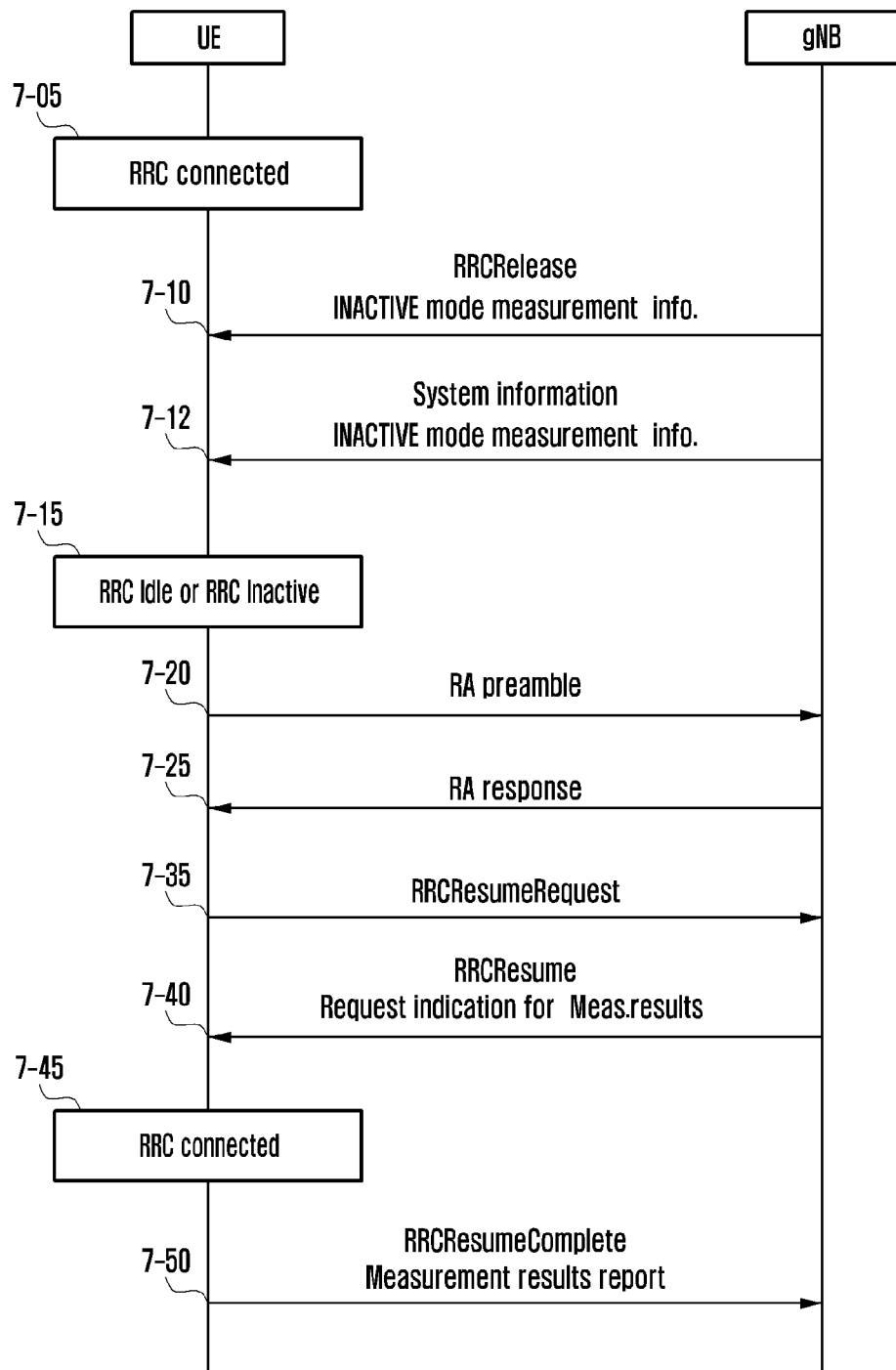
FIG. 7 is a diagram illustrating a second embodiment enabling a terminal to perform an early measurement in an RRC idle mode or an RRC inactive mode and make an early measurement report in a next generation mobile communication system according to an embodiment of the disclosure.

FIG. 7 is a diagram illustrating a second embodiment enabling a terminal to perform an early measurement in an RRC idle mode or an RRC inactive mode and make an early measurement report in a next generation mobile communication system according to an embodiment of the disclosure.

The above-described first embodiment may be applied at least in part to the second embodiment of the disclosure, and the gNB may set, using an RRCRelease message, first frequency measurement configuration information to be applied when the UE performs frequency measurement in the RRC idle mode or RRC inactive mode. Based on the first frequency configuration information or the second frequency configuration information of the system information, the UE may perform frequency measurement in the RRC idle mode or RRC inactive mode. When the UE establishes a connection with a network for data transmission and reception, the gNB may transmit an RRC message (e.g., an RRCResume message) containing an indicator requesting a frequency measurement result to the UE. Upon receiving the indicator requesting the frequency measurement result, and upon having a valid frequency measurement result, the UE may construct an RRC message (e.g., an RRCResumeComplete message) with the valid frequency measurement result and transmit the message to the gNB to report the frequency measurement result.

In FIG. 7, when the RRC connected mode UE receives, from the gNB, the first frequency measurement configuration information together with an instruction to release an RRC connection and transition to the RRC idle mode or RRC inactive mode, the UE may perform frequency measurement for a time or duration set above in the RRC idle mode or RRC inactive mode. In addition, when the second frequency measurement configuration information for frequency measurement of the RRC idle mode or RRC inactive mode UE is broadcasted in a cell on which the UE camps through a cell reselection procedure, the UE may receive the broadcasted information and perform the frequency measurement.

When the UE attempts to re-establish a connection with the network in the RRC idle mode or RRC inactive mode, and when a cell for the connection supports reporting an early frequency measurement result (e.g., when the system information has a related indicator), the UE may perform a random access procedure, transmit a message 3 (e.g., RRCResumeRequest), and receive from the gNB a message 4 (e.g., RRCResume message) containing an indicator requesting to report the frequency measurement result (7-40). Upon receiving the indicator to report the frequency measurement result, and upon having a valid frequency measurement result, the UE may construct an RRC message (e.g., an RRCResumeComplete message) with the valid frequency measurement result and transmit the message to the gNB to report the frequency measurement result (7-50). Upon receiving the frequency measurement result, the gNB may transmit CA technology configuration information or DC technology configuration information when transmitting an RRC message (e.g., an RRCReconfiguration message) or MAC control information (MAC control element (MAC CE)) to the UE, thereby enabling the UE to quickly reactivate, change, or newly set the CA technology or the DC technology (7-40). It is therefore possible to perform the frequency measurement result reporting faster than in the first embodiment.

Meanwhile, disclosed hereinafter are details of the first frequency configuration information, set in the RRCRelease message by the gNB, and the second frequency configuration information broadcasted in the system information such that in the first or second embodiment the UE can save the battery and efficiently perform the frequency measurement procedure in the RRC idle mode or RRC inactive mode.

The first frequency configuration information, set in an RRC message (e.g., RRC connected mode frequency measurement is set in an RRCReconfiguration message, and RRC idle mode or RRC inactive mode frequency measurement is set in an RRCRelease message), may contain one or more of a plurality of the following configuration information types.

A first target frequency list for the LTE frequency measurement

A first target SSB (synchronization signal block) frequency list for the NR frequency measurement A list (containing a cell identifier) of target cells to be measured and reported for each frequency: When measuring the frequency, the UE may measure only a signal corresponding to a cell identifier contained in the cell list among cells operating at the frequency. Then, if given conditions are met, the UE may store a measurement result and report it to the network.

Threshold value information as a criterion to be measured and reported for each frequency: If a signal having a cell identifier contained in the cell list is measured with signal strength higher than the threshold, the UE may regard it as a valid measurement result, store it, and report the frequency measurement result when connected to the network later.

First configuration information for SSB measurement for each frequency: Auxiliary information that helps the UE to easily perform SSB measurement for each frequency may be set, and may include one or more of a plurality of configuration information types as follows.

smtc (SSB block Measurement Time Configuration) configuration information: Time configuration information for SSB measurement of frequency, including duration, offset, or periodicity in which the SSB is transmitted.

ssbSubcarrierSpacing configuration information: Information including frequency interval for SSB measurement ssb-ToMeasure configuration information: SSB identifier information measured among SSBs nrofSS-BlocksToAverage: Parameter information for deriving cell signal strength absThreshSS-BlocksConsolidation: Parameter information for deriving cell signal strength A first method for reporting frequency measurement for each frequency (e.g., an RSRP, an RSRQ, a beam measurement result, a beam identifier, a plurality of beam measurement results, or a plurality of beam identifiers): The type of a measurement result to be reported by the UE for each frequency or cell may be instructed. For example, instructing to report RSRP or RSRQ, instructing to report a beam measurement result as well, instructing to report a beam identifier with valid signal strength, or instructing to report a plurality of beam measurement results or a plurality of beam identifiers with valid signal strength may be possible. Further, it is possible to instruct to report a measurement result or beam identifier of a beam having the best signal strength.

First deriveSSB-IndexFromCell configuration information: If the indicator is set to true when intra-frequency measurement is performed, it means that when deriving SSB identifiers of SSB blocks in smtc configuration information of other cells to be measured in the frequency, timing of a current PCell or serving cell is usable as a reference (reference timing). Therefore, the UE can immediately know the SSB identifier of the frequency to be measured without reading a physical broadcast channel (PBCH), thereby saving UE power consumed in frequency measurement and enabling early measurement. If the indicator is set to false, the UE is required to synchronize with a cell of the frequency to be measured and derive each SSB identifier by reading the PBCH for SSB blocks. In addition, if the inter-frequency measurement needs to be performed because of the frequency to be measured, and if the indicator is set to true, this means that if any cell of the frequency to be measured is synchronized, the synchronized cell can be used as a reference timing when performing SSB measurement for the other cells of the frequency, and also means that an SSB identifier can be derived based on the timing. If the indicator is false, the UE can perform synchronization for each cell of the frequency and perform SSB measurement.

First area configuration information: This is configuration information for an area where the UE will perform frequency measurement in the RRC idle mode or RRC inactive mode, and may contain, for example, a cell list for each frequency (a list containing cell identifiers).

First timer (e.g., valid timer) value or duration: This is a timer indicating a duration during which the UE will perform frequency measurement in the RRC idle mode or RRC inactive mode. For example, when the first timer value or duration is set in the RRCRelease message, the UE starts the first timer and perform frequency measurement in the RRC idle mode or RRC inactive mode, based on the frequency configuration information set in the first frequency configuration information or the second frequency configuration information. Upon receiving the RRCSetup message or RRCResume message from the gNB when establishing a connection with the network, the UE may consider it as transitioning to the RRC connected mode and thereby stop the first timer. Also, when going outside the first area (e.g., validity area), the UE may stop the first timer. If the first timer is stopped, the UE may release the frequency configuration information, stop the frequency measurement, and/or discard the frequency measurement result.

Second timer value or duration: In order to confirm the validity of the frequency measurement result, the gNB may set the second timer value in the first frequency configuration information. The second timer may be used to indicate a duration for determining the validity of the frequency measurement result. It may be determined that the stored frequency measurement result value is valid only when the second timer is running. If the second timer expires, the stored frequency measurement result value may be discarded and not reported to the gNB. In addition, the second timer may be driven for each UE, and when the first timer indicating the frequency measurement duration expires or when the frequency measurement is stopped, the second timer may be started. When the second timer expires, the stored frequency measurement results may be determined to be no longer valid and thereby discarded. When the UE receives a request to report the frequency measurement result from the gNB or the UE tries to transmit the frequency measurement result to the gNB in an RRC message while the second timer is running, the second timer may be stopped. Also, the second timer may be driven for each frequency or cell, and when the first timer indicating the frequency measurement duration expires or when the frequency measurement is stopped, the new timer may be started. In another method, whenever the frequency measurement is performed for each cell or frequency and then a new frequency measurement result is stored for each cell or frequency, the second timer corresponding to each cell or frequency may be started or restarted. In addition, when the second timer expires, the stored frequency measurement results for the cell or frequency for which the second timer is running may be determined to be no longer valid and discarded. Also, when the UE receives a request to report the frequency measurement result from the gNB or the UE tries to transmit the frequency measurement result to the gNB in an RRC message while the second timer is running, the second timer may be stopped.

Reference frequency or cell list for SSB measurement for each frequency: This is configuration information for a frequency or cells synchronized with a current gNB or frequency which is a reference of timing when performing frequency measurement for a frequency or cells set in a frequency list for LTE frequency measurement or in a synchronization signal block (SSB) frequency list for NR frequency measurement. The UE may synchronize with one of frequencies or cells set in the reference frequency or cell list when frequency measurement configuration is performed, and then perform frequency measurement for other frequencies.

The second frequency configuration information set in the system information proposed herein may contain one or more of a plurality of the following configuration information types. Unlike the first frequency configuration information, the second frequency configuration information may not include the first timer configuration information, the first area configuration information, or the second timer configuration information.

A second target frequency list for the LTE frequency measurement (A frequency list for frequency measurement of the UE in the RRC idle mode or RRC inactive mode or measurement configuration information for neighboring cells or other frequencies useful for determining camp-on when the UE selects or reselects a cell)

A second target SSB (synchronization signal block) frequency list for the NR frequency measurement (A frequency list for frequency measurement of the UE in the RRC idle mode or RRC inactive mode or measurement configuration information for neighboring cells or other frequencies useful for determining camp-on when the UE selects or reselects a cell)

A list (containing a cell identifier) of target cells to be measured and reported for each frequency: When measuring the frequency, the UE may measure only a signal corresponding to a cell identifier contained in the cell list among cells operating at the frequency. Then, if given conditions are met, the UE may store a measurement result and report it to the network.

Threshold value information as a criterion to be measured and reported for each frequency: If a signal having a cell identifier contained in the cell list is measured with signal strength higher than the threshold, the UE may regard it as a valid measurement result, store it, and report the frequency measurement result when connected to the network later.

Second configuration information for SSB measurement for each frequency: Auxiliary information that helps the UE to easily perform SSB measurement for each frequency may be set, and may include one or more of a plurality of configuration information types as follows.
  second smtc (SSB block Measurement Time Configuration) configuration information: Time configuration information for SSB measurement of frequency, including duration, offset, or periodicity in which the SSB is transmitted.
  ssbSubcarrierSpacing configuration information: Information including frequency interval for SSB measurement
  ssb-ToMeasure configuration information: SSB identifier information measured among SSBs
  nrofSS-BlocksToAverage: Parameter information for deriving cell signal strength
  absThreshSS-BlocksConsolidation: Parameter information for deriving cell signal strength A second method for reporting frequency measurement for each frequency (e.g., an RSRP, an RSRQ, a beam measurement result, a beam identifier, a plurality of beam measurement results, or a plurality of beam identifiers): The type of a measurement result to be reported by the UE for each frequency or cell may be instructed. For example, instructing to report RSRP or RSRQ, instructing to report a beam measurement result as well, instructing to report a beam identifier with valid signal strength, or instructing to report a plurality of beam measurement results or a plurality of beam identifiers with valid signal strength may be possible. Further, it is possible to instruct to report a measurement result or beam identifier of a beam having the best signal strength.

Second deriveSSB-IndexFromCell configuration information: If the indicator is set to true when intrafrequency measurement is performed, it means that when deriving SSB identifiers of SSB blocks in smtc configuration information of other cells to be measured in the frequency, timing of a current PCell or serving cell is usable as a reference (reference timing). Therefore, the UE can immediately know the SSB identifier of the frequency to be measured without reading a physical broadcast channel (PBCH), thereby saving UE power consumed in frequency measurement and enabling early measurement. If the indicator is set to false, the UE is required to synchronize with a cell of the frequency to be measured and derive each SSB identifier by reading the PBCH for SSB blocks. In addition, if the inter-frequency measurement needs to be performed because of the frequency to be measured, and if the indicator is set to true, this means that if any cell of the frequency to be measured is synchronized, the synchronized cell can be used as a reference timing when performing SSB measurement for the other cells of the frequency, and also means that an SSB identifier can be derived based on the timing. If the indicator is false, the UE can perform synchronization for each cell of the frequency and perform SSB measurement.

Figure 8:
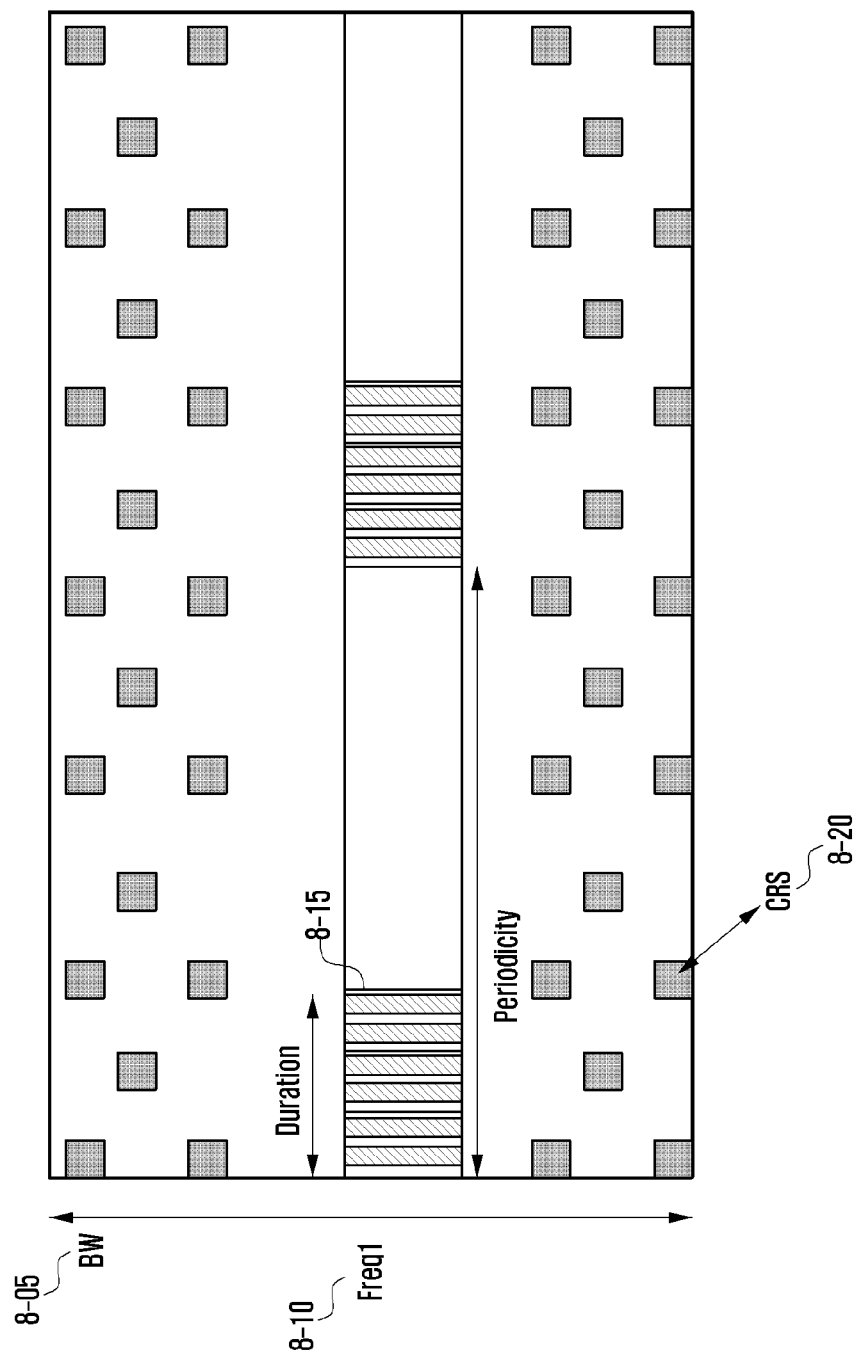
FIG. 8 is a diagram illustrating a signal structure when a terminal performs a frequency measurement for an LTE frequency in an RRC idle mode or an RRC inactive mode according to an embodiment of the disclosure.

FIG. 8 is a diagram illustrating a signal structure when a terminal performs a frequency measurement for an LTE frequency in an RRC idle mode or an RRC inactive mode according to an embodiment of the disclosure.

The LTE frequency may mean a frequency at which an LTE base station or an NR base station operates a cell with an LTE system, and a structure of a signal transmitted by the base station at the LTE frequency may be as shown in FIG. 8.

In FIG. 8, the base station may transmit a signal with a system bandwidth (BW) 8-05 for a first LTE frequency 8-10, and the UE has to read a signal according to the entire system bandwidth for the LTE frequency. The signal of the LTE frequency uses subcarrier spacing defined for all or most frequencies except for a broadcast service or a specific service, such as MBMS, and an SSB having the same periodicity, duration, or offset is transmitted at a predetermined frequency position (e.g., six physical resource blocks (PRBs) in the middle of the system bandwidth). A channel reference signal (CRS) 8-20 may be uniformly transmitted according to a predetermined rule.

The UE performing the RRC idle mode or RRC inactive mode frequency measurement proposed herein may first read a signal with the predetermined system bandwidth for the LTE frequency when performing measurement for the LTE frequency, and then find the SSB signal at the predetermined position. In addition, because the SSB signal uses subcarrier spacing defined for all or most frequencies and has the same periodicity, duration, or offset, the UE may quickly synchronize and find the SSB signal. Then, based on the SSB signal, the UE may read a master information block (MIB) signal and perform frequency measurement by measuring the CRS signal transmitted uniformly. Because the CRS is always uniformly transmitted in the LTE frequency, the UE has an advantage of quickly finding the CRS transmission resource and performing early frequency measurement. Alternatively, the UE may measure the SSB signal of the LTE frequency and perform frequency measurement. Alternatively, an indicator set in the RRCRelease message or the system information indicates, in case of the LTE frequency, whether to measure the SSB signal or the CRS signal, and the UE may perform frequency measurement according to the indicator. In addition, when a predetermined condition set in the first frequency information or the second frequency information is satisfied, a frequency measurement result may be reported based on a predetermined method.

Figure 9:
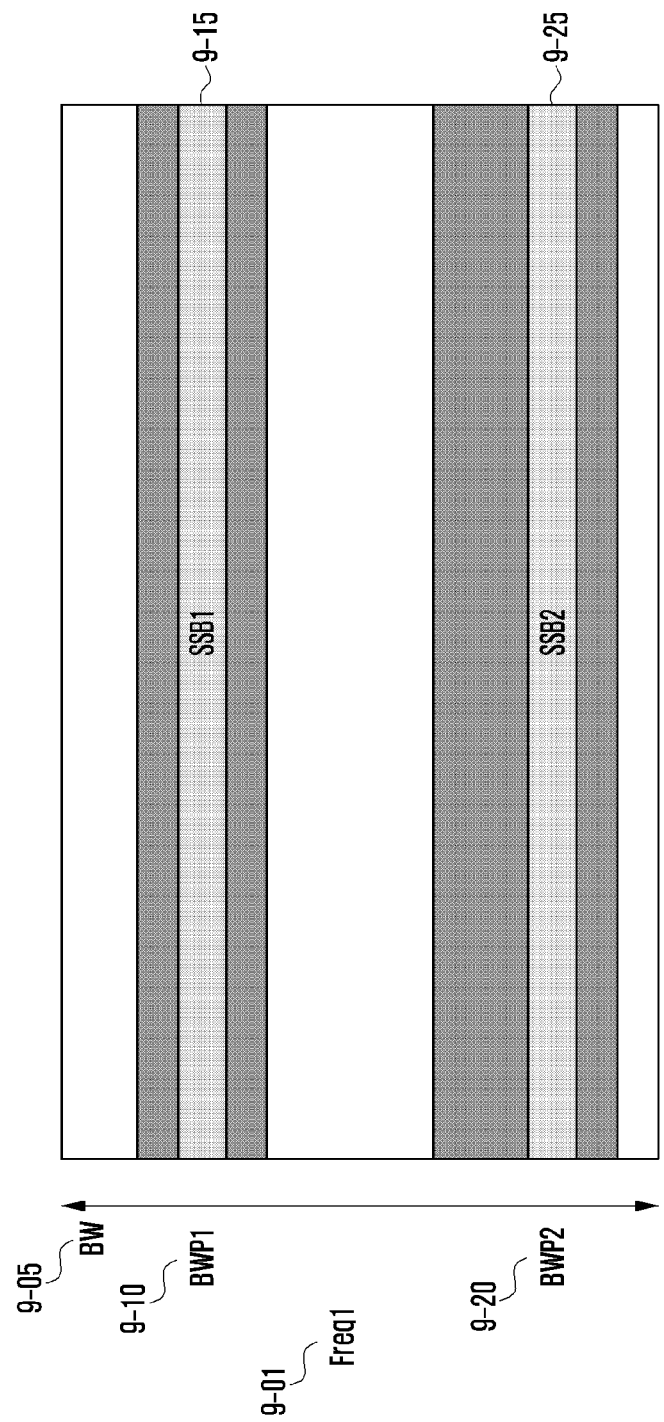
FIGS. 9 and 10 are diagrams each illustrating a signal structure when a terminal performs a frequency measurement for an NR frequency in an RRC idle mode or an RRC inactive mode according to an embodiment of the disclosure.
Figure 10:
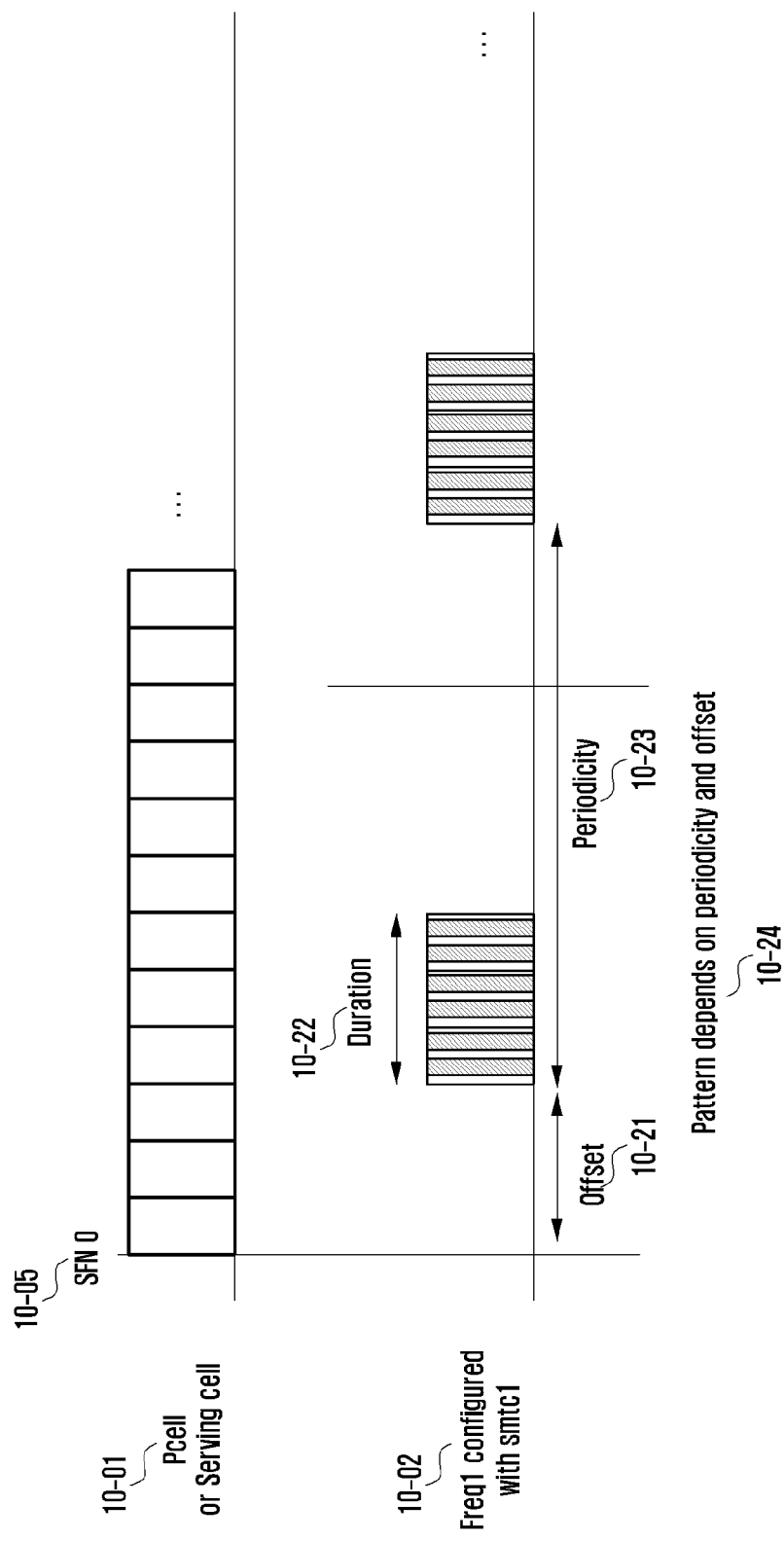

FIGS. 9 and 10 are diagrams each illustrating a signal structure when a terminal performs a frequency measurement for an NR frequency in an RRC idle mode or an RRC inactive mode according to an embodiment of the disclosure.

The NR frequency may mean a frequency at which an NR base station or an LTE base station operates a cell with an NR system, and a structure of a signal transmitted by the base station at the NR frequency may be as shown in FIGS. 9 and 10.

In FIG. 9, the base station may transmit a signal with a system bandwidth (BW) 9-05 for a first NR frequency 9-01, and the UE may not read a signal according to the entire system bandwidth for the NR frequency, but read a signal according to a partial bandwidth (BWP) 9-10 or 9-20. In the NR system, the system bandwidth for each frequency is very wide, so that if the UE reads all the system bandwidth, a large amount of battery consumption may occur, and the base station operates a plurality of partial bandwidths for each frequency. Accordingly, the UE may read a signal with a specific partial bandwidth (e.g., initial partial bandwidth) for each frequency, find an SSB to synchronize, and measure a signal for the SSB. When operating the frequency, the base station may use different subcarrier spacing for each partial bandwidth or for each frequency, and transmit SSBs having different periodicities, durations, or offsets at a predetermined frequency position (e.g., 12 PRBs in the middle of the partial bandwidth). In addition, unlike the LTE frequency, the CRS 8-20 may not be transmitted. Because the base station operates a plurality of partial bandwidths for the NR frequency having a very wide bandwidth, CRS transmission may incur enormous overhead for a signal transmitted by the base station. The SSB signal may or may not be transmitted for each partial bandwidth among the plurality of partial bandwidths. However, for a specific partial bandwidth (e.g., initial partial bandwidth), the SSB signal is always transmitted so that the RRC idle mode or RRC inactive mode UE can synchronize a signal with the specific partial bandwidth, acquire system information, and camp on.

As described above, in the NR frequency, different subcarrier spacing may be used for each frequency. Also, because SSB signals having different periodicities, durations, or offsets are transmitted, the UE may need to search the SSB signal for a long time to find the SSB signal for each frequency and to find different periodicities, durations, or offsets. As such, the UE needs to calculate the periodicity, duration, or offset of the SSB signal through complicated derivation, and thus, this procedure may cause a lot of battery consumption of the UE.

Therefore, as shown in FIG. 10, proposed in the disclosure is that smtc configuration information (or smtc configuration information or smtc information) for a frequency to be measured is set in first frequency configuration information set with an RRC message or in the second frequency configuration information broadcasted with system information such that the UE can easily perform frequency measurement. The smtc configuration information may contain an offset 10-21, duration 10-22, and/or periodicity 10-23 for the frequency to be measured, and a reference timing for these parameters 10-21, 10-22, and 10-23 contained in the smtc configuration information may be based on a timing 10-05 of a PCell or serving cell 10-01. For example, when the UE is configured to perform frequency measurement in the RRC connected, the UE may perform frequency measurement by applying the smtc information 10-21, 10-22, and 10-23 based on the timing (e.g., system frame number (SFN) 0) 10-05 of the current PCell 10-01. In another example, when the UE is configured to perform frequency measurement in the RRC idle mode or RRC inactive mode, the UE may perform frequency measurement by applying the smtc information 10-21, 10-22, and 10-23 based on the timing (e.g., SFN 0) 10-05 of the serving cell 10-01 on which the UE currently camps.

A detailed procedure for the UE to perform the frequency measurement based on the smtc information in the RRC connected mode is as follows.

Upon receiving the first frequency configuration information with an RRC message from the base station in the RRC connected mode, the UE prepares for frequency measurement for a frequency or cell set in the first frequency configuration information.

When attempting to measure a specific frequency in the frequency list set above, and when the smtc information is contained for the frequency, the UE applies the smtc information based on the timing of the PCell 10-01 to which a connection is currently established. That is, the UE may measure an SSB signal in an SSB signal transmission section by applying the offset 10-21 of the smtc information based on the SFN 0 of the current PCell 10-01 and also applying the duration 10-22 of the smtc information, and continuously measure an SSB signal at a time point of next SSB signal transmission by applying the periodicity 10-23 of the smtc information. Because the smtc information has been set for the frequency, the UE can perform immediately frequency measurement for the frequency, based on the smtc information and the reference timing of the current PCell. As such, there is no need to synchronize for the frequency, search for SSB signals from the beginning, and derive parameter values of periodicity, offset, and duration, so that it is possible to reduce battery consumption of the UE and enable early frequency measurement.

A detailed procedure for the UE to perform the frequency measurement based on the smtc information in the RRC idle mode or RRC inactive mode is as follows.

Upon receiving, in the RRC idle mode or RRC inactive mode, the first frequency configuration information with an RRC message or the second frequency configuration information with system information of a serving cell on which the UE camps through a cell selection or reselection procedure, the UE prepares for frequency measurement for a frequency or cell set in the first or second frequency configuration information.

When attempting to measure a specific frequency in the frequency list set above, and when the smtc information is contained for the frequency, the UE applies the smtc information based on the timing of the serving cell 10-01 on which the UE camps through the cell selection or reselection procedure in the RRC idle mode or RRC inactive mode. That is, the UE may measure an SSB signal in an SSB signal transmission section by applying the offset 10-21 of the smtc information based on the SFN 0 of the current serving cell 10-01 and also applying the duration 10-22 of the smtc information, and continuously measure an SSB signal at a time point of next SSB signal transmission by applying the periodicity 10-23 of the smtc information. Because the smtc information has been set for the frequency, the UE can perform immediately frequency measurement for the frequency, based on the smtc information and the reference timing of the current serving cell. As such, there is no need to synchronize for the frequency, search for SSB signals from the beginning, and derive parameter values of periodicity, offset, and duration, so that it is possible to reduce battery consumption of the UE and enable early frequency measurement.

The UE that performs frequency measurement in the RRC idle mode or RRC inactive mode is characterized by first finding the SSB signal for a specific partial bandwidth (e.g., initial partial bandwidth) of the NR frequency when performing measurement for the NR frequency. Because for different frequencies the SSB signal may use different subcarrier spacings and have different periodicities, durations, and/or offsets, the UE may continuously search for the SSB signal and derive parameter values of the periodicity, duration, and/or offset through calculation. Unlike measuring the CRS signal for the LTE frequency, for the NR frequency the UE performs the frequency measurement for the SSB signal based on the derived parameter values. In addition, when a predetermined condition set in the first or second frequency information is satisfied, the UE may report a frequency measurement result through a predetermined method.

The method for performing the frequency measurement proposed for the LTE frequency or the NR frequency may be extended and applied as a method for the UE to perform frequency measurement in the RRC idle mode, the RRC inactive mode, or the RRC connected mode.

In addition, when attempting to perform frequency measurement, the UE may perform the frequency measurement using the method proposed in FIG. 8 if the frequency to be measured is the LTE frequency, and also perform the frequency measurement using the method proposed in FIG. 9 or 10 if the frequency to be measured is the NR frequency.

Figure 11:
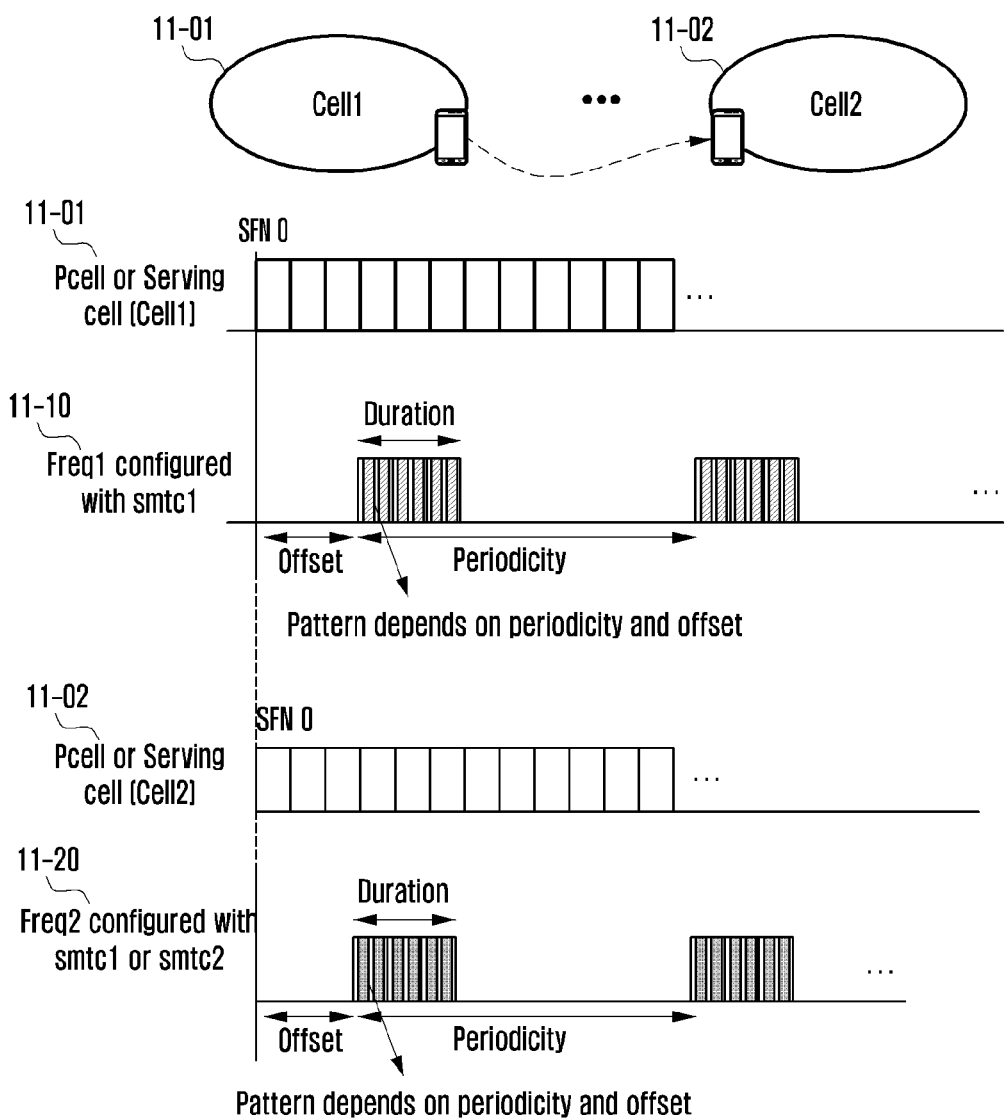
FIG. 11 is a diagram illustrating a method for a terminal to perform a frequency measurement in an RRC idle mode or an RRC inactive mode in a network that is synchronized between different frequencies or cells according to an embodiment of the disclosure.

FIG. 11 is a diagram illustrating a method for a terminal to perform a frequency measurement in an RRC idle mode or an RRC inactive mode in a network that is synchronized between different frequencies or cells according to an embodiment of the disclosure.

In FIG. 11, the UE that transmits/receives data in the RRC connected mode in a current cell 11-01 (first cell) may receive the RRCRelease message from the base station of the current cell 11-01, transition to the RRC idle mode or RRC inactive mode, and move while performing the cell selection or reselection procedure. The RRCRelease message may contain the first frequency configuration information. In addition, the RRC idle mode or RRC inactive mode UE may camp on a suitable cell through the cell selection or reselection procedure and acquire system information. The UE may receive the second frequency configuration information in the system information.

If the received RRCRelease message contains the first frequency configuration information, the UE may drive a timer by applying first timer value information of the first frequency configuration information and start early frequency measurement of the RRC idle mode or RRC inactive mode. In addition, if the first frequency configuration information contains first area configuration information, the UE may identify an identifier of the camping cell and determine whether to perform the early frequency measurement of the RRC idle mode or RRC inactive mode.

If the UE is in a service area of the first cell 11-01, the UE may perform the early frequency measurement of the RRC idle mode or RRC inactive mode, based on the first frequency configuration information received in the RRCRelease message or the second frequency configuration information broadcasted as the system information by the first cell 11-01. That is, when the UE attempts to measure a first frequency 11-10 in the frequency list set above, and when the first frequency configuration information received from the first cell contains first smtc configuration information or the second frequency configuration information received in the system information of the first cell contains second smtc configuration information, the UE applies such smtc configuration information, based on timing of a serving cell (i.e., the first cell) 11-01 on which the UE camps through the cell selection or reselection procedure in the RRC idle mode or RRC inactive mode. That is, the UE may measure an SSB signal in an SSB signal transmission section by applying the offset of the smtc information based on the SFN 0 of the current serving cell 11-01 and also applying the duration of the smtc information, and continuously measure an SSB signal at a time point of next SSB signal transmission by applying the periodicity of the smtc information. Because the smtc information has been set for the frequency, the UE can perform immediately frequency measurement for the frequency, based on the smtc information and the reference timing of the current serving cell. As such, there is no need to synchronize for the frequency, search for SSB signals from the beginning, and derive parameter values of periodicity, offset, and duration, so that it is possible to reduce battery consumption of the UE and enable early frequency measurement. If the smtc configuration information is not contained for the frequency, the UE may not perform the RRC idle mode or RRC inactive mode frequency measurement for the frequency to reduce battery consumption. Alternatively, even when there is no smtc configuration information, the UE may perform the RRC idle mode or RRC inactive mode frequency measurement by being implemented to synchronize for the frequency, search for SSB signals from the beginning, and derive parameter values of periodicity, offset, and duration.

If the UE moves from the first cell 11-01 to a service area of a second cell 11-02 and camps on the second cell 11-02, the UE may perform the RRC idle mode or RRC inactive mode frequency measurement based on the first frequency configuration information received in the RRCRelease message or the second frequency configuration information broadcasted as the system information by the second cell 11-02. That is, when the UE attempts to measure a second frequency 11-20 in the frequency list set above, and when the first frequency configuration information received from the first cell contains first smtc configuration information or the second frequency configuration information received in the system information of the second cell contains second smtc configuration information, the UE applies such smtc configuration information, based on timing of a serving cell (i.e., the second cell) 11-02 on which the UE camps through the cell selection or reselection procedure in the RRC idle mode or RRC inactive mode. That is, the UE may measure an SSB signal in an SSB signal transmission section by applying the offset of the smtc information based on the SFN 0 of the current serving cell 11-02 and also applying the duration of the smtc information, and continuously measure an SSB signal at a time point of next SSB signal transmission by applying the periodicity of the smtc information. Because the smtc information has been set for the frequency, the UE can perform immediately frequency measurement for the frequency, based on the smtc information and the reference timing of the current serving cell. As such, there is no need to synchronize for the frequency, search for SSB signals from the beginning, and derive parameter values of periodicity, offset, and duration, so that it is possible to reduce battery consumption of the UE and enable early frequency measurement. If the smtc configuration information is not contained for the frequency, the UE may not perform the RRC idle mode or RRC inactive mode frequency measurement for the frequency to reduce battery consumption. Alternatively, even when there is no smtc configuration information, the UE may perform the RRC idle mode or RRC inactive mode frequency measurement by being implemented to synchronize for the frequency, search for SSB signals from the beginning, and derive parameter values of periodicity, offset, and duration.

Figure 12:
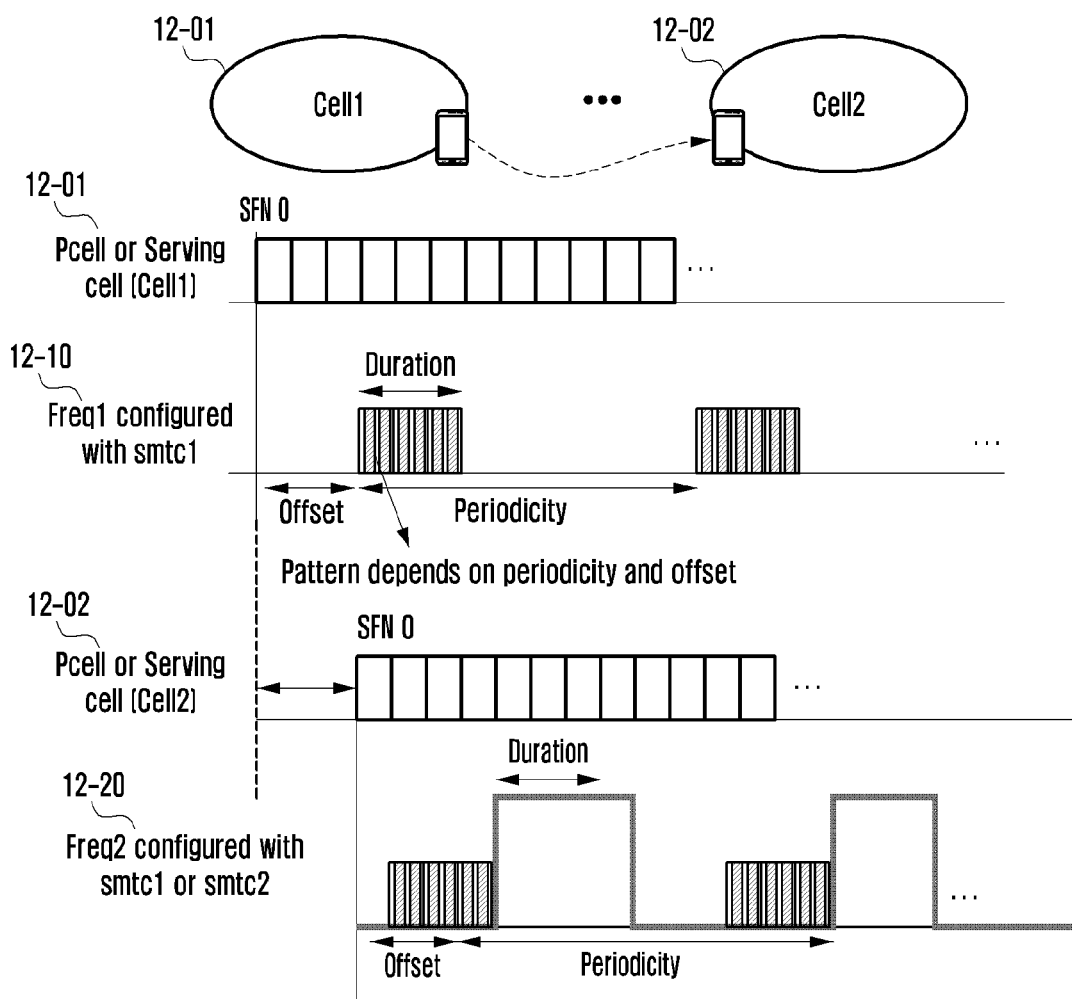
FIG. 12 is a diagram illustrating a problem that occurs when a terminal performs a frequency measurement in an RRC idle mode or an RRC inactive mode in a network that is not synchronized between different frequencies or cells according to an embodiment of the disclosure.

FIG. 12 is a diagram illustrating a problem that occurs when a terminal performs a frequency measurement in an RRC idle mode or an RRC inactive mode in a network that is not synchronized between different frequencies or cells according to an embodiment of the disclosure.

In FIG. 12, the UE that transmits/receives data in the RRC connected mode in a current cell 12-01 (first cell) may receive the RRCRelease message from the base station of the current cell 12-01, transition to the RRC idle mode or RRC inactive mode, and move while performing the cell selection or reselection procedure. The RRCRelease message may contain the first frequency configuration information. In addition, the RRC idle mode or RRC inactive mode UE may camp on a suitable cell through the cell selection or reselection procedure and acquire system information. The UE may receive the second frequency configuration information in the system information.

If the received RRCRelease message contains the first frequency configuration information, the UE may drive a timer by applying first timer value information of the first frequency configuration information and start early frequency measurement of the RRC idle mode or RRC inactive mode. In addition, if the first frequency configuration information contains first area configuration information, the UE may identify an identifier of the camping cell and determine whether to perform the early frequency measurement of the RRC idle mode or RRC inactive mode.

If the UE is in a service area of the first cell 12-01, the UE may perform the early frequency measurement of the RRC idle mode or RRC inactive mode, based on the first frequency configuration information received in the RRCRelease message or the second frequency configuration information broadcasted as the system information by the first cell 12-01. That is, when the UE attempts to measure a first frequency 12-10 in the frequency list set above, and when the first frequency configuration information received from the first cell contains first smtc configuration information or the second frequency configuration information received in the system information of the first cell contains second smtc configuration information, the UE applies such smtc configuration information, based on timing of a serving cell (i.e., the first cell) 12-01 on which the UE camps through the cell selection or reselection procedure in the RRC idle mode or RRC inactive mode. That is, the UE may measure an SSB signal in an SSB signal transmission section by applying the offset of the smtc information based on the SFN 0 of the current serving cell 12-01 and also applying the duration of the smtc information, and continuously measure an SSB signal at a time point of next SSB signal transmission by applying the periodicity of the smtc information. Because the smtc information has been set for the frequency, the UE can perform immediately frequency measurement for the frequency, based on the smtc information and the reference timing of the current serving cell. As such, there is no need to synchronize for the frequency, search for SSB signals from the beginning, and derive parameter values of periodicity, offset, and duration, so that it is possible to reduce battery consumption of the UE and enable early frequency measurement. If the smtc configuration information is not contained for the frequency, the UE may not perform the RRC idle mode or RRC inactive mode frequency measurement for the frequency to reduce battery consumption. Alternatively, even when there is no smtc configuration information, the UE may perform the RRC idle mode or RRC inactive mode frequency measurement by being implemented to synchronize for the frequency, search for SSB signals from the beginning, and derive parameter values of periodicity, offset, and duration.

If the UE moves from the first cell 12-01 to a service area of a second cell 12-02 and camps on the second cell 12-02, the UE may perform the RRC idle mode or RRC inactive mode frequency measurement based on the first frequency configuration information received in the RRCRelease message or the second frequency configuration information broadcasted as the system information by the second cell 12-02. That is, when the UE attempts to measure a second frequency 12-20 in the frequency list set above, and when the first frequency configuration information received from the first cell contains first smtc configuration information or the second frequency configuration information received in the system information of the second cell contains second smtc configuration information, the UE applies such smtc configuration information, based on timing of a serving cell (i.e., the second cell) 12-02 on which the UE camps through the cell selection or reselection procedure in the RRC idle mode or RRC inactive mode. That is, the UE may measure an SSB signal in an SSB signal transmission section by applying the offset of the smtc information based on the SFN 0 of the current serving cell 12-02 and also applying the duration of the smtc information, and continuously measure an SSB signal at a time point of next SSB signal transmission by applying the periodicity of the smtc information.

However, in FIG. 12, the time synchronization between the first cell 12-01 and the second cell 12-02 does not match. Thus, if applying the first smtc information for the second frequency 12-20, contained in the first frequency configuration information received in the RRCRelease message of the first cell, when measuring the second frequency 12-20 in the second cell, a problem that the frequency measurement is impossible due to asynchronous timing may occur. This is because the first smtc information for the second frequency 12-20 contained in the first frequency configuration information received in the RRCRelease message of the first cell is information set based on the reference timing of the first cell. If the UE applies the first smtc information, based on the reference timing of the second cell, in the area of the second cell, a section of the frequency measurement will not match as much as a gap between the timing of the first cell and the timing of the second cell. Therefore, the UE may not normally perform the RRC idle mode or RRC inactive mode frequency measurement for the second frequency.

Described hereinafter is a method for an efficient RRC idle mode or RRC inactive mode frequency measurement that can solve the above problem of frequency measurement failure due to asynchronous timing in FIG. 12 and minimize battery consumption of the UE.

Figure 13:
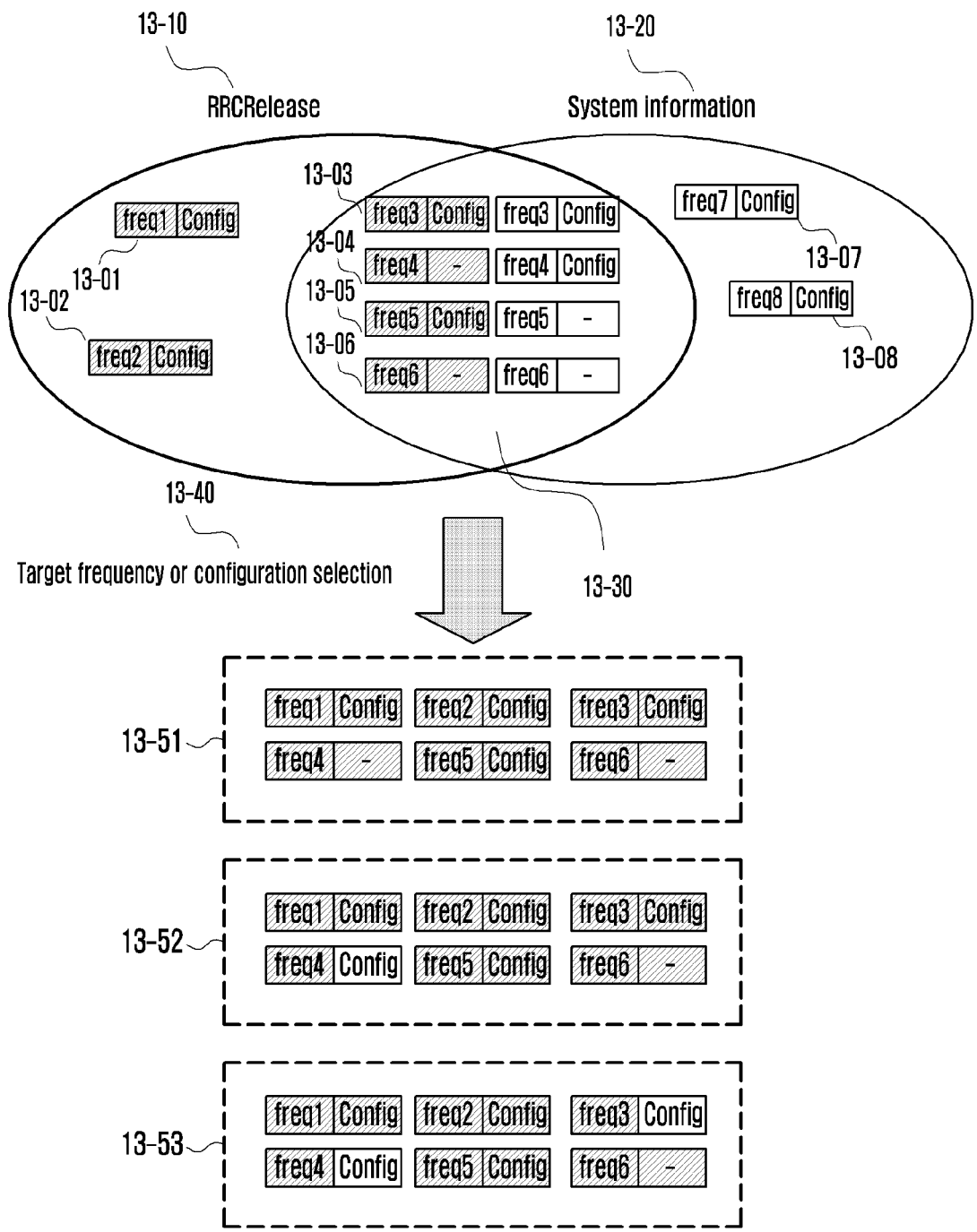
FIG. 13 is a diagram illustrating a first embodiment of an efficient frequency measurement method in an RRC idle mode or an RRC inactive mode according to an embodiment of the disclosure.

FIG. 13 is a diagram illustrating a first embodiment of an efficient frequency measurement method in an RRC idle mode or an RRC inactive mode according to an embodiment of the disclosure.

In FIG. 13, the base station or cell may set configuration information for the RRC idle mode or RRC inactive mode frequency measurement to the UE by using first frequency measurement configuration information 13-10 in the RRCRelease message or second frequency measurement configuration information 13-20 in the system information.

If the received RRCRelease message contains the first frequency configuration information, the UE may drive a timer by applying first timer value information of the first frequency configuration information and start the RRC idle mode or RRC inactive mode frequency measurement (i.e., early measurement). In addition, if the first frequency configuration information contains first area configuration information, the UE may identify an identifier of a cell on which the UE camps through the cell selection or reselection procedure, and may determine whether to perform the early frequency measurement of the RRC idle mode or RRC inactive mode. If the first frequency configuration information does not contain first frequency list information to be measured, and if the second frequency configuration is broadcasted in the system information of the camping cell, the UE may perform the RRC idle mode or RRC inactive mode frequency measurement, based on the second frequency configuration information (e.g., second frequency list information), store a valid measurement result, and report the stored measurement result to the network as described in FIG. 6 or 7 when establishing an RRC connection later.

In the first embodiment of the efficient RRC idle mode or RRC inactive mode frequency measurement method as shown in FIG. 13, the UE may receive the first frequency configuration information through the RRCRelease message, transition to the RRC idle mode or RRC inactive mode, and perform the frequency measurement. In addition, the UE may receive the second frequency configuration information through the system information of a cell on which the UE camps through the cell selection or reselection procedure.

The first embodiment is characterized in that the UE receives the first frequency configuration information and/or the second frequency configuration information, prioritizes the first frequency configuration information when performing the RRC idle mode or RRC inactive mode frequency measurement, and performs the frequency measurement based on the first frequency configuration information only. In addition, the UE may perform the frequency measurement in consideration of the second frequency configuration information with respect to configuration information that is not contained in the first frequency configuration information.

For example, the UE may receive the first frequency configuration information in the RRCRelease message 13-10 from the first cell, transition to the RRC idle mode or RRC inactive mode, and then receive the second frequency configuration information in the system information 13-20 from the first cell or a new second cell through the cell selection or reselection procedure.

A first frequency list of the first frequency configuration information 13-10 may contain, as target frequencies to be measured, frequency 1 (13-01), frequency 2 (13-02), frequency 3 (13-03), frequency 4 (13-04), frequency 5 (13-05), and frequency 6 (13-06). Among these frequencies, only frequency 1 (13-01), frequency 2 (13-02), frequency 3 (13-03), and frequency 5 (13-05) may be configured with threshold value information used as a criterion for measurement and report for each frequency, first configuration information for SSB measurement for each frequency, or a first reporting method for measurement report for each frequency.

A second frequency list of the second frequency configuration information 13-20 may contain, as target frequencies to be measured, frequency 3 (13-03), frequency 4 (13-04), frequency 5 (13-05), frequency 6 (13-06), frequency 7 (13-07), and frequency 8 (13-08). Among these frequencies, only frequency 3 (13-03), frequency 4 (13-04), frequency 7 (13-07), and frequency 8 (13-08) may be configured with threshold value information used as a criterion for measurement and report for each frequency, second configuration information for SSB measurement for each frequency, or a second reporting method for measurement report for each frequency.

Upon receiving the first frequency configuration information 13-10 or the second frequency configuration information 13-20, the UE may select frequencies to be measured, and then apply one of the following methods so as to determine frequency configurations to be applied to the respective frequencies.

Method 1-1 (13-51): The UE prioritizes the first frequency configuration information 13-10 to perform frequency measurement. Therefore, the UE may perform the frequency measurement only for frequencies 13-51 (i.e., frequency 1 (13-01), frequency 2 (13-02), frequency 3 (13-03), frequency 4 (13-04), frequency 5 (13-05), and frequency 6 (13-06)) set in the first frequency list by applying frequency measurement configuration information for each frequency (e.g., the threshold value information used as a criterion for measurement and report for each frequency, the first configuration information for SSB measurement for each frequency, or the first reporting method for measurement report for each frequency) set in the first frequency configuration information 13-10, determine a valid frequency measurement result, construct a result to be reported, and store the constructed result. Specifically, in the method 1-1, the UE may perform the frequency measurement by applying first configuration information (e.g., periodicity, offset, and/or duration of smtc) for SSB measurement for each frequency, based on a reference timing of a serving cell on which the UE camps through the cell selection or reselection procedure. If there is no first configuration information for SSB measurement for a target frequency to be measured, the UE may not perform the measurement for the frequency to reduce battery consumption. In one alternative method, even when there is no first configuration information (e.g., periodicity, offset, and/or duration of smtc) for SSB measurement for the frequency, the UE may perform the RRC idle mode or RRC inactive mode frequency measurement by being implemented to synchronize for the frequency, search for SSB signals from the beginning, and derive parameter values of periodicity, offset, and duration. In another alternative method, the UE may store a reference timing of a cell from which the RRCRelease message is received, and perform the measurement by applying the first configuration information for SSB measurement for each frequency, based on the stored timing. In such method 1-1, the UE performs the frequency measurement based on the first frequency configuration information only, so that it is not necessary to read a lot of system information, thereby reducing the battery consumption of the UE.

Method 1-2 (13-52): The UE prioritizes the first frequency configuration information 13-10 to perform frequency measurement. Therefore, the UE may perform the frequency measurement only for frequencies 13-52 (i.e., frequency 1 (13-01), frequency 2 (13-02), frequency 3 (13-03), frequency 4 (13-04), frequency 5 (13-05), and frequency 6 (13-06)) set in the first frequency list by applying frequency measurement configuration information for each frequency (e.g., the threshold value information used as a criterion for measurement and report for each frequency, the first configuration information for SSB measurement for each frequency, or the first reporting method for measurement report for each frequency) set in the first frequency configuration information 13-10, determine a valid frequency measurement result, construct a result to be reported, and store the constructed result. Specifically, in the method 1-2, the UE may perform the frequency measurement by applying first configuration information (e.g., periodicity, offset, and/or duration of smtc) for SSB measurement for each frequency, based on a reference timing of a serving cell on which the UE camps through the cell selection or reselection procedure. If there is no first configuration information for SSB measurement for a target frequency (e.g., frequency 4 (13-04)) to be measured, but if the second frequency configuration information received in the system information contains second configuration information for SSB measurement for the frequency, the UE may perform the frequency measurement by applying the second configuration information (e.g., periodicity, offset, and/or duration of smtc) for SSB measurement for the frequency (e.g., frequency 4 (13-04)), based on a reference timing of a serving cell on which the UE camps through the cell selection or reselection procedure. If there is neither first configuration information nor second configuration information for SSB measurement for a target frequency to be measured, the UE may not perform the measurement for the frequency to reduce battery consumption. In one alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration. In another alternative method, the UE may store a reference timing of a cell from which the RRCRelease message is received, and perform the measurement by applying the first configuration information or second configuration information for SSB measurement for each frequency, based on the stored timing.

One variation of the first embodiment for the efficient RRC idle mode or RRC inactive mode frequency measurement method is as follows.

In FIG. 13, the base station or cell may set configuration information for the RRC idle mode or RRC inactive mode frequency measurement to the UE by using first frequency measurement configuration information 13-10 in the RRCRelease message or second frequency measurement configuration information 13-20 in the system information.

If the received RRCRelease message contains the first frequency configuration information, the UE may drive a timer by applying first timer value information of the first frequency configuration information and start the RRC idle mode or RRC inactive mode frequency measurement (i.e., early measurement). In addition, if the first frequency configuration information contains first area configuration information, the UE may identify an identifier of a cell on which the UE camps through the cell selection or reselection procedure, and may determine whether to perform the early frequency measurement of the RRC idle mode or RRC inactive mode. If the first frequency configuration information does not contain first frequency list information to be measured, and if the second frequency configuration is broadcasted in the system information of the camping cell, the UE may perform the RRC idle mode or RRC inactive mode frequency measurement, based on the second frequency configuration information (e.g., second frequency list information), store a valid measurement result, and report the stored measurement result to the network as described in FIG. 6 or 7 when establishing an RRC connection later.

In one variation of the first embodiment for the efficient RRC idle mode or RRC inactive mode frequency measurement method, the UE may receive the first frequency configuration information through the RRCRelease message, transition to the RRC idle mode or RRC inactive mode, and perform the frequency measurement. In addition, the UE may receive the second frequency configuration information through the system information of a cell on which the UE camps through the cell selection or reselection procedure.

One variation of the first embodiment is characterized in that the UE receives the first frequency configuration information and/or the second frequency configuration information and in that, when performing the RRC idle mode or RRC inactive mode frequency measurement, the UE always prioritizes the first frequency list information than the second frequency list information in case of receiving both the first frequency configuration information and the second frequency configuration information, but prioritizes the second configuration information for SSB measurement for each frequency in case of receiving both the first configuration information for SSB measurement for each frequency and the second configuration information for SSB measurement for each frequency. However, if a cell from which the UE receives the system information is identical with a cell from which the UE receives the RRCRelease message, and if, for a specific frequency in the first frequency list, the UE receives the first configuration information for SSB measurement through RRCRelease message and receives the second configuration information for SSB measurement through the system information of the same cell, the UE may apply the first configuration information for SSB measurement for each frequency in the first frequency list. This is because if different kinds of information are received from the same cell through the RRCRelease message and the system information, the UE should give priority to specific information (dedicated to the UE) directly provided by the base station. In the case of certain UE that does not have much mobility and continuously camps on the same cell, the first configuration information for SSB measurement for each frequency may be more efficient for frequency measurement for the CA technology or DC technology.

If the RRCRelease message contains only the first frequency list without the first configuration information for SSB measurement for each frequency, and if the second configuration information for SSB measurement for each frequency contained in the first frequency list is broadcasted through the system information, the UE may perform the frequency measurement by applying the second configuration information for SSB measurement for each frequency to frequencies of the first frequency list.

For example, the UE may receive the first frequency configuration information in the RRCRelease message 13-10 from the first cell, transition to the RRC idle mode or RRC inactive mode, and then receive the second frequency configuration information in the system information 13-20 from the first cell or a new second cell through the cell selection or reselection procedure.

A first frequency list of the first frequency configuration information 13-10 may contain, as target frequencies to be measured, frequency 1 (13-01), frequency 2 (13-02), frequency 3 (13-03), frequency 4 (13-04), frequency 5 (13-05), and frequency 6 (13-06). Among these frequencies, only frequency 1 (13-01), frequency 2 (13-02), frequency 3 (13-03), and frequency 5 (13-05) may be configured with threshold value information used as a criterion for measurement and report for each frequency, first configuration information for SSB measurement for each frequency, or a first reporting method for measurement report for each frequency.

A second frequency list of the second frequency configuration information 13-20 may contain, as target frequencies to be measured, frequency 3 (13-03), frequency 4 (13-04), frequency 5 (13-05), frequency 6 (13-06), frequency 7 (13-07), and frequency 8 (13-08). Among these frequencies, only frequency 3 (13-03), frequency 4 (13-04), frequency 7 (13-07), and frequency 8 (13-08) may be configured with threshold value information used as a criterion for measurement and report for each frequency, second configuration information for SSB measurement for each frequency, or a second reporting method for measurement report for each frequency.

Upon receiving the first frequency configuration information 13-10 or the second frequency configuration information 13-20, the UE may select frequencies to be measured, and then apply one of the following methods so as to determine frequency configurations to be applied to the respective frequencies.

Method 1-1-1 (13-51):
- 1> If the UE moves within the first cell, from which the RRCRelease message has been received, and camps on the same first cell again (13-52),
- 2> The UE prioritizes the first frequency configuration information 13-10 to perform frequency measurement. Therefore, the UE may perform the frequency measurement for frequencies 13-51 (i.e., frequency 1 (13-01), frequency 2 (13-02), frequency 3 (13-03), frequency 4 (13-04), frequency 5 (13-05), and frequency 6 (13-06)) set in the first frequency list by applying frequency measurement configuration information for each frequency (e.g., the threshold value information used as a criterion for measurement and report for each frequency, the first configuration information for SSB measurement for each frequency, or the first reporting method for measurement report for each frequency) set in the first frequency configuration information 13-10, determine a valid frequency measurement result, construct a result to be reported, and store the constructed result. That is, even if the second configuration information for SSB measurement for each frequency corresponding to the first frequency list is broadcasted in the system information, the UE may prioritize information of the RRCRelease message because the RRCRelease message is received from the same cell. Specifically, in the method 1-1-1, the UE may perform the frequency measurement by applying the first configuration information (e.g., periodicity, offset, and/or duration of smtc) for SSB measurement for a target frequency (e.g., frequency 4 (13-04)) to be measured, based on a reference timing of a serving cell on which the UE camps through the cell selection or reselection procedure. In one alternative method, the UE may store a reference timing of the cell from which the RRCRelease message is received, and perform the measurement by applying the first configuration information or second configuration information for SSB measurement for each frequency, based on the stored timing. If there is neither first configuration information nor second configuration information for SSB measurement for a target frequency to be measured, the UE may not perform the measurement for the frequency to reduce battery consumption. In another alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration. In still another alternative method, if there is no first configuration information for SSB measurement for a target frequency (e.g., frequency 4 (13-04)) to be measured, but if the second frequency configuration information received in the system information contains second configuration information for SSB measurement for the frequency, the UE may perform the frequency measurement by applying the second configuration information (e.g., periodicity, offset, and/or duration of smtc) for SSB measurement for the frequency, based on a reference timing of a serving cell on which the UE camps through the cell selection or reselection procedure.

2> If the first frequency configuration information received in the RRCRelease message does not contain the configuration information for the first frequency list, the UE may apply a method 2-1 (14-51) to be described below. Specifically, the UE prioritizes the second frequency configuration information 14-20 to perform frequency measurement. Therefore, the UE may perform the frequency measurement only for frequencies 14-51 (i.e., frequency 3 (14-03), frequency 4 (14-04), frequency 5 (14-05), frequency 6 (14-06), frequency 7 (14-07), and frequency 8 (14-08)) set in the second frequency list by applying frequency measurement configuration information for each frequency (e.g., the threshold value information used as a criterion for measurement and report for each frequency, the second configuration information for SSB measurement for each frequency, or the second reporting method for measurement report for each frequency) set in the second frequency configuration information 14-20, determine a valid frequency measurement result, construct a result to be reported, and store the constructed result. Specifically, in the method 2-1, the UE may perform the frequency measurement by applying the second configuration information (e.g., periodicity, offset, and/or duration of smtc) for SSB measurement for a target frequency to be measured, based on a reference timing of a serving cell on which the UE camps through the cell selection or reselection procedure. If there is no second configuration information for SSB measurement for a target frequency to be measured, the UE may not perform the measurement for the frequency to reduce battery consumption. In one alternative method, even when there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration. In another alternative method, the method 2-2 (14-52) may be applied.

1> If the UE moves from the first cell, from which the RRCRelease message has been received, and camps on a new second cell (13-53), 2> The UE prioritizes the first frequency list of the first frequency configuration information 13-10 to perform frequency measurement. However, when performing measurements of frequencies of the first frequency list, it may be characterized in that preference is given to the second configuration information for SSB measurement for each frequency rather than the first configuration information for SSB measurement for each frequency. Therefore, the UE may perform the frequency measurement for frequencies 13-51 (i.e., frequency 1 (13-01), frequency 2 (13-02), frequency 3 (13-03), frequency 4 (13-04), frequency 5 (13-05), and frequency 6 (13-06)) set in the first frequency list by applying frequency measurement configuration information for each frequency (e.g., the threshold value information used as a criterion for measurement and report for each frequency, the first configuration information for SSB measurement for each frequency, or the first reporting method for measurement report for each frequency) set in the first frequency configuration information 13-10, determine a valid frequency measurement result, construct a result to be reported, and store the constructed result. Specifically, if the first configuration information for SSB measurement for a target frequency corresponding to the first frequency list is received, but if the second configuration information for SSB measurement for the frequency is broadcasted in the system information from in a new second cell, the UE may prioritize the second configuration information for SSB measurement for each frequency broadcasted in the system information to perform frequency measurement. That is, in the method 1-1-1, the UE may perform the frequency measurement by applying the second configuration information (e.g., periodicity, offset, and/or duration of smtc) for SSB measurement for a target frequency (e.g., frequency 4 (13-04)) to be measured, based on a reference timing of a serving cell on which the UE camps through the cell selection or reselection procedure. This is because, if the UE moves and camps on the new second cell, the second configuration information for SSB measurement for each frequency broadcasted from the new second cell is likely to be more accurate than the first configuration information for SSB measurement for each frequency received from the previous first cell. In addition, it is because, if cell synchronization does not match in the base station implementation, following the system information of the new second cell may not cause a problem due to asynchronous timing between cells. If there is neither first configuration information nor second configuration information for SSB measurement for a target frequency to be measured, the UE may not perform the measurement for the frequency to reduce battery consumption. In one alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration. In another alternative method, if the second configuration information for SSB measurement for each frequency is not broadcasted in the system information for a target frequency of the first frequency list to be measured, but if the first frequency configuration information received in the RRCRelease message contains the first configuration information for SSB measurement for the frequency, the UE may perform the frequency measurement by applying the first configuration information (e.g., periodicity, offset, and/or duration of smtc) for SSB measurement for the frequency, based on a reference timing of a serving cell on which the UE camps through the cell selection or reselection procedure. In still another alternative method, the UE may store a reference timing of the cell from which the RRCRelease message is received, and perform the measurement by applying the first configuration information or second configuration information for SSB measurement for each frequency, based on the stored timing. In yet another alternative method, the method 1-1 or the method 1-2, described above, may be applied.

2> If the first frequency configuration information received in the RRCRelease message does not contain the configuration information for the first frequency list, the UE may apply a method 2-1 (14-51) to be described below. Specifically, the UE prioritizes the second frequency configuration information 14-20 to perform frequency measurement. Therefore, the UE may perform the frequency measurement only for frequencies 14-51 (i.e., frequency 3 (14-03), frequency 4 (14-04), frequency 5 (14-05), frequency 6 (14-06), frequency 7 (14-07), and frequency 8 (14-08)) set in the second frequency list by applying frequency measurement configuration information for each frequency (e.g., the threshold value information used as a criterion for measurement and report for each frequency, the second configuration information for SSB measurement for each frequency, or the second reporting method for measurement report for each frequency) set in the second frequency configuration information 14-20, determine a valid frequency measurement result, construct a result to be reported, and store the constructed result. Specifically, in the method 2-1, the UE may perform the frequency measurement by applying the second configuration information (e.g., periodicity, offset, and/or duration of smtc) for SSB measurement for a target frequency to be measured, based on a reference timing of a serving cell on which the UE camps through the cell selection or reselection procedure. If there is no second configuration information for SSB measurement for a target frequency to be measured, the UE may not perform the measurement for the frequency to reduce battery consumption. In one alternative method, even when there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration. In another alternative method, the method 2-2 (14-52) may be applied.

Figure 14:
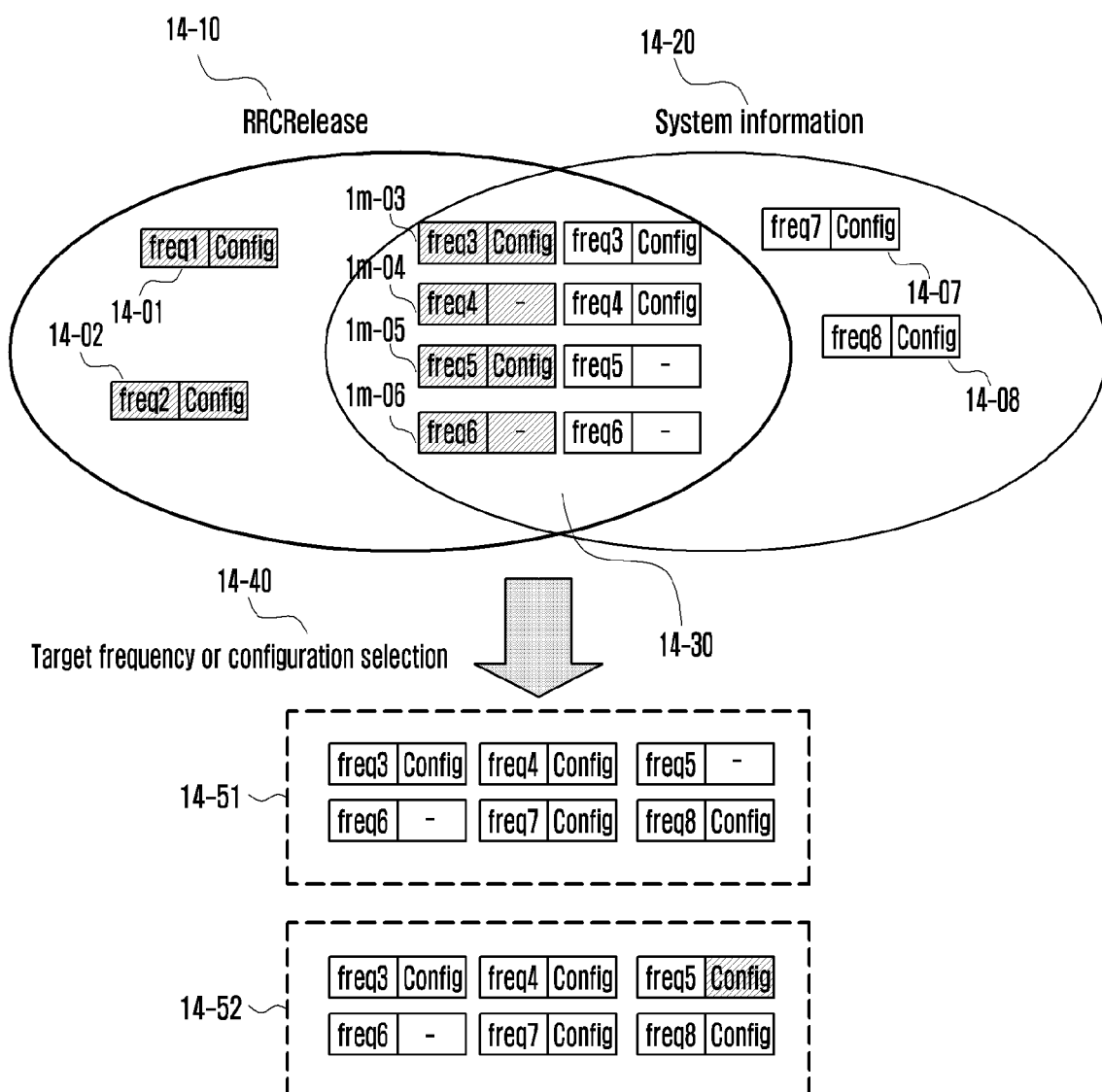
FIG. 14 is a diagram illustrating a second embodiment of an efficient frequency measurement method in an RRC idle mode or an RRC inactive mode according to an embodiment of the disclosure.

FIG. 14 is a diagram illustrating a second embodiment of an efficient frequency measurement method in an RRC idle mode or an RRC inactive mode according to an embodiment of the disclosure.

In FIG. 14, the base station or cell may set configuration information for the RRC idle mode or RRC inactive mode frequency measurement to the UE by using first frequency measurement configuration information 14-10 in the RRCRelease message or second frequency measurement configuration information 14-20 in the system information.

If the received RRCRelease message contains the first frequency configuration information, the UE may drive a timer by applying first timer value information of the first frequency configuration information and start the RRC idle mode or RRC inactive mode frequency measurement (i.e., early measurement). In addition, if the first frequency configuration information contains first area configuration information, the UE may identify an identifier of a cell on which the UE camps through the cell selection or reselection procedure, and may determine whether to perform the early frequency measurement of the RRC idle mode or RRC inactive mode. If the first frequency configuration information does not contain first frequency list information to be measured, and if the second frequency configuration is broadcasted in the system information of the camping cell, the UE may perform the RRC idle mode or RRC inactive mode frequency measurement, based on the second frequency configuration information (e.g., second frequency list information), store a valid measurement result, and report the stored measurement result to the network as described in FIG. 6 or 7 when establishing an RRC connection later.

In the second embodiment of the efficient RRC idle mode or RRC inactive mode frequency measurement method as shown in FIG. 14, the UE may receive the first frequency configuration information through the RRCRelease message, transition to the RRC idle mode or RRC inactive mode, and perform the frequency measurement. In addition, the UE may receive the second frequency configuration information through the system information of a cell on which the UE camps through the cell selection or reselection procedure.

In the second embodiment, that the UE may receive the first frequency configuration information and/or the second frequency configuration information, prioritize the second frequency configuration information when performing the RRC idle mode or RRC inactive mode frequency measurement, and perform the frequency measurement based on the second frequency configuration information only. In addition, the UE may perform the frequency measurement in consideration of the first frequency configuration information with respect to configuration information that is not contained in the second frequency configuration information.

For example, the UE may receive the first frequency configuration information 14-10 in the RRCRelease message from the first cell, transition to the RRC idle mode or RRC inactive mode, and then receive the second frequency configuration information 14-20 in the system information from the first cell or a new second cell through the cell selection or reselection procedure.

A first frequency list of the first frequency configuration information 14-10 may contain, as target frequencies to be measured, frequency 1 (14-01), frequency 2 (14-02), frequency 3 (14-03), frequency 4 (14-04), frequency 5 (14-05), and frequency 6 (14-06). Among these frequencies, only frequency 1 (14-01), frequency 2 (14-02), frequency 3 (14-03), and frequency 5 (14-05) may be configured with threshold value information used as a criterion for measurement and report for each frequency, first configuration information for SSB measurement for each frequency, or a first reporting method for measurement report for each frequency.

A second frequency list of the second frequency configuration information 14-20 may contain, as target frequencies to be measured, frequency 3 (14-03), frequency 4 (14-04), frequency 5 (14-05), frequency 6 (14-06), frequency 7 (14-07), and frequency 8 (14-08). Among these frequencies, only frequency 3 (14-03), frequency 4 (14-04), frequency 7 (14-07), and frequency 8 (14-08) may be configured with threshold value information used as a criterion for measurement and report for each frequency, second configuration information for SSB measurement for each frequency, or a second reporting method for measurement report for each frequency.

Upon receiving the first frequency configuration information 14-10 or the second frequency configuration information 14-20, the UE may select frequencies to be measured, and then apply one of the following methods so as to determine frequency configurations to be applied to the respective frequencies.

Method 2-1 (14-51): The UE prioritizes the second frequency configuration information 14-20 to perform frequency measurement. Therefore, the UE may perform the frequency measurement only for frequencies 14-51 (i.e., frequency 3 (14-03), frequency 4 (14-04), frequency 5 (14-05), frequency 6 (14-06), frequency 7 (14-07), and frequency 8 (14-08)) set in the second frequency list by applying frequency measurement configuration information for each frequency (e.g., the threshold value information used as a criterion for measurement and report for each frequency, the second configuration information for SSB measurement for each frequency, or the second reporting method for measurement report for each frequency) set in the second frequency configuration information 14-20, determine a valid frequency measurement result, construct a result to be reported, and store the constructed result. Specifically, in the method 2-1, the UE may perform the frequency measurement by applying second configuration information (e.g., periodicity, offset, and/or duration of smtc) for SSB measurement for each frequency, based on a reference timing of a serving cell on which the UE camps through the cell selection or reselection procedure. If there is no second configuration information for SSB measurement for a target frequency to be measured, the UE may not perform the measurement for the frequency to reduce battery consumption. In one alternative method, even when there is no second configuration information (e.g., periodicity, offset, and/or duration of smtc) for SSB measurement for the frequency, the UE may perform the RRC idle mode or RRC inactive mode frequency measurement by being implemented to synchronize for the frequency, search for SSB signals from the beginning, and derive parameter values of periodicity, offset, and duration.

Method 2-2 (14-52): The UE prioritizes the second frequency configuration information 14-20 to perform frequency measurement. Therefore, the UE may perform the frequency measurement only for frequencies 14-52 (i.e., frequency 3 (14-03), frequency 4 (14-04), frequency 5 (14-05), frequency 6 (14-06), frequency 7 (14-07), and frequency 8 (14-08)) set in the second frequency list by applying frequency measurement configuration information for each frequency (e.g., the threshold value information used as a criterion for measurement and report for each frequency, the second configuration information for SSB measurement for each frequency, or the second reporting method for measurement report for each frequency) set in the second frequency configuration information 14-20, determine a valid frequency measurement result, construct a result to be reported, and store the constructed result. Specifically, in the method 2-2, the UE may perform the frequency measurement by applying second configuration information (e.g., periodicity, offset, and/or duration of smtc) for SSB measurement for each frequency, based on a reference timing of a serving cell on which the UE camps through the cell selection or reselection procedure. If there is no second configuration information for SSB measurement for a target frequency (e.g., frequency 5 (14-05)) to be measured, but if the first frequency configuration information received in the RRCRelease message contains first configuration information for SSB measurement for the frequency, the UE may perform the frequency measurement by applying the first configuration information (e.g., periodicity, offset, and/or duration of smtc) for SSB measurement for the frequency (e.g., frequency 5 (14-05)), based on a reference timing of a serving cell on which the UE camps through the cell selection or reselection procedure. If there is neither first configuration information nor second configuration information for SSB measurement for a target frequency to be measured, the UE may not perform the measurement for the frequency to reduce battery consumption. In one alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration.

Figure 15:
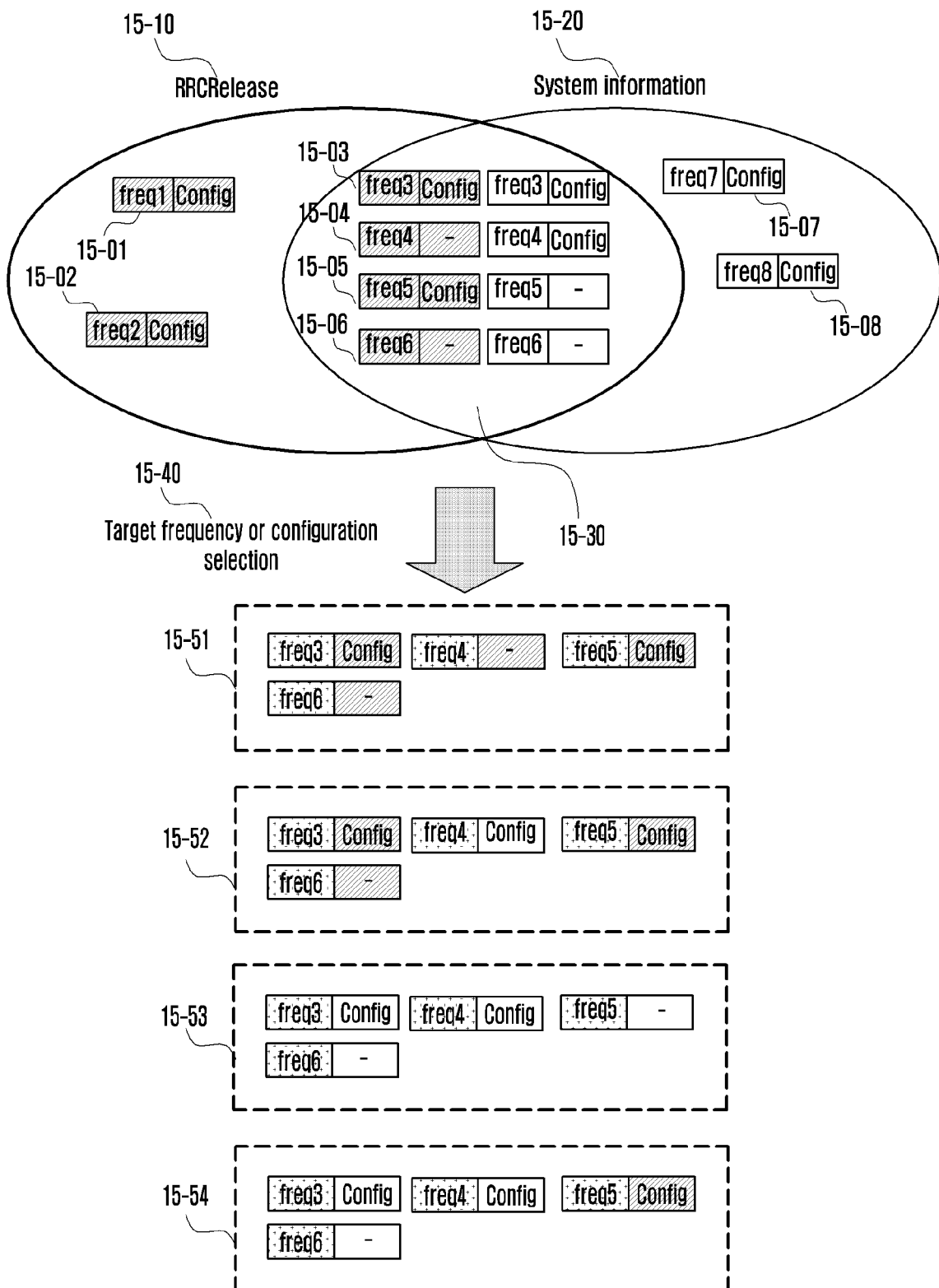
FIG. 15 is a diagram illustrating a third embodiment of an efficient frequency measurement method in an RRC idle mode or an RRC inactive mode according to an embodiment of the disclosure.

FIG. 15 is a diagram illustrating a third embodiment of an efficient frequency measurement method in an RRC idle mode or an RRC inactive mode according to an embodiment of the disclosure.

In FIG. 15, the base station or cell may set configuration information for the RRC idle mode or RRC inactive mode frequency measurement to the UE by using first frequency measurement configuration information 15-10 in the RRCRelease message or second frequency measurement configuration information 15-20 in the system information.

If the received RRCRelease message contains the first frequency configuration information, the UE may drive a timer by applying first timer value information of the first frequency configuration information and start the RRC idle mode or RRC inactive mode frequency measurement (i.e., early measurement). In addition, if the first frequency configuration information contains first area configuration information, the UE may identify an identifier of a cell on which the UE camps through the cell selection or reselection procedure, and may determine whether to perform the early frequency measurement of the RRC idle mode or RRC inactive mode. If the first frequency configuration information does not contain first frequency list information to be measured, and if the second frequency configuration is broadcasted in the system information of the camping cell, the UE may perform the RRC idle mode or RRC inactive mode frequency measurement, based on the second frequency configuration information (e.g., second frequency list information), store a valid measurement result, and report the stored measurement result to the network as described in FIG. 6 or 7 when establishing an RRC connection later.

In the third embodiment of the efficient RRC idle mode or RRC inactive mode frequency measurement method as shown in FIG. 15, the UE may receive the first frequency configuration information through the RRCRelease message, transition to the RRC idle mode or RRC inactive mode, and perform the frequency measurement. In addition, the UE may receive the second frequency configuration information through the system information of a cell on which the UE camps through the cell selection or reselection procedure.

The third embodiment is characterized in that the UE receives the first frequency configuration information and/or the second frequency configuration information, compares the first frequency configuration information and the second frequency configuration information when performing the RRC idle mode or RRC inactive mode frequency measurement, and performs the frequency measurement for frequencies corresponding to an intersection of the first frequency list and the second frequency list, based on the first frequency configuration information or the second frequency configuration information. In addition, the UE may perform the frequency measurement in consideration of the second frequency configuration information with respect to configuration information that is not contained in the first frequency configuration information, and may perform the frequency measurement in consideration of the first frequency configuration information with respect to configuration information that is not contained in the second frequency configuration information.

For example, the UE may receive the first frequency configuration information 15-10 in the RRCRelease message from the first cell, transition to the RRC idle mode or RRC inactive mode, and then receive the second frequency configuration information 15-20 in the system information from the first cell or a new second cell through the cell selection or reselection procedure.

A first frequency list of the first frequency configuration information 15-10 may contain, as target frequencies to be measured, frequency 1 (15-01), frequency 2 (15-02), frequency 3 (15-03), frequency 4 (15-04), frequency 5 (15-05), and frequency 6 (15-06). Among these frequencies, only frequency 1 (15-01), frequency 2 (15-02), frequency 3 (15-03), and frequency 5 (15-05) may be configured with threshold value information used as a criterion for measurement and report for each frequency, first configuration information for SSB measurement for each frequency, or a first reporting method for measurement report for each frequency.

A second frequency list of the second frequency configuration information 15-20 may contain, as target frequencies to be measured, frequency 3 (15-03), frequency 4 (15-04), frequency 5 (15-05), frequency 6 (15-06), frequency 7 (15-07), and frequency 8 (15-08). Among these frequencies, only frequency 3 (15-03), frequency 4 (15-04), frequency 7 (15-07), and frequency 8 (15-08) may be configured with threshold value information used as a criterion for measurement and report for each frequency, second configuration information for SSB measurement for each frequency, or a second reporting method for measurement report for each frequency.

Upon receiving the first frequency configuration information 15-10 or the second frequency configuration information 15-20, the UE may select frequencies to be measured, and then apply one of the following methods so as to determine frequency configurations to be applied to the respective frequencies.

Method 3-1 (15-51): Upon receiving the first frequency configuration information 15-10 or the second frequency configuration information 15-20, the UE compares the first frequency list information of the first frequency configuration information and the second frequency list information of the second frequency configuration information, selects frequencies corresponding to an intersection, and performs frequency measurement for the selected frequencies. Therefore, the UE may perform the frequency measurement only for frequencies 15-30 corresponding to the intersection between the first and second frequency lists (i.e., frequency 3 (15-03), frequency 4 (15-04), frequency 5 (15-05), and frequency 6 (15-06)) by applying frequency measurement configuration information for each frequency (e.g., the threshold value information used as a criterion for measurement and report for each frequency, the first configuration information for SSB measurement for each frequency, or the first reporting method for measurement report for each frequency) set in the first frequency configuration information, determine a valid frequency measurement result, construct a result to be reported, and store the constructed result. Specifically, in the method 3-1, the UE may perform the frequency measurement by applying first configuration information (e.g., periodicity, offset, and/or duration of smtc) for SSB measurement for each frequency, based on a reference timing of a serving cell on which the UE camps through the cell selection or reselection procedure. If there is no first configuration information for SSB measurement for a target frequency to be measured, the UE may not perform the measurement for the frequency to reduce battery consumption. In one alternative method, even when there is no first configuration information (e.g., periodicity, offset, and/or duration of smtc) for SSB measurement for the frequency, the UE may perform the RRC idle mode or RRC inactive mode frequency measurement by being implemented to synchronize for the frequency, search for SSB signals from the beginning, and derive parameter values of periodicity, offset, and duration. In another alternative method, the UE may store a reference timing of a cell from which the RRCRelease message is received, and perform the measurement by applying the first configuration information for SSB measurement for each frequency, based on the stored timing. In such method 3-1, the UE performs the frequency measurement based on the first frequency configuration information only, so that it is not necessary to read a lot of system information, thereby reducing the battery consumption of the UE.

Method 3-2 (15-52): Upon receiving the first frequency configuration information 15-10 or the second frequency configuration information 15-20, the UE compares the first frequency list information of the first frequency configuration information and the second frequency list information of the second frequency configuration information, selects frequencies corresponding to an intersection, and performs frequency measurement for the selected frequencies. Therefore, the UE may perform the frequency measurement only for frequencies 15-30 corresponding to the intersection between the first and second frequency lists (i.e., frequency 3 (15-03), frequency 4 (15-04), frequency 5 (15-05), and frequency 6 (15-06)) by applying frequency measurement configuration information for each frequency (e.g., the threshold value information used as a criterion for measurement and report for each frequency, the first configuration information for SSB measurement for each frequency, or the first reporting method for measurement report for each frequency) set in the first frequency configuration information, determine a valid frequency measurement result, construct a result to be reported, and store the constructed result. Specifically, in the method 3-2, the UE may perform the frequency measurement by applying first configuration information (e.g., periodicity, offset, and/or duration of smtc) for SSB measurement for each frequency, based on a reference timing of a serving cell on which the UE camps through the cell selection or reselection procedure. If there is no first configuration information for SSB measurement for a target frequency (e.g., frequency 4 (15-04)) to be measured, but if the second frequency configuration information received in the system information contains second configuration information for SSB measurement for the frequency, the UE may perform the frequency measurement by applying the second configuration information (e.g., periodicity, offset, and/or duration of smtc) for SSB measurement for the frequency (e.g., frequency 4 (15-04)), based on a reference timing of a serving cell on which the UE camps through the cell selection or reselection procedure. If there is neither first configuration information nor second configuration information for SSB measurement for a target frequency to be measured, the UE may not perform the measurement for the frequency to reduce battery consumption. In one alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration.

Method 3-3 (15-53): Upon receiving the first frequency configuration information 15-10 or the second frequency configuration information 15-20, the UE compares the first frequency list information of the first frequency configuration information and the second frequency list information of the second frequency configuration information, selects frequencies corresponding to an intersection, and performs frequency measurement for the selected frequencies. Therefore, the UE may perform the frequency measurement only for frequencies 15-30 corresponding to the intersection between the first and second frequency lists (i.e., frequency 3 (15-03), frequency 4 (15-04), frequency 5 (15-05), and frequency 6 (15-06)) by applying frequency measurement configuration information for each frequency (e.g., the threshold value information used as a criterion for measurement and report for each frequency, the second configuration information for SSB measurement for each frequency, or the second reporting method for measurement report for each frequency) set in the second frequency configuration information, determine a valid frequency measurement result, construct a result to be reported, and store the constructed result. Specifically, in the method 3-3, the UE may perform the frequency measurement by applying second configuration information (e.g., periodicity, offset, and/or duration of smtc) for SSB measurement for each frequency, based on a reference timing of a serving cell on which the UE camps through the cell selection or reselection procedure. If there is no second configuration information for SSB measurement for a target frequency to be measured, the UE may not perform the measurement for the frequency to reduce battery consumption. In one alternative method, even when there is no second configuration information (e.g., periodicity, offset, and/or duration of smtc) for SSB measurement for the frequency, the UE may perform the RRC idle mode or RRC inactive mode frequency measurement by being implemented to synchronize for the frequency, search for SSB signals from the beginning, and derive parameter values of periodicity, offset, and duration.

Method 3-4 (15-54): Upon receiving the first frequency configuration information 15-10 or the second frequency configuration information 15-20, the UE compares the first frequency list information of the first frequency configuration information and the second frequency list information of the second frequency configuration information, selects frequencies corresponding to an intersection, and performs frequency measurement for the selected frequencies. Therefore, the UE may perform the frequency measurement only for frequencies 15-30 corresponding to the intersection between the first and second frequency lists (i.e., frequency 3 (15-03), frequency 4 (15-04), frequency 5 (15-05), and frequency 6 (15-06)) by applying frequency measurement configuration information for each frequency (e.g., the threshold value information used as a criterion for measurement and report for each frequency, the second configuration information for SSB measurement for each frequency, or the second reporting method for measurement report for each frequency) set in the second frequency configuration information, determine a valid frequency measurement result, construct a result to be reported, and store the constructed result. Specifically, in the method 3-4, the UE may perform the frequency measurement by applying second configuration information (e.g., periodicity, offset, and/or duration of smtc) for SSB measurement for each frequency, based on a reference timing of a serving cell on which the UE camps through the cell selection or reselection procedure. If there is no second configuration information for SSB measurement for a target frequency (e.g., frequency 5 (15-05)) to be measured, but if the first frequency configuration information received in the RRCRelease message contains first configuration information for SSB measurement for the frequency, the UE may perform the frequency measurement by applying the first configuration information (e.g., periodicity, offset, and/or duration of smtc) for SSB measurement for the frequency (e.g., frequency 5 (15-05)), based on a reference timing of a serving cell on which the UE camps through the cell selection or reselection procedure. If there is neither first configuration information nor second configuration information for SSB measurement for a target frequency to be measured, the UE may not perform the measurement for the frequency to reduce battery consumption. In one alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration.

Figure 16:
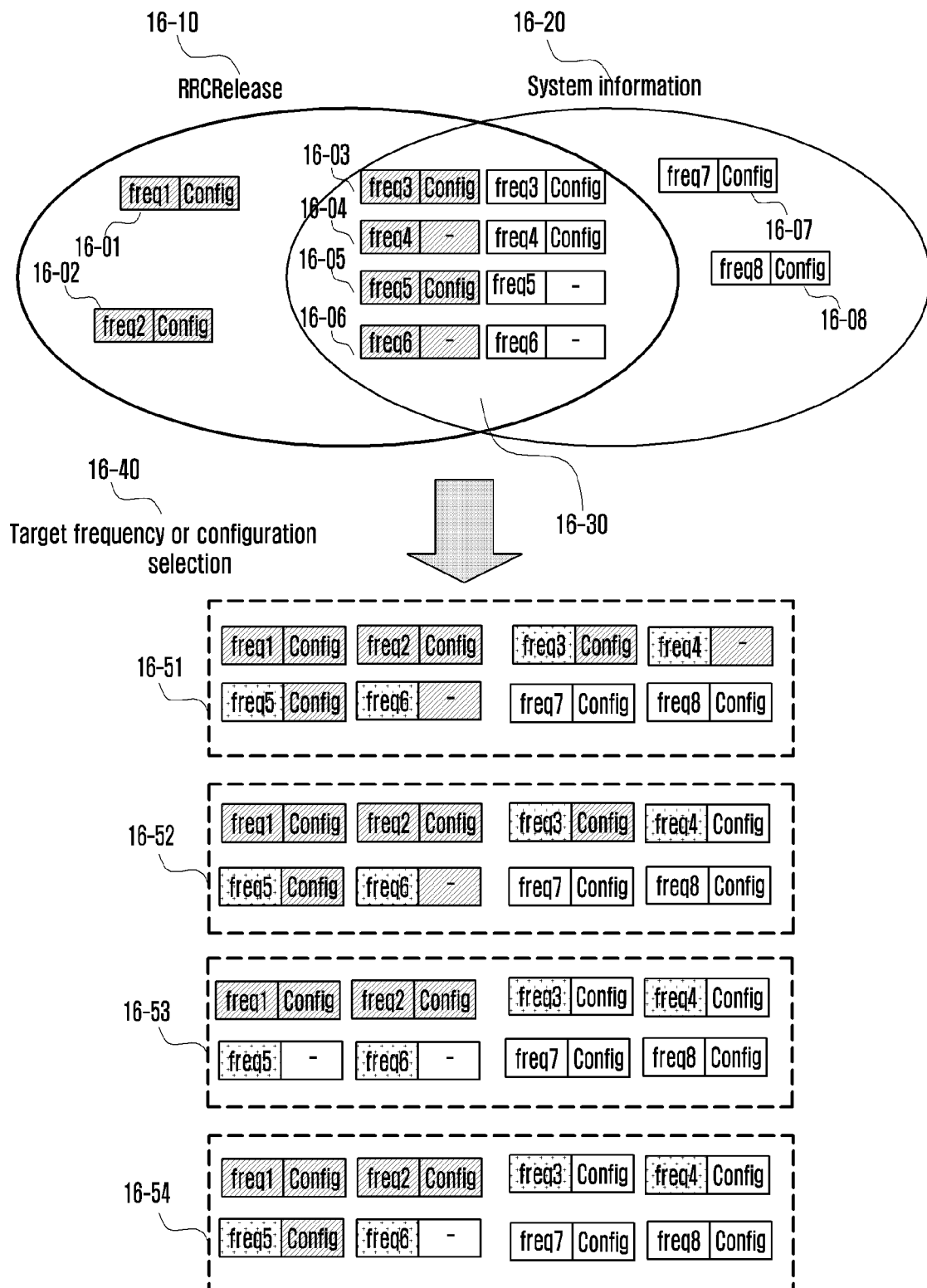
FIG. 16 is a diagram illustrating a fourth embodiment of an efficient frequency measurement method in an RRC idle mode or an RRC inactive mode according to an embodiment of the disclosure.

FIG. 16 is a diagram illustrating a fourth embodiment of an efficient frequency measurement method in an RRC idle mode or an RRC inactive mode according to an embodiment of the disclosure.

In FIG. 16, the base station or cell may set configuration information for the RRC idle mode or RRC inactive mode frequency measurement to the UE by using first frequency measurement configuration information 16-10 in the RRCRelease message or second frequency measurement configuration information 16-20 in the system information.

If the received RRCRelease message contains the first frequency configuration information, the UE may drive a timer by applying first timer value information of the first frequency configuration information and start the RRC idle mode or RRC inactive mode frequency measurement (i.e., early measurement). In addition, if the first frequency configuration information contains first area configuration information, the UE may identify an identifier of a cell on which the UE camps through the cell selection or reselection procedure, and may determine whether to perform the early frequency measurement of the RRC idle mode or RRC inactive mode. If the first frequency configuration information does not contain first frequency list information to be measured, and if the second frequency configuration is broadcasted in the system information of the camping cell, the UE may perform the RRC idle mode or RRC inactive mode frequency measurement, based on the second frequency configuration information (e.g., second frequency list information), store a valid measurement result, and report the stored measurement result to the network as described in FIG. 6 or 7 when establishing an RRC connection later.

In the fourth embodiment of the efficient RRC idle mode or RRC inactive mode frequency measurement method as shown in FIG. 16, the UE may receive the first frequency configuration information through the RRCRelease message, transition to the RRC idle mode or RRC inactive mode, and perform the frequency measurement. In addition, the UE may receive the second frequency configuration information through the system information of a cell on which the UE camps through the cell selection or reselection procedure.

The fourth embodiment is characterized in that the UE receives the first frequency configuration information and/or the second frequency configuration information, compares the first frequency configuration information and the second frequency configuration information when performing the RRC idle mode or RRC inactive mode frequency measurement, and performs the frequency measurement for frequencies corresponding to a union of the first frequency list and the second frequency list, based on the first frequency configuration information or the second frequency configuration information. In addition, the UE may perform the frequency measurement in consideration of the second frequency configuration information with respect to configuration information that is not contained in the first frequency configuration information, and may perform the frequency measurement in consideration of the first frequency configuration information with respect to configuration information that is not contained in the second frequency configuration information.

For example, the UE may receive the first frequency configuration information 16-10 in the RRCRelease message from the first cell, transition to the RRC idle mode or RRC inactive mode, and then receive the second frequency configuration information 16-20 in the system information from the first cell or a new second cell through the cell selection or reselection procedure.

A first frequency list of the first frequency configuration information 16-10 may contain, as target frequencies to be measured, frequency 1 (16-01), frequency 2 (16-02), frequency 3 (16-03), frequency 4 (16-04), frequency 5 (16-05), and frequency 6 (16-06). Among these frequencies, only frequency 1 (16-01), frequency 2 (16-02), frequency 3 (16-03), and frequency 5 (16-05) may be configured with threshold value information used as a criterion for measurement and report for each frequency, first configuration information for SSB measurement for each frequency, or a first reporting method for measurement report for each frequency.

A second frequency list of the second frequency configuration information 16-20 may contain, as target frequencies to be measured, frequency 3 (16-03), frequency 4 (16-04), frequency 5 (16-05), frequency 6 (16-06), frequency 7 (16-07), and frequency 8 (16-08). Among these frequencies, only frequency 3 (16-03), frequency 4 (16-04), frequency 7 (16-07), and frequency 8 (16-08) may be configured with threshold value information used as a criterion for measurement and report for each frequency, second configuration information for SSB measurement for each frequency, or a second reporting method for measurement report for each frequency.

Upon receiving the first frequency configuration information 16-10 or the second frequency configuration information 16-20, the UE may select frequencies to be measured, and then apply one of the following methods so as to determine frequency configurations to be applied to the respective frequencies.

Method 4-1 (16-51): Upon receiving the first frequency configuration information 16-10 or the second frequency configuration information 16-20, the UE compares the first frequency list information of the first frequency configuration information and the second frequency list information of the second frequency configuration information, selects frequencies corresponding to a union, and performs frequency measurement for the selected frequencies. Therefore, the UE may perform the frequency measurement only for frequencies 16-10, 16-20, and 16-30 corresponding to the union between the first and second frequency lists (i.e., frequency 1 (16-01), frequency 2 (16-02), frequency 3 (16-03), frequency 4 (16-04), frequency 5 (16-05), frequency 6 (16-06), frequency 7 (16-07), and frequency 8 (16-08)) by applying frequency measurement configuration information for each frequency (e.g., the threshold value information used as a criterion for measurement and report for each frequency, the first or second configuration information for SSB measurement for each frequency, or the first or second reporting method for measurement report for each frequency) set in the first or second frequency configuration information, determine a valid frequency measurement result, construct a result to be reported, and store the constructed result. Specifically, in the method 4-1, the UE may perform the frequency measurement by applying first configuration information (e.g., periodicity, offset, and/or duration of smtc) for SSB measurement for each frequency of the first frequency list or applying second configuration information for SSB measurement for each frequency of the second frequency list, based on a reference timing of a serving cell on which the UE camps through the cell selection or reselection procedure. In the method 4-1, the UE may prioritize the first frequency configuration information for frequencies corresponding to an intersection between the first and second frequency lists. If there are both the first frequency configuration information and the second frequency configuration information with respect to a target frequency (e.g., frequency 3 (16-03)) to be measured, the UE may prioritize the first frequency configuration information. If there is no first configuration information for SSB measurement for a target frequency to be measured in the first frequency list, or if there is no second configuration information for SSB measurement for a target frequency to be measured in the second frequency list, the UE may not perform the measurement for the frequency to reduce battery consumption. In one alternative method, even when there is no first configuration information for SSB measurement for the target frequency in the first frequency list, or even when there is no second configuration information for SSB measurement for the target frequency in the second frequency list, the UE may perform the RRC idle mode or RRC inactive mode frequency measurement by being implemented to synchronize for the frequency, search for SSB signals from the beginning, and derive parameter values of periodicity, offset, and duration.

Method 4-2 (16-52): Upon receiving the first frequency configuration information 16-10 or the second frequency configuration information 16-20, the UE compares the first frequency list information of the first frequency configuration information and the second frequency list information of the second frequency configuration information, selects frequencies corresponding to a union, and performs frequency measurement for the selected frequencies. Therefore, the UE may perform the frequency measurement only for frequencies 16-10, 16-20, and 16-30 corresponding to the union between the first and second frequency lists (i.e., frequency 1 (16-01), frequency 2 (16-02), frequency 3 (16-03), frequency 4 (16-04), frequency 5 (16-05), frequency 6 (16-06), frequency 7 (16-07), and frequency 8 (16-08)) by applying frequency measurement configuration information for each frequency (e.g., the threshold value information used as a criterion for measurement and report for each frequency, the first or second configuration information for SSB measurement for each frequency, or the first or second reporting method for measurement report for each frequency) set in the first or second frequency configuration information, determine a valid frequency measurement result, construct a result to be reported, and store the constructed result. Specifically, in the method 4-2, the UE may perform the frequency measurement by applying first configuration information (e.g., periodicity, offset, and/or duration of smtc) for SSB measurement for each frequency of the first frequency list or applying second configuration information for SSB measurement for each frequency of the second frequency list, based on a reference timing of a serving cell on which the UE camps through the cell selection or reselection procedure. In the method 4-2, the UE may prioritize the first frequency configuration information for frequencies corresponding to an intersection between the first and second frequency lists. If there are both the first frequency configuration information and the second frequency configuration information with respect to a target frequency (e.g., frequency 3 (16-03)) to be measured, the UE may prioritize the first frequency configuration information. If there is no first configuration information for SSB measurement for a target frequency (e.g., frequency 4 (16-04)) to be measured, but if the second frequency configuration information received in the system information contains second configuration information for SSB measurement for the frequency, the UE may perform the frequency measurement by applying the second configuration information (e.g., periodicity, offset, and/or duration of smtc) for SSB measurement for the frequency (e.g., frequency 4 (16-04)), based on a reference timing of a serving cell on which the UE camps through the cell selection or reselection procedure. In addition, if there is no second configuration information for SSB measurement for a target frequency (e.g., frequency 5 (16-05)) to be measured, but if the first frequency configuration information received in the RRCRelease message contains first configuration information for SSB measurement for the frequency, the UE may perform the frequency measurement by applying the first configuration information (e.g., periodicity, offset, and/or duration of smtc) for SSB measurement for the frequency (e.g., frequency 5 (16-05)), based on a reference timing of a serving cell on which the UE camps through the cell selection or reselection procedure. If there is neither first configuration information nor second configuration information for SSB measurement for a target frequency to be measured, the UE may not perform the measurement for the frequency to reduce battery consumption. In one alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration.

Method 4-3 (16-53): Upon receiving the first frequency configuration information 16-10 or the second frequency configuration information 16-20, the UE compares the first frequency list information of the first frequency configuration information and the second frequency list information of the second frequency configuration information, selects frequencies corresponding to a union, and performs frequency measurement for the selected frequencies. Therefore, the UE may perform the frequency measurement only for frequencies 16-10, 16-20, and 16-30 corresponding to the union between the first and second frequency lists (i.e., frequency 1 (16-01), frequency 2 (16-02), frequency 3 (16-03), frequency 4 (16-04), frequency 5 (16-05), frequency 6 (16-06), frequency 7 (16-07), and frequency 8 (16-08)) by applying frequency measurement configuration information for each frequency (e.g., the threshold value information used as a criterion for measurement and report for each frequency, the first or second configuration information for SSB measurement for each frequency, or the first or second reporting method for measurement report for each frequency) set in the first or second frequency configuration information, determine a valid frequency measurement result, construct a result to be reported, and store the constructed result. Specifically, in the method 4-3, the UE may perform the frequency measurement by applying first configuration information (e.g., periodicity, offset, and/or duration of smtc) for SSB measurement for each frequency of the first frequency list or applying second configuration information for SSB measurement for each frequency of the second frequency list, based on a reference timing of a serving cell on which the UE camps through the cell selection or reselection procedure. In the method 4-3, the UE may prioritize the second frequency configuration information for frequencies corresponding to an intersection between the first and second frequency lists. If there are both the first frequency configuration information and the second frequency configuration information with respect to a target frequency (e.g., frequency 3 (16-03)) to be measured, the UE may prioritize the second frequency configuration information. If there is no first configuration information for SSB measurement for a target frequency to be measured in the first frequency list, or if there is no second configuration information for SSB measurement for a target frequency to be measured in the second frequency list, the UE may not perform the measurement for the frequency to reduce battery consumption. In one alternative method, even when there is no first configuration information for SSB measurement for the target frequency in the first frequency list, or even when there is no second configuration information for SSB measurement for the target frequency in the second frequency list, the UE may perform the RRC idle mode or RRC inactive mode frequency measurement by being implemented to synchronize for the frequency, search for SSB signals from the beginning, and derive parameter values of periodicity, offset, and duration.

Method 4-4 (16-54): Upon receiving the first frequency configuration information 16-10 or the second frequency configuration information 16-20, the UE compares the first frequency list information of the first frequency configuration information and the second frequency list information of the second frequency configuration information, selects frequencies corresponding to a union, and performs frequency measurement for the selected frequencies. Therefore, the UE may perform the frequency measurement only for frequencies 16-10, 16-20, and 16-30 corresponding to the union between the first and second frequency lists (i.e., frequency 1 (16-01), frequency 2 (16-02), frequency 3 (16-03), frequency 4 (16-04), frequency 5 (16-05), frequency 6 (16-06), frequency 7 (16-07), and frequency 8 (16-08)) by applying frequency measurement configuration information for each frequency (e.g., the threshold value information used as a criterion for measurement and report for each frequency, the first or second configuration information for SSB measurement for each frequency, or the first or second reporting method for measurement report for each frequency) set in the first or second frequency configuration information, determine a valid frequency measurement result, construct a result to be reported, and store the constructed result. Specifically, in the method 4-4, the UE may perform the frequency measurement by applying first configuration information (e.g., periodicity, offset, and/or duration of smtc) for SSB measurement for each frequency of the first frequency list or applying second configuration information for SSB measurement for each frequency of the second frequency list, based on a reference timing of a serving cell on which the UE camps through the cell selection or reselection procedure. In the method 4-4, the UE may prioritize the second frequency configuration information for frequencies corresponding to an intersection between the first and second frequency lists. If there are both the first frequency configuration information and the second frequency configuration information with respect to a target frequency (e.g., frequency 3 (16-03)) to be measured, the UE may prioritize the second frequency configuration information. If there is no first configuration information for SSB measurement for a target frequency (e.g., frequency 4 (16-04)) to be measured, but if the second frequency configuration information received in the system information contains second configuration information for SSB measurement for the frequency, the UE may perform the frequency measurement by applying the second configuration information (e.g., periodicity, offset, and/or duration of smtc) for SSB measurement for the frequency (e.g., frequency 4 (16-04)), based on a reference timing of a serving cell on which the UE camps through the cell selection or reselection procedure. In addition, if there is no second configuration information for SSB measurement for a target frequency (e.g., frequency 5 (16-05)) to be measured, but if the first frequency configuration information received in the RRCRelease message contains first configuration information for SSB measurement for the frequency, the UE may perform the frequency measurement by applying the first configuration information (e.g., periodicity, offset, and/or duration of smtc) for SSB measurement for the frequency (e.g., frequency 5 (16-05)), based on a reference timing of a serving cell on which the UE camps through the cell selection or reselection procedure. If there is neither first configuration information nor second configuration information for SSB measurement for a target frequency to be measured, the UE may not perform the measurement for the frequency to reduce battery consumption. In one alternative method, even if there is no first configuration information for SSB measurement for each frequency, or even if there is no second configuration information for SSB measurement for each frequency, the UE may perform the RRC idle mode or RRC inactive mode frequency measurement by being implemented to synchronize for the frequency, search for SSB signals from the beginning, and derive parameter values of periodicity, offset, and duration.

Meanwhile, each of the above-described first, second, third, and fourth embodiments may also be applied to other cases where the base station or network sets the configuration information for the RRC idle mode or RRC inactive mode frequency measurement by using only the first frequency configuration information of the RRCRelease message. Similarly, each of the above-described first, second, third, and fourth embodiments may also be applied to other cases where the base station or network sets the configuration information for the RRC idle mode or RRC inactive mode frequency measurement by using only the second frequency configuration information of the system information.

Figure 17:
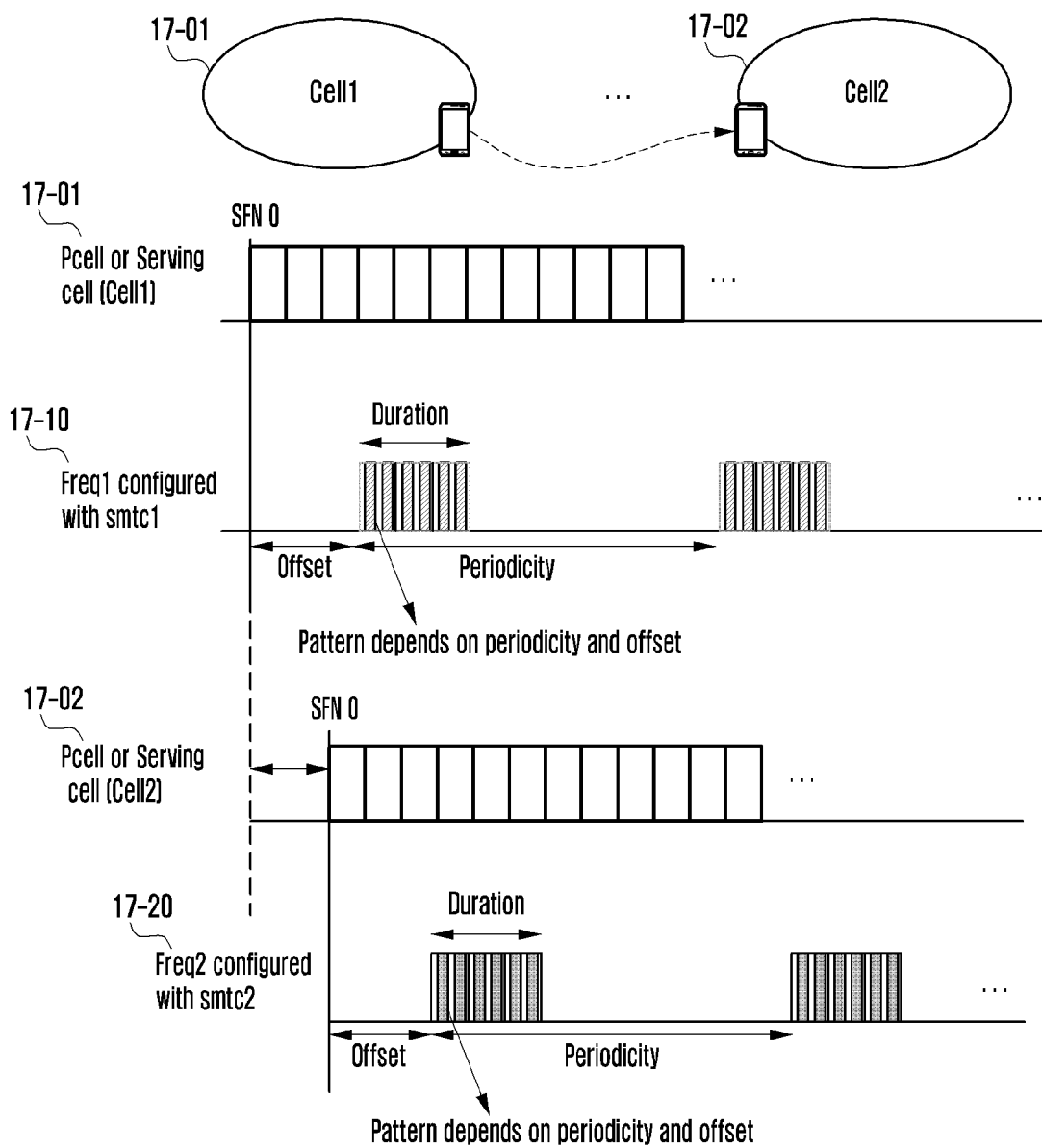
FIG. 17 is a diagram illustrating a method for a terminal to perform a frequency measurement in an RRC idle mode or an RRC inactive mode in a network that is not synchronized between different frequencies or cells according to an embodiment of the disclosure.

FIG. 17 is a diagram illustrating a method for a terminal to perform a frequency measurement in an RRC idle mode or an RRC inactive mode in a network that is not synchronized between different frequencies or cells according to an embodiment of the disclosure.

In FIG. 17, the UE that transmits/receives data in the RRC connected mode in a current cell 17-01 (first cell) may receive the RRCRelease message from the base station of the current cell 17-01, transition to the RRC idle mode or RRC inactive mode, and move while performing the cell selection or reselection procedure. The RRCRelease message may contain the first frequency configuration information. In addition, the RRC idle mode or RRC inactive mode UE may camp on a suitable cell through the cell selection or reselection procedure and acquire system information. The UE may receive the second frequency configuration information in the system information.

If the received RRCRelease message contains the first frequency configuration information, the UE may drive a timer by applying first timer value information of the first frequency configuration information and start early frequency measurement of the RRC idle mode or RRC inactive mode. In addition, if the first frequency configuration information contains first area configuration information, the UE may identify an identifier of the camping cell and determine whether to perform the early frequency measurement of the RRC idle mode or RRC inactive mode.

If the UE is in a service area of the first cell 17-01, the UE may perform the early frequency measurement of the RRC idle mode or RRC inactive mode, based on the first frequency configuration information received in the RRCRelease message or the second frequency configuration information broadcasted as the system information by the first cell 17-01. Specifically, the UE may perform the early frequency measurement of the RRC idle mode or RRC inactive mode according to the above-described first, second, third, or fourth embodiment.

If the UE moves from the first cell 17-01 to a service area of a second cell 17-02 and camps on the second cell 17-02, the UE may perform the RRC idle mode or RRC inactive mode frequency measurement based on the first frequency configuration information received in the RRCRelease message or the second frequency configuration information broadcasted as the system information by the second cell 17-02. Specifically, the UE may perform the early frequency measurement of the RRC idle mode or RRC inactive mode according to the above-described first, second, third, or fourth embodiment.

Described hereinafter is a method for the UE to determine a reference timing when performing the frequency measurement based on the first frequency configuration information that has been set by the base station or network through an RRC message (e.g., the RRCRelease message or the RRCReconfiguration message). The reference timing determination method to be described below may be applied to each of the above-described first, second, third, and fourth embodiments.

Reference timing determination method 1: In the reference timing determination method 1, the network may assume that all frequencies of the network are managed to be synchronized, or assume that synchronized information is broadcasted through the system information of each cell. Therefore, the base station may set the first frequency configuration information in the RRC message to the UE, and the UE may determine a reference timing for the frequency measurement of the RRC idle mode or RRC inactive mode, based on a reference timing (e.g., SFN 0) of a cell on or with which the UE camps or synchronizes through the cell selection or reselection procedure, and may apply SSB configuration information for each frequency to perform the RRC idle mode or RRC inactive mode frequency measurement.

Reference timing determination method 2: In the reference timing determination method 2, the network does not assume that all frequencies of the network are managed to be synchronized. Therefore, the base station may assume a current cell as a reference timing and thereby set the first frequency configuration information in the RRC message to the UE. Then, the UE may store the cell reference timing (e.g., SFN 0) of the first frequency configuration information received through the RRC message, determine a reference timing for the frequency measurement of the RRC idle mode or RRC inactive mode, based on the stored reference timing, and apply SSB configuration information for each frequency to perform the RRC idle mode or RRC inactive mode frequency measurement.

Reference timing determination method 3: In the reference timing determination method 3, the network does not assume that all frequencies of the network are managed to be synchronized. Therefore, the base station may assume a current cell or a cell indicated in the first area configuration information as a reference timing and thereby set the first frequency configuration information in the RRC message to the UE. Then, the UE may perform the RRC idle mode or RRC inactive mode frequency measurement only when a cell on which the UE camps through the cell selection or reselection procedure is a cell sending the first frequency configuration information through the RRC message or a cell indicated in the first area information of the first frequency configuration information. In other cases, the UE may stop the frequency measurement. Therefore, the UE may store the cell reference timing (e.g., SFN 0) of the first frequency configuration information received through the RRC message and, based on the stored reference timing, determine a reference timing for the frequency measurement, or alternatively determine a reference timing for the frequency measurement, based on a reference timing of the camping cell. Then, based on the reference timing, the UE may apply SSB configuration information for each frequency to perform the RRC idle mode or RRC inactive frequency measurement.

Reference timing determination method 4: In the reference timing determination method 4, the network does not assume that all frequencies of the network are managed to be synchronized. Therefore, the base station may set only frequencies synchronized in the entire network (assuming that frequencies included in the first frequency list are synchronized in the entire network) to the UE in the first frequency configuration information through the RRC message. Thus, the UE may synchronize, for each frequency of the first frequency list set in the first frequency configuration information, with any cell of the corresponding frequency, determine a reference timing based on that of the synchronized cell, and apply SSB configuration information for each frequency to perform the RRC idle mode or RRC inactive frequency measurement.

Reference timing determination method 5: In the reference timing determination method 5, the network does not assume that all frequencies of the network are managed to be synchronized. Therefore, the base station may set only frequencies synchronized in the entire network (assuming that frequencies included in the first frequency list are synchronized in the entire network) to the UE in the first frequency configuration information through the RRC message. Thus, the UE may synchronize, for a certain frequency of the first frequency list set in the first frequency configuration information, with any cell of any frequency of the first frequency list, determine a reference timing based on that of the synchronized cell, and apply SSB configuration information for each frequency to perform the RRC idle mode or RRC inactive frequency measurement.

Reference timing determination method 6: In the reference timing determination method 6, the network does not assume that all frequencies of the network are managed to be synchronized. Therefore, the base station may set reference frequencies, cells, or areas synchronized in the entire network (assuming that frequencies included in a separate reference list are synchronized in the entire network) to the UE as a separate reference list in the first frequency configuration information through the RRC message. Thus, the UE may synchronize, for a certain frequency of the first frequency list set in the first frequency configuration information, with any cell of any frequency of the separate reference frequency list, determine a reference timing based on that of the synchronized cell, and apply SSB configuration information for each frequency to perform the RRC idle mode or RRC inactive frequency measurement.

The above-described reference timing determination methods 1, 2, 3, 4, 5, and 6 may be applied when performing the cell selection or reselection procedure, measuring a neighboring cell, or performing the RRC idle mode or RRC inactive mode frequency measurement, based on the second frequency configuration information broadcasted in the system information.

In addition, described hereinafter is a first UE operation for performing frequency measurement in different methods depending on which RRC message is used to set the frequency measurement configuration information to the UE.

When a received RRC message is the RRCRelease message, the RRC connected mode UE transitions to the RRC idle mode or RRC inactive mode. Then, if the RRC message contains frequency measurement configuration information (e.g., the first frequency measurement configuration information for the RRC idle mode or RRC inactive mode), the UE applies SSB configuration information or smtc configuration information to a frequency to be measured, based on a serving cell on which the UE camps through the cell selection or reselection procedure, and thereby performs the frequency measurement.

When a received RRC message is the RRC Reconfiguration message, the RRC connected mode UE performs frequency measurement in the RRC connected mode. If the RRC message contains frequency measurement configuration information (e.g., the first frequency measurement configuration information for the RRC connected mode), the UE applies SSB configuration information or smtc configuration information to a frequency to be measured, based on a currently connected PCell, and thereby performs the frequency measurement.

In addition, described hereinafter is a second UE operation for performing frequency measurement in different methods depending on which RRC message is used to set the frequency measurement configuration information to the UE.

When a received RRC message is the RRCRelease message, the RRC connected mode UE transitions to the RRC idle mode or RRC inactive mode. Then, if the RRC message contains frequency measurement configuration information (e.g., the first frequency measurement configuration information for the RRC idle mode or RRC inactive mode), the UE applies the above-described first, second, third, or fourth embodiment and thereby performs the frequency measurement.

When a received RRC message is the RRC Reconfiguration message, the RRC connected mode UE performs frequency measurement in the RRC connected mode. If the RRC message contains frequency measurement configuration information (e.g., the first frequency measurement configuration information for the RRC connected mode), the UE applies SSB configuration information or smtc configuration information to a frequency to be measured, based on a currently connected PCell, and thereby performs the frequency measurement.

The RRC message may contain a plurality of the following information types, or a part thereof, to be applied when the UE performs early frequency measurement in the RRC idle mode, RRC inactive mode, or RRC connected mode.

Configuration information of frequencies to be measured in the RRC idle mode or RRC inactive mode Frequency configuration information LTE frequency measurement information group or list (EUTRA frequency configuration information/list/group)

It may be set to contain early measurement setup regarding which frequencies or frequency bands (e.g., a frequency list) is to be measured, which order is to be used for measurement based on frequency priorities, which filtering method is to be used for measuring frequency strength (e.g., an L1, L2, or L3 filtering method, or which calculation method and which coefficient are to be used for measurement), which event or condition is to be applied for starting the frequency measurement, which criterion (e.g., a signal strength greater than a threshold value) is to be used for the measurement and report in comparison with a current serving cell (or a currently camping frequency), which event or condition is to be applied for reporting a result of the frequency measurement, which criterion or condition needs to be satisfied for reporting the frequency in comparison with a current serving cell (or a currently camping frequency), or which period is to be applied for reporting the frequency measurement result.

NR frequency measurement information group or list (NR frequency configuration information/list/group)

It may be set to contain early measurement setup regarding which frequencies or frequency bands (e.g., a frequency list) is to be measured, which order is to be used for measurement based on SSB identifier information of each frequency, SSB transmission resources (e.g., frequency and time resources, beam identifiers or beam indicators, smtc configuration information), or priority of each frequency (or each SSB), which filtering method is to be used for measuring frequency strength (e.g., an L1, L2, or L3 filtering method, or which calculation method and which coefficient are to be used for measurement), which event or condition is to be applied for starting the frequency measurement, which criterion (e.g., a signal strength greater than a threshold value) is to be used for the measurement and report in comparison with a current serving cell (or a currently camping frequency), which event or condition is to be applied for reporting a result of the frequency measurement, which criterion or condition needs to be satisfied for reporting the frequency in comparison with a current serving cell (or a currently camping frequency), or which period is to be applied for reporting the frequency measurement result.

Duration or timer value (e.g., T331) for performing frequency measurement in the RRC idle mode or RRC inactive mode: According to an embodiment, the same timer may be set for both LTE frequency and NR frequency, or different timers may be set separately for LTE frequency and NR frequency. Because LTE frequency characteristics (low frequency band) and NR frequency characteristics (high frequency band) are different, the use of different timers allows the frequency measurement time of the UE to be separately adjusted, thereby saving the battery of the UE. For example, if the RRCRelease message instructs frequency measurement in the RRC idle mode or RRC inactive mode, the frequency measurement may be performed while the timer is running, and may be stopped when the timer expires.

Effective area information for performing frequency measurement in the RRC idle mode or RRC inactive mode: In one method, based on a list of physical cell identifiers (PCIDs), the UE may perform the frequency measurement when it is in an area (e.g., cell) indicated by the area information, and may stop the frequency measurement when it is out of the indicated area. For example, when the UE is out of the area, the timer may be stopped, and the frequency measurement may be stopped. In another method, the base station may use an indicator to instruct the UE, transitioning to the RRC inactive mode, to determine whether to use a RAN indication area as the effective area. For example, when the base station instructs, through the indicator, the UE transitioning to the RRC inactive mode to use the RAN indication area as the effective area, the UE may perform the frequency measurement within the RAN indication area while maintaining the RRC inactive mode in the RAN indication area. In still another method, the base station may instruct, through an indicator, the UE to use the effective area as the RAN indication area. In yet another method, the UE may apply the RAN indication area as the effective area without an indicator in the RRC inactive mode, and a separate effective area may be set for the UE in the RRC active mode. Such proposed methods may reduce signaling overhead because the RRC message indicates both the RAN indication area and the effective area as a list of cell identifiers, and may also reduce the UE implementation burden because it is not required to separately manage the effective area in the UE implementation.

Measurement report threshold value: In a configured frequency group, one or a plurality of frequencies having signal strength higher than the threshold value may be reported.

A condition for the UE to stop the early frequency measurement in the RRC idle mode or inactive mode may be one or more of the following conditions:

1. when the system information of the current cell supports early frequency measurement result reporting, and after the UE transmits, or when the UE attempts to transmit, to the base station an RRC message (e.g., message 5) that there is a measurement result report, 2. when the system information of the current cell does not indicate that it supports the early frequency measurement result reporting, 3. when the UE establishes a connection with the network while performing the RRC idle mode or RRC inactive mode frequency measurement, stops the timer and the measurement upon receiving the RRCSetup message or RRCResume message through message 4, and then attempts to transmit to the base station an RRC message (e.g., message 5) that the system information of the current cell supports the early frequency measurement result reporting and there is a measurement result report, 4. when the measurement report timer (e.g. T331) expires, and 5. when the UE is out of an area indicated by the RRC idle mode or RRC inactive mode measurement area information set in the RRCRelease message.

According to one or more of the above conditions, the UE may stop the RRC idle mode or RRC inactive mode frequency measurement.

The UE performs measurement for measurable frequencies in configuration information related to early frequency measurement, that is, frequencies supported by the UE capability (e.g., frequencies available for CA or DC technologies), and at this time the UE may select a certain frequency to be measured preferentially according to pre-determined priorities.

In another method, when area configuration information (i.e., configuration information about an area where the frequency measurement configuration is valid) is set to the UE in the frequency measurement configuration information of the RRC idle mode or RRC inactive mode through the RRCRelease message, the UE may stop or restart the RRC idle mode or RRC inactive mode frequency measurement, based on the system information or cell identifier of the camping cell, while a timer indicating a frequency measurement duration is running (if the timer has not expired). Specifically, the RRC idle mode or RRC inactive mode UE that moves while performing the cell selection or reselection procedure may continue to perform the frequency measurement and run the timer indicating the duration of the frequency measurement if a physical cell identity of a serving cell on which the UE camps is contained in the area configuration information. However, if the physical cell identity of the camping, serving cell is not contained in the area configuration information, the UE may stop the frequency measurement, continuously run the timer, and maintain the frequency measurement configuration information set in the RRC message (if the frequency measurement information or frequency measurement list is set in the RRC message). If the UE reselects a cell having the cell identifier contained in the area configuration information and camps on again, the frequency measurement may be restarted while the timer is running (if the timer has not expired). Also, the frequency measurement configuration information may be released or discarded when the timer indicating the frequency measurement duration expires.

1> When the UE receives the RRCRelease message (or when receiving the RRCRelease message in response to the RRCResumeRequest), and if the base station has not set the frequency measurement configuration information in the RRCRelease message or the UE has not received the frequency measurement configuration information (or frequency measurement list) through the RRCRelease message, 2> the UE receives or acquires frequency measurement configuration information for the RRC idle mode or RRC inactive mode frequency measurement from the system information (e.g., SIBS) of a camping cell and stores it. In addition, the UE may perform or restart the RRC idle mode or RRC inactive mode frequency measurement according to the frequency measurement configuration information. In one alternative method, if there is no frequency measurement configuration information in the RRCRelease message, the UE may determine it as an instruction to stop frequency measurement, stop the frequency measurement, stop the timer, and discard the frequency measurement configuration information or the frequency measurement result. In another alternative method, the RRCRelease message may define an indicator to discard or maintain the frequency measurement configuration information or the frequency measurement result.

1> When the UE receives the RRCRelease message (or when receiving the RRCRelease message in response to the RRCResumeRequest), and if the base station has set the frequency measurement configuration information in the RRCRelease message, the UE has received the frequency measurement configuration information (or frequency measurement list) through the RRCRelease message, or a timer for frequency measurement is running (if the timer has not expired), 2> the UE may discard the stored frequency measurement configuration information or the frequency measurement result. In one alternative method, the RRCRelease message may define an indicator to discard or maintain the frequency measurement configuration information or the frequency measurement result, and may set to add, change, or delete only part of the stored frequency measurement configuration information.

2> the UE stores or configures the frequency measurement configuration information set in the RRCRelease message, and performs or restarts the RRC idle mode or RRC inactive mode frequency measurement according to the information.

1> If the system information of a cell on which the UE camps indicates that the RRC idle mode or RRC inactive mode frequency measurement is supported, or if the timer for frequency measurement is running (if the timer has not expired), 1> Alternatively, if the UE camps or re-camps on a cell having a frequency or cell identifier included in the area configuration information (configuration information set in the RRC message (e.g., RRCRelease)) for the RRC idle mode or RRC inactive mode frequency measurement, or if the timer for frequency measurement is running (if the timer has not expired), 2> if the base station does not set the frequency measurement configuration information in the RRCRelease message, or if the UE does not receive the frequency measurement configuration (or frequency measurement list) in the RRCRelease message, 3> the UE receives or acquires the frequency measurement configuration information for the RRC idle mode or RRC inactive mode frequency measurement in the system information (e.g., SIBS) of a camping cell, and stores it.

3> the UE performs or restarts the RRC idle mode or RRC inactive mode frequency measurement according to the frequency measurement configuration information.

2> if the base station sets the frequency measurement configuration information in the RRCRelease message, if the UE receives the frequency measurement configuration (or frequency measurement list) in the RRCRelease message, or if the timer for frequency measurement is running (if the timer has not expired), 3> the UE performs or restarts the RRC idle mode or RRC inactive mode frequency measurement according to the frequency measurement configuration information set in the RRCRelease message.

1> If the system information of a cell on which the UE camps does not indicate that the RRC idle mode or RRC inactive mode frequency measurement is supported, or if the timer for frequency measurement is running (if the timer has not expired), 1> Alternatively, if the UE camps or re-camps on a cell having a frequency or cell identifier not included in the area configuration information (configuration information set in the RRC message (e.g., RRCRelease)) for the RRC idle mode or RRC inactive mode frequency measurement, or if the timer for frequency measurement is running (if the timer has not expired), 2> the UE stops the RRC idle mode or RRC inactive mode frequency measurement.

2> (The timer indicating the frequency measurement duration is characterized by continuously running.)

Figure 18:
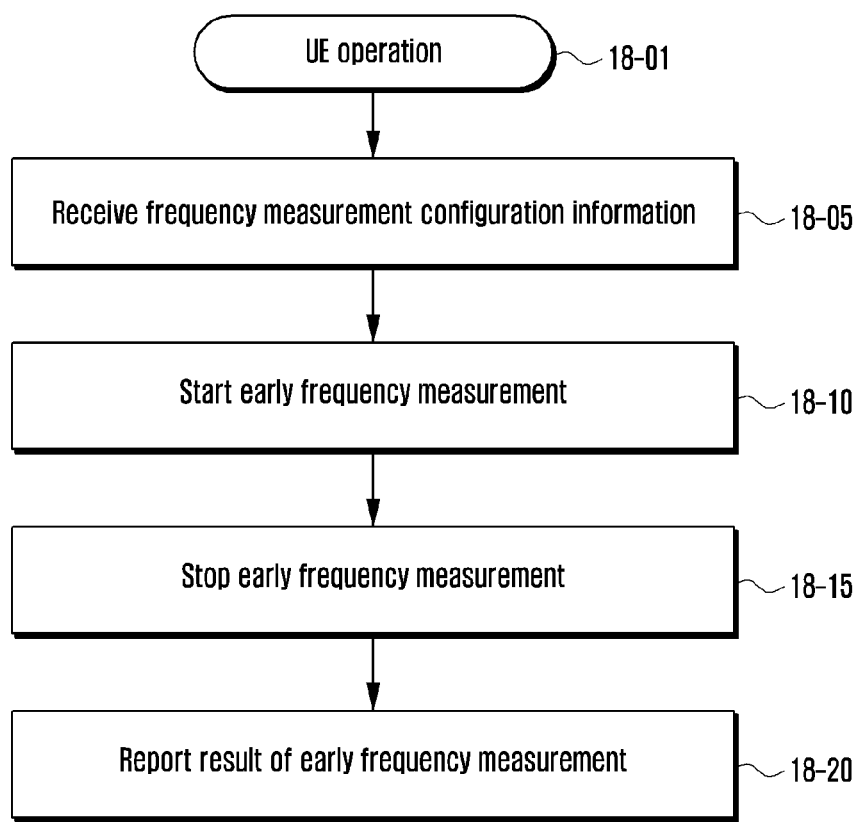
FIG. 18 is a diagram illustrating operations of a terminal to perform a frequency measurement in an RRC idle mode or an RRC inactive mode and report a measurement result according to an embodiment of the disclosure.

FIG. 18 is a diagram illustrating operations of a terminal to perform a frequency measurement in an RRC idle mode or an RRC inactive mode and report a measurement result according to an embodiment of the disclosure.

In FIG. 18, upon receiving an RRC message, the UE drives a timer for RRC idle mode or RRC inactive mode frequency measurement, receives frequency measurement configuration information (if there is in the RRC message) for the RRC idle mode or RRC inactive mode frequency measurement (18-05) or receives the frequency measurement configuration information in system information of a serving cell on which the UE camps through the cell selection or reselection procedure (18-05), and performs the RRC idle mode or RRC inactive mode frequency measurement (18-10). At this time, the UE may perform the frequency measurement according to the above-described first, second, third, or fourth embodiment. Then, the UE stores a frequency measurement result, stops the timer (18-05) upon receiving message 4 when establishing a connection with a network if there is an indicator that the RRC idle mode or RRC inactive mode frequency measurement is supported in system information of the cell, and notify that there is a result of the RRC idle mode or RRC inactive mode frequency measurement through message 5. Then, when the base station requests the result of the RRC idle mode or RRC inactive mode frequency measurement, the UE reports the measurement result (18-20), and may discard the measurement result when the measurement result is successfully delivered to the base station.

Figure 19:
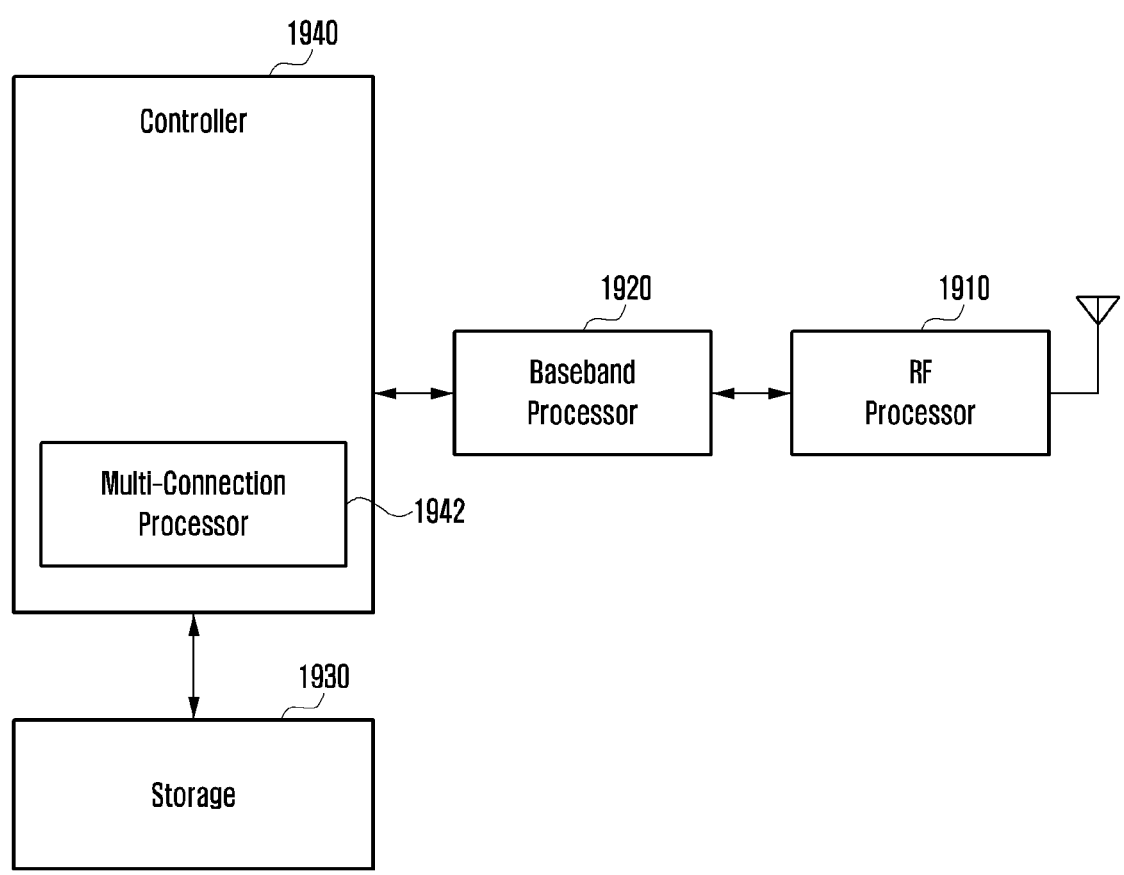
FIG. 19 is a block diagram illustrating a structure of a terminal according to an embodiment of the disclosure.

FIG. 19 is a signal diagram illustrating a structure of a terminal according to an embodiment of the disclosure.

Referring to FIG. 19, the terminal (i.e., UE) may include a radio frequency (RF) processor 19-10, a baseband processor 19-20, a storage 19-30, and a controller 19-40.

The RF processor 19-10 performs a function of transmitting and receiving a signal via a wireless channel, such as band conversion and amplification of a signal. That is, the RF processor 19-10 up-converts a baseband signal provided from the baseband processor 19-20 into an RF band signal, transmits the RF band signal via an antenna, and down-converts an RF band signal received via the antenna into a baseband signal. For example, the RF processor 19-10 may include a transmission filter, a reception filter, an amplifier, a mixer, an oscillator, a digital-to-analog convertor (DAC), an analog-to-digital convertor (ADC), and the like. Although only a single antenna is illustrated in the drawing, the terminal may include a plurality of antennas. In addition, the RF processor 19-10 may include a plurality of RF chains. Moreover, the RF processor 19-10 may perform beamforming. For the beamforming, the RF processor 19-10 may control a phase and a size of each signal transmitted or received via a plurality of antennas or antenna elements. In addition, the RF processor may perform MIMO, and may receive a plurality of layers while performing the MIMO operation. The RF processor 19-10 may appropriately configure a plurality of antennas or antenna elements according to the control of the controller, so as to perform reception beam sweeping, or may control the orientation of a reception beam and a beam width so that a reception beam accords with a transmission beam.

The baseband processor 19-20 performs a function for a conversion between a baseband signal and a bit stream according to the physical layer standard of a system. For example, in the case of data transmission, the baseband processor 19-20 generates complex symbols by encoding and modulating a transmission bit stream. Further, in the case of data reception, the baseband processor 19-20 reconstructs a reception bit stream by demodulating and decoding a baseband signal provided from the RF processor 19-10. For example, in the case of data transmission, according to an OFDM (orthogonal frequency division multiplexing) scheme, the baseband processor 19-20 generates complex symbols by encoding and modulating a transmission bit stream, mapping the complex symbols to subcarriers, and then configures OFDM symbols via an inverse fast Fourier transform (IFFT) operation and cyclic prefix (CP) insertion. Further, in the case of data reception, the baseband processor 19-20 divides a baseband signal provided from the RF processor 19-10 in the unit of OFDM symbols, reconstructs signals mapped to the subcarriers via a fast Fourier transform (FFT) operation, and then reconstructs a reception bit stream via demodulation and decoding.

The baseband processor 19-20 and the RF processor 19-10 transmit or receive a signal, as described above. Accordingly, the baseband processor 19-20 and the RF processor 19-10 may be referred to as a transmitter, a receiver, a transceiver, or a communication unit. In addition, at least one of the baseband processor 19-20 and the RF processor 19-10 may include a plurality of communication modules so as to support many different radio access technologies. In addition, at least one of the baseband processor 19-20 and the RF processor 19-10 may include different communication modules to process signals of different frequency bands. For example, the different radio access technologies may include an LTE network, an NR network, and the like. Further, the different frequency bands may include a super high frequency (SHF) (e.g., 2.5 GHz and 5 GHz) band and a millimeter (mm) wave (e.g., 60 GHz) band.

The storage 19-30 stores data, such as a basic program, an application program, and configuration information for the operation of the terminal. The storage 19-30 may provide stored data in response to a request from the controller 19-40.

The controller 19-40 may include a multi-connection processor 19-42 and may control the overall operation of the terminal. For example, the controller 19-40 transmits or receives a signal via the baseband processor 19-20 and the RF processor 19-10. In addition, the controller 19-40 writes and reads data to/from the storage 19-40. To this end, the controller 19-40 may include at least one processor. For example, the controller 19-40 may include a communication processor (CP) that performs control for communication, and an application processor (AP) that controls a higher layer, such as an application program.

Figure 20:
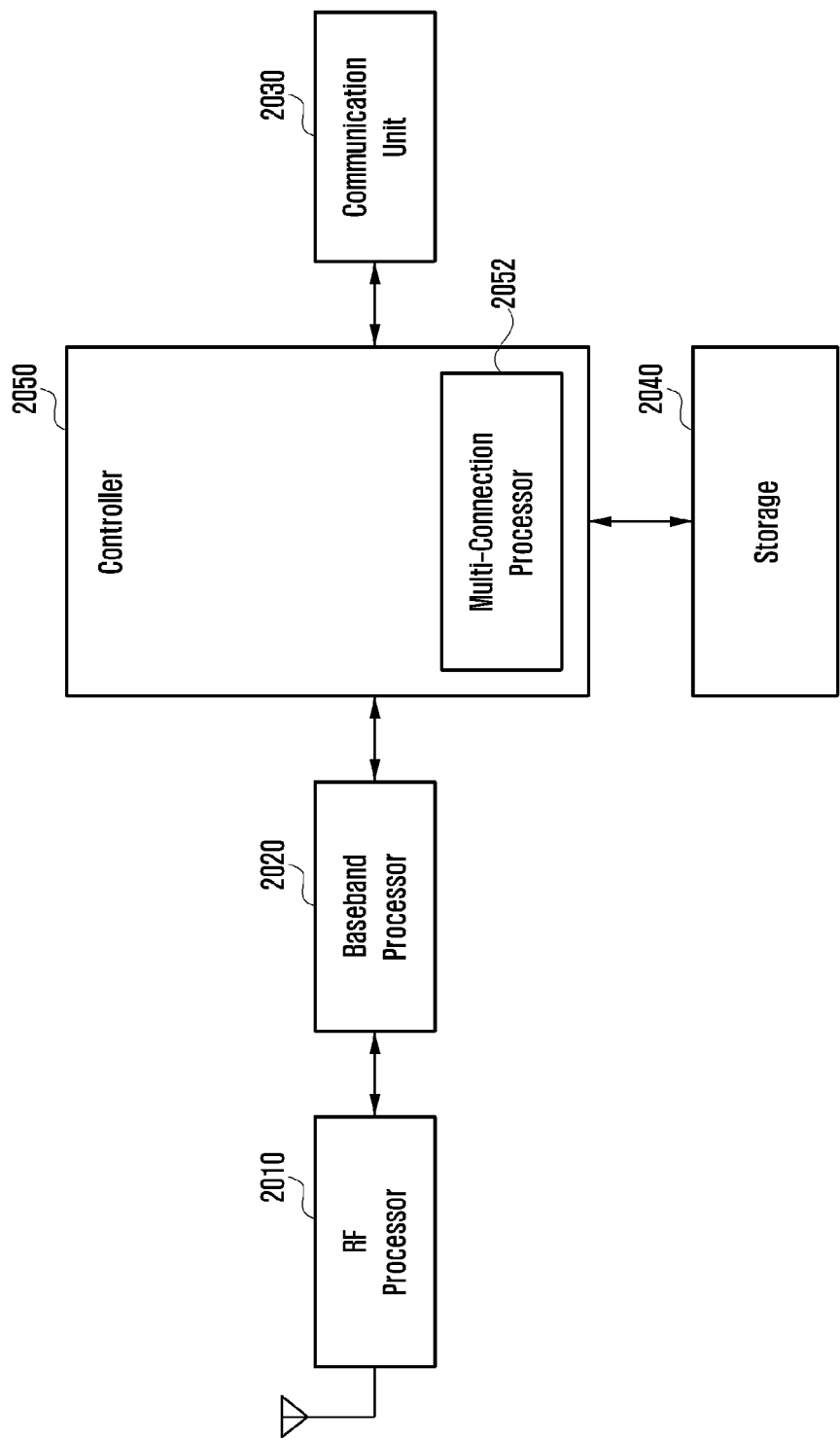
FIG. 20 is a block diagram illustrating a structure of a base station in a wireless communication system according to an embodiment of the disclosure.

FIG. 20 is a block diagram illustrating a structure of a base station in a wireless communication system according to an embodiment of the disclosure.

Referring to FIG. 20, the base station may include an RF processor 20-10, a baseband processor 20-20, a backhaul communication unit 20-30, a storage 20-40, and a controller 20-50.

The RF processor 20-10 performs a function for transmitting or receiving a signal via a wireless channel, such as band conversion and amplification of a signal. For example, the RF processor 20-10 up-converts a baseband signal provided from the baseband processor 20-20 into an RF band signal and then transmits the converted signal via an antenna, and down-converts an RF band signal received via the antenna into a baseband signal. For example, the RF processor 20-10 may include a transmission filter, a reception filter, an amplifier, a mixer, an oscillator, a DAC, and an ADC. Although only a single antenna is illustrated in the drawing, a first access node may include a plurality of antennas. In addition, the RF processor 20-10 may include a plurality of RF chains. Moreover, the RF processor 20-10 may perform beamforming. For the beamforming, the RF processor 20-10 may control a phase and a size of each of the signals transmitted or received via a plurality of antennas or antenna elements. The RF processor may perform a downlink MIMO operation by transmitting one or more layers.

The baseband processor 20-20 performs a function of converting between a baseband signal and a bit stream according to the physical layer standard of a first radio access technology. For example, in the case of data transmission, the baseband processor 20-20 generates complex symbols by encoding and modulating a transmission bit stream. Further, in the case of data reception, the baseband processor 20-20 reconstructs a reception bit stream by demodulating and decoding a baseband signal provided from the RF processor 20-10. For example, in the case of data transmission, according to an OFDM scheme, the baseband processor 20-20 may generate complex symbols by encoding and modulating a transmission bit stream, map the complex symbols to subcarriers, and then configure OFDM symbols via an IFFT operation and CP insertion. In addition, in the case of data reception, the baseband processor 20-20 divides a baseband signal provided from the RF processor 20-10 in units of OFDM symbols, reconstructs signals mapped to sub-carriers via an FFT operation, and then reconstructs a reception bit string via demodulation and decoding. The baseband processor 20-20 and the RF processor 20-10 transmit or receive a signal, as described above. Accordingly, the baseband processor 20-20 and the RF processor 20-10 may be referred to as a transmitter, a receiver, a transceiver, a communication unit, or a wireless communication unit.

The communication unit 20-30 provides an interface for performing communication with other nodes in a network.

The storage 20-40 may store data, such as, a basic program, an application program, configuration information, or the like, for the operation of main base station. Particularly, the storage 20-40 may store information associated with a bearer allocated to a connected terminal, a measurement result reported from a connected terminal, and the like. In addition, the storage 20-40 may store information which is a criterion to determine whether to provide or interrupt multiple-access to a terminal. Also, the storage 20-40 may provide stored data in response to a request from the controller 20-50.

The controller 20-50 may include a multi-connection processor 20-52 and may control the overall operation of the main base station. For example, the controller 20-50 transmits or receives a signal via the baseband processor 20-20 and the RF processor 20-10, or via the backhaul communication unit 20-30. In addition, the controller 20-50 writes and reads data to/from the storage 20-40. To this end, the controller 20-50 may include at least one processor.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   receiving a radio resource control (RRC) release message including first information;
   performing, in case that the first information includes a first frequency of a first frequency list and a synchronization signal block (SSB) configuration for the first frequency, a first measurement for the first frequency based on the SSB configuration for the first frequency included in the first information, while the terminal is in an RRC idle mode or an RRC inactive mode; and
   performing, in case that the first information includes the first frequency of the first frequency list and does not include the SSB configuration for the first frequency, a second measurement for the first frequency based on an SSB configuration for the first frequency included in second information, while the terminal is in the RRC idle mode or the RRC inactive mode, wherein the second information is received through a system information block (SIB).

2. The method of claim 1, wherein the SSB configuration included in the first information or the second information includes at least one of information on a periodicity, duration and an offset associated with an SSB.

3. The method of claim 1, wherein the performing the first measurement comprises:
   identifying that the SSB configuration for the first frequency is included in the first information; and
   performing the first measurement for the first frequency based on the SSB configuration included in the first information, based on the identification.

4. The method of claim 1, wherein the performing the second measurement comprises:
   identifying that the SSB configuration for the first frequency is not included in the first information,
   the first frequency is included in a second frequency list which is included in the second information received through the SIB, and the SSB configuration for the first frequency is included in the second information received through the SIB; and
   performing the second measurement for the first frequency based on the SSB configuration included in the second information, based on the identification.

5. The method of claim 1, wherein the measurement is performed based on a reference timing of a selected cell in the RRC idle mode or the RRC inactive mode.

6. The method of claim 1,
   wherein the measurement is performed while a timer initiated based on the first information is running, and
   wherein the first information includes information on duration associated with the running of the timer.

7. The method of claim 1, further comprising:
   performing, in case that the first information includes neither a frequency list for a long term evolution (LTE) nor a frequency list for a new radio (NR), a third measurement for a second frequency of a second frequency list based on an SSB configuration for the second frequency included in the second information, while the terminal is in the RRC idle mode or the RRC inactive mode, wherein the second frequency list is included in the second information received through the SIB,
   wherein the first frequency list and the second frequency list are associated with the frequency list for the NR.

8. A terminal in a communication system, the terminal comprising:
   a transceiver; and
   a controller configured to:
      receive a radio resource control (RRC) release message including first information,
      perform, in case that the first information includes a first frequency of a first frequency list and a synchronization signal block (SSB) configuration for the first frequency, a first measurement for the first frequency based on the SSB configuration for the first frequency included in the first information, while the terminal is in an RRC idle mode or an RRC inactive mode, and
      perform, in case that the first information includes the first frequency of the first frequency list and does not include the SSB configuration for the first frequency, a second measurement for the first frequency based on an SSB configuration for the first frequency included in second information, while the terminal is in the RRC idle mode or the RRC inactive mode, wherein the second information is received through a system information block (SIB).

9. The terminal of claim 8, wherein the SSB configuration included in the first information or the second information includes at least one of information on a periodicity, duration and an offset associated with an SSB.

10. The terminal of claim 8, wherein the controller is configured to perform the first measurement by:
    identifying that the SSB configuration for the first frequency is included in the first information; and
    performing the first measurement for the first frequency based on the SSB configuration included in the first information, based on the identification.

11. The terminal of claim 8, wherein the controller configured to perform the second measurement by:
    identifying that the SSB configuration for the first frequency is not included in the first information,
    the first frequency is included in a second frequency list which is included in the second information received through the SIB, and the SSB configuration for the first frequency is included in the second information received through the SIB; and performing the second measurement for the first frequency based on the SSB configuration included in the second information, based on the identification.

12. The terminal of claim 8, wherein the measurement is performed based on a reference timing of a selected cell in the RRC idle mode or the RRC inactive mode.

13. The terminal of claim 8,
wherein the measurement is performed while a timer initiated based on the first information is running, and
wherein the first information includes information on duration associated with the running of the timer.

14. The terminal of claim 8, wherein the controller is further configured to:
perform, in case that the first information includes neither a frequency list for a long term evolution (LTE) nor a frequency list for a new radio (NR), a third measurement for a second frequency of a second frequency list based on an SSB configuration for the second frequency included in the second information, while the terminal is in the RRC idle mode or the RRC inactive mode, wherein the second frequency list is included in the second information received through the SIB,
wherein the first frequency list and the second frequency list are associated with the frequency list for the NR.

15. A method performed by a base station in a communication system, the method comprising:
transmitting a radio resource control (RRC) release message including first information,
wherein, in case that the first information includes a first frequency of a first frequency list and a synchronization signal block (SSB) configuration for the first frequency, a first measurement for the first frequency is performed by a terminal based on a synchronization signal block (SSB) configuration for the first frequency included in the first information, while the terminal is in an RRC idle mode or an RRC inactive mode, and
wherein, in case that the first information includes the first frequency of the first frequency list and does not include the SSB configuration for the first frequency, a second measurement for the first frequency is performed based on an SSB configuration for the first frequency included in second information, while the terminal is in an RRC idle mode or an RRC inactive mode, wherein the second information is transmitted through a system information block (SIB).

16. The method of claim 15, wherein the SSB configuration included in the first information or the second information includes at least one of information on a periodicity, duration and an offset associated with an SSB.

17. The method of claim 15, wherein the first information includes information on duration associated with a running of a timer, and
wherein the measurement is performed while the timer initiated based on the first information is running.

18. A base station in a communication system, the base station comprising:
a transceiver; and
a controller configured to:
transmit a radio resource control (RRC) release message including first information,
wherein, in case that the first information includes a first frequency of a first frequency list and a synchronization signal block (SSB) configuration for the first frequency, a first measurement for the first frequency is performed by a terminal based on a synchronization signal block (SSB) configuration for the first frequency included in the first information, while the terminal is in an RRC idle mode or an RRC inactive mode, and
wherein, in case that the first information includes the first frequency of the first frequency list and does not include the SSB configuration for the first frequency, a second measurement for the first frequency is performed based on an SSB configuration for the first frequency included in second information, while the terminal is in an RRC idle mode or an RRC inactive mode, wherein the second information is transmitted through a system information block (SIB).

19. The base station of claim 18, wherein the SSB configuration included in the first information or the second information includes at least one of information on a periodicity, duration and an offset associated with an SSB.

20. The base station of claim 18, wherein the first information includes information on duration associated with a running of a timer, and
wherein the measurement is performed while the timer initiated based on the first information is running.

* * * * *